United States Patent [19]

Matsumura et al.

[11] Patent Number: 5,581,532
[45] Date of Patent: Dec. 3, 1996

[54] OPTICAL INFORMATION RECORDING/REPRODUCING APPARATUS FOR ACCURATELY DETECTING MAGNETIC DOMAIN EDGES

[75] Inventors: Susumi Matsumura, Kawaguchi; Masakuni Yamamoto, Yamato; Eiji Yamaguchi, Sagamihara; Hiroaki Hoshi, Yokohama; Hideki Morishima, Atsugi, all of Japan

[73] Assignee: Canon Kabushiki Kaisha, Tokyo, Japan

[21] Appl. No.: 165,548

[22] Filed: Dec. 13, 1993

Related U.S. Application Data

[63] Continuation of Ser. No. 670,253, Mar. 15, 1991, abandoned.

[30] Foreign Application Priority Data

| Mar. 16, 1990 | [JP] | Japan | 2-064305 |
|---|---|---|---|
| Oct. 29, 1990 | [JP] | Japan | 2-292708 |
| Nov. 13, 1990 | [JP] | Japan | 2-307910 |
| Nov. 15, 1990 | [JP] | Japan | 2-310524 |
| Nov. 16, 1990 | [JP] | Japan | 2-310682 |

[51] Int. Cl.⁶ .................................................. G11B 7/00
[52] U.S. Cl. ................... 369/110; 369/117; 369/109; 369/44.110; 369/44.120
[58] Field of Search .................................. 369/124, 110, 369/112, 116, 109, 44.11, 44.12, 44.41, 32, 13, 118, 120

[56] References Cited

U.S. PATENT DOCUMENTS

| 4,823,220 | 4/1989 | Milster et al. | 369/13 |
|---|---|---|---|
| 4,953,124 | 8/1990 | Koyama | 369/110 |
| 4,959,821 | 9/1990 | Morimoto et al. | 369/13 |
| 4,969,142 | 11/1990 | Nagashima et al. | 369/112 |
| 4,982,393 | 1/1991 | Matsushita et al. | 369/44.32 |
| 5,014,253 | 5/1991 | Morimoto et al. | 369/13 |
| 5,060,212 | 10/1991 | Fujit et al. | 369/112 |
| 5,065,377 | 11/1991 | Spruit et al. | 369/110 |
| 5,105,399 | 4/1992 | Shimonou | 369/110 |
| 5,189,650 | 2/1993 | Watanabe et al. | 369/13 |

FOREIGN PATENT DOCUMENTS

| 3732944 | 4/1989 | Germany . |
|---|---|---|
| 3732874 | 4/1989 | Germany . |

OTHER PUBLICATIONS

Kubota, "Wave Optics", Iwanami Publishing, 1971, pp. 285 and 286, with translation.

Primary Examiner—Georgia Y. Epps
Assistant Examiner—Muhammad N. Edun
Attorney, Agent, or Firm—Fitzpatrick, Cella, Harper & Scinto

[57] ABSTRACT

An apparatus for recording and reproducing information on and from optical or opto-magnetic information recording media is disclosed. The apparatus comprises an irradiation device for irradiating a light beam polarized in a predetermined direction to an opto-magnetic recording medium an, application device for applying a predetermined magnetic field to the recording medium, an optical device for condensing the light beam obtained through the recording medium, and a detector for detecting the light beam condensed by the optical device. The detector has an effective light receiving surface almost equal to the airy disk size determined by the resolving power of the optical device. The apparatus precisely detects edges of information magnetic domains by using the S-polarized component produced by the opto-magnetic recording medium under the magnetic Kerr effect.

25 Claims, 40 Drawing Sheets

FIG. 45
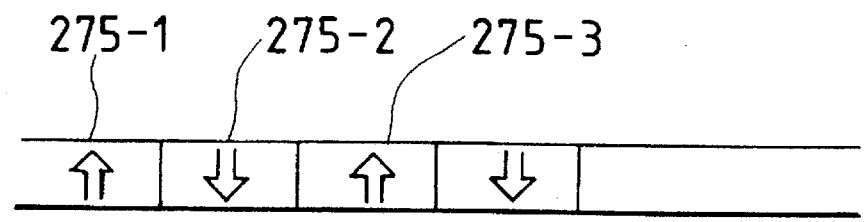
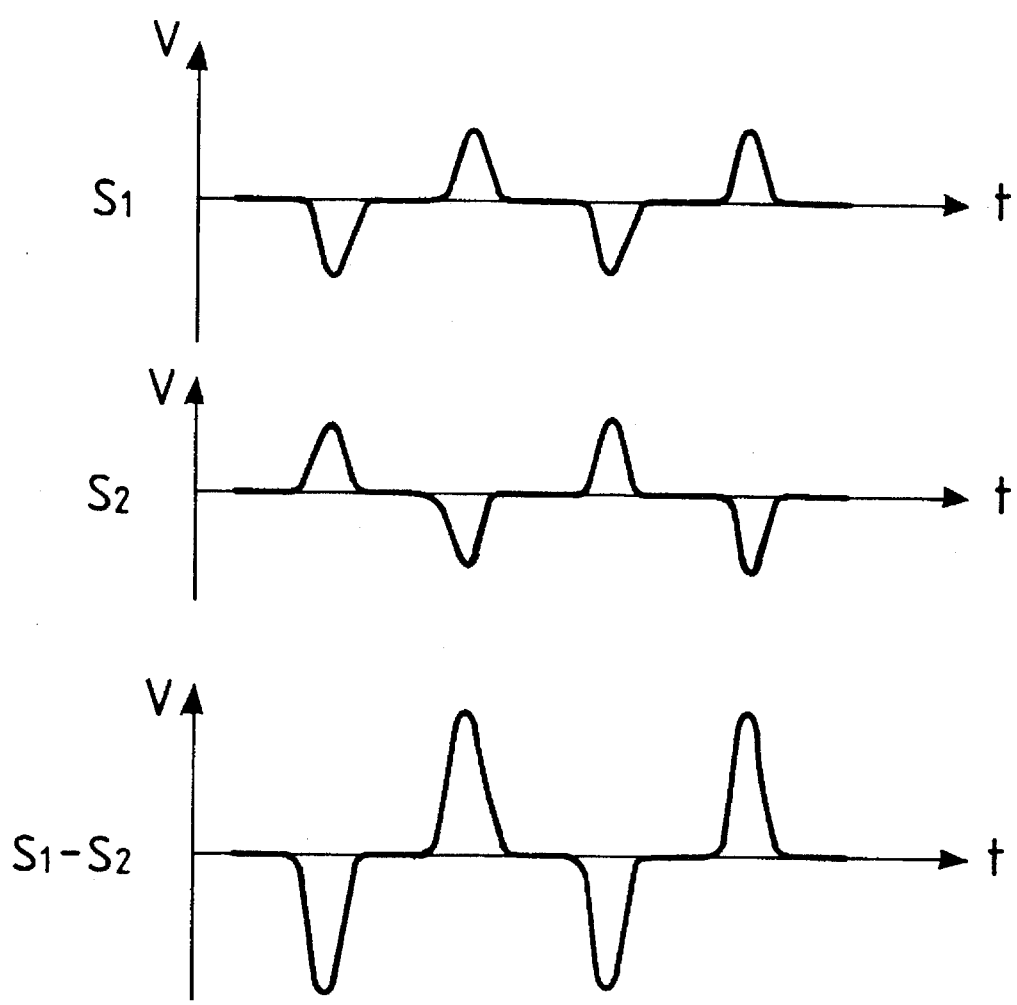

FIG. 54
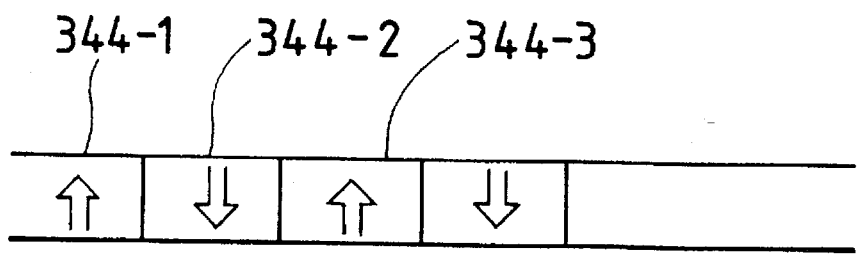
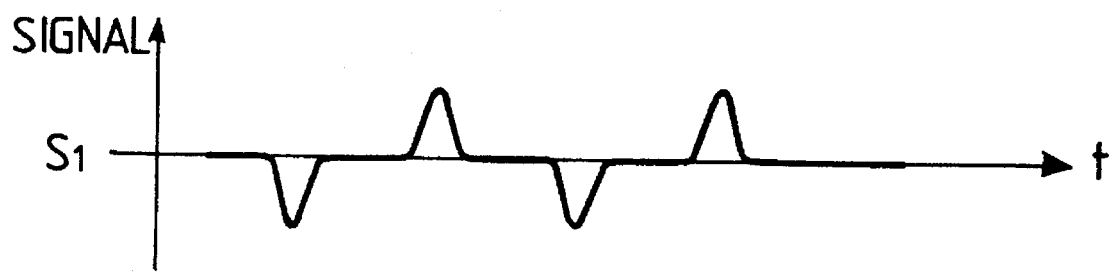
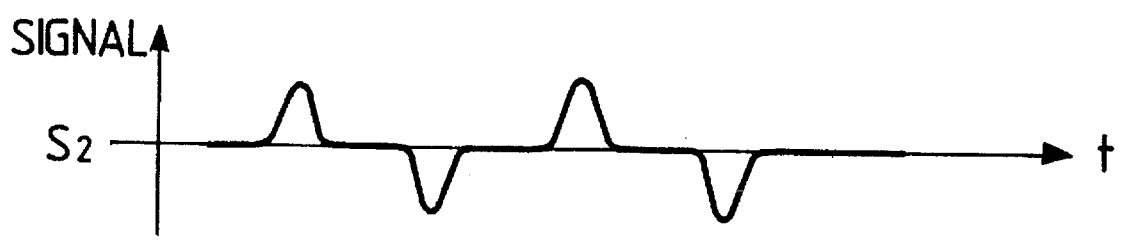
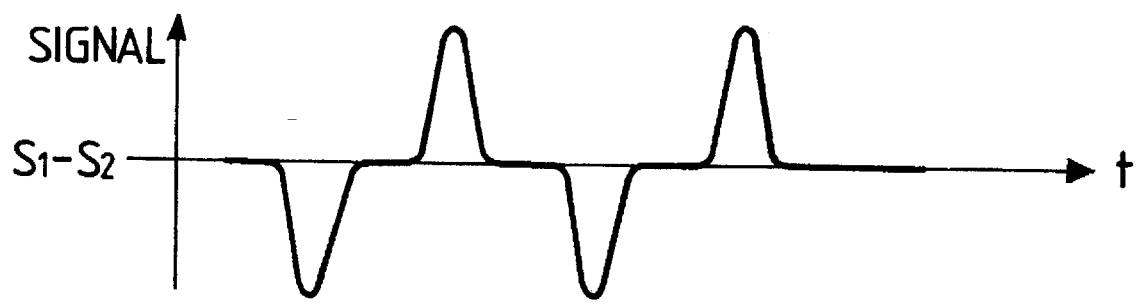

OPTICAL INFORMATION RECORDING/REPRODUCING APPARATUS FOR ACCURATELY DETECTING MAGNETIC DOMAIN EDGES

This application is a continuation of prior application, Ser. No. 07/670,253 filed Mar. 15, 1991, now abandoned.

BACKGROUND AND SUMMARY OF THE INVENTION

The present invention relates to an optical information recording/reproducing apparatus for recording and/or reproducing information on optical or opto-magnetic information recording media such as optical disks, and more particularly to an optical information recording/reproducing apparatus with an improved optical head section to reproduce information recorded on the recording media.

Optical information recording/reproducing apparatuses have been utilized in combination with external storage means for computers because information recording media used have larger data storage capacity per unit size thereof. Above all, opto-magnetic information recording media are especially useful owing to its capability of rewriting data. As techniques of recording/reproducing information by the use of such storage means, there are known an inter-mark recording technique (pit position recording technique) and a mark length recording technique (pit edge recording technique). The latter technique is generally thought as more advantageous than the former technique as far as increasing the data capacity. In order to precisely reproduce information from recording media recorded using the latter technique, however, it is required for an optical head section to precisely read edge positions of information bits.

In optical heads for opto-magnetic recording media, data are usually recorded by condensing a light beam of a semiconductor laser as a light source to a small or minute spot, and irradiating the spot light onto a recording medium with the inter-mark recording technique. Also, the information is reproduced by differentially detecting change in the intensity of light resulted from the small spot light being reflected by information bits.

In such a conventional differentially detecting technique, a polarized light beam splitter, the direction of which polarizing axis forms 45 degrees with respect to the direction of polarization of the incident linearly polarized light, is used to divide the reflected light from the recording medium into two beams of signal light. Two signals are respectively detected from both the beams to create a differential signal.

In case the conventional optical head relying on the above-stated differential detection is applied to the mark length recording technique, however, use of single small spot light having a distribution of light intensity like the Gauss distribution so far known in the art would lead to a problem below. Thus, when differentially detecting change in the intensity of reflected light from information bits, a light detector used in the conventional optical head exhibits a reduced edge detecting capability for detection of change in the intensity of entire reflected light, because the distribution of intensity of the irradiated spot light is given by the Gauss distribution spreading to some extent.

The present invention has been made in view of the state of art as mentioned above, and has for its object to provide an optical information recording/reproducing apparatus equipped with an optical head section having a high edge detecting capability when the information recorded by the mark length recording technique is reproduced.

To achieve the above object the present invention provides an optical information recording/reproducing apparatus in which a light beam from a semiconductor laser is led in the form of a small spot by a light irradiating optical system through an objective lens to an information track formed on an opto-magnetic information recording surface, and the light reflected by or transmitted through the information recording surface is led to a light detector by a light receiving optical system through the objective lens, thereby optically reading the information recorded on the information recording surface, wherein the light detector is provided on the optical axis of the light receiving optical system and has an effective light receiving surface almost equal to the airy disk size determined by resolving power of the light receiving optical system, and only that polarized component which is newly produced under the magneto-optic effect, of the polarized component of the reflected or transmitted light, is focused as a light spot onto the light receiving surface through the light receiving optical system, whereby edges of (or between) the information magnetic domains recorded on the information track are detected from a signal output of the light detector.

To achieve the above object, the present invention also provides an optical information recording/reproducing apparatus in which a beam of linearly polarized light from a semiconductor laser is led to an opto-magnetic information recording surface by a light irradiating optical system, and the light reelected by the information recording surface is led to a light detector by a light receiving optical system through the light irradiating optical system so that the information recorded on the information recording surface is reproduced by utilization of the magneto-optic effect, wherein the semiconductor laser has small light emitting areas on both end faces thereof and is provided with a reflection preventive film on at least the end face near the light irradiating optical system; a polarized light selecting optical element allowing the linearly polarized light from the semiconductor laser to pass there-through and a polarizing direction rotator optical element for rotating the plane of polarization of the linearly polarized light by 90 degrees after it reciprocates there-through are both disposed in the light irradiating optical system; and the reflected light from the information recording surface is focused as a light spot again onto the light emitting area of the semiconductor laser by the light irradiating optical system, whereby edges of the magnetic domains as components of the magnetic information recorded on the information recording surface are detected by detecting change in the intensity of light emitted from the semiconductor laser.

To achieve the above object, the present invention further provided an optical information recording/reproducing apparatus in which a beam of linearly polarized light from a semiconductor laser is irradiated in the form of spot light onto an opto-magnetic information recording surface through an objective lens; the reflected or transmitted light of the spot light is separated into a light beam having the polarized component newly produced under the magneto-optic effect at the information recording surface and a light beam having the polarized component perpendicular to the above polarized component; both or either one of the separated two light beams is subjected to adjustment of the light intensity independently; the adjusted two light beams are combined with each other under interference with their directions of polarization aligned with each other; and the composite light beam is focused by a light receiving optical system, whereby edges of the information magnetic domains recorded on an information track of the information recording surface are detected by using output signals from at least two independent light receiving surfaces of a light detector located near the focal point.

To achieve the above object, the present invention still further provides an optical information recording/reproducing apparatus in which a beam of linearly polarized light from a semiconductor laser is irradiated in the form of spot light onto an opto-magnetic information recording surface through an objective lens; a polarizing direction rotator optical element is provided to receive the reflected light beam of the spot light for rotating the direction of polarization of the linearly polarized light by 90 degrees in a partial area of the received light beam; a phase difference adjuster optical element is provided to adjust a phase difference between phase of the light beam in the above area and the light beam out of the above area; the light beam portion rotated in the direction of polarization thereof and the light beam portion not rotated in the direction of polarization thereof are interfered with each other; and distribution of the intensity of the interference light beam is detected by a photoelectric transducing light detector spatially divided into parts, whereby edges of the information magnetic domains recorded on the information recording surface are detected by using a differential signal between output signals from the photoelectric transducing light detector.

To achieve the above object, the present invention still further provides an optical information recording/reproducing apparatus in which a beam of linearly polarized light from a semiconductor laser is irradiated in the form of spot light onto a single information track on the information recording surface of an opto-magnetic information recording medium through an objective lens; the reflected light beam of the spot light is led to a light receiving optical system; the received light beam thus led is divided into first and second regions in the direction of the information track; and the divided light beams are led to a pupil dividing and focusing system for focusing the light beam in the first region onto a first elemental photoelectric transducing light detector and the light beam in the second region onto a second elemental photoelectric transducing light detector, respectively, whereby edges of the information magnetic domains recorded on the information recording surface are detected by using a differential signal between output signals from the elemental photoelectric transducing light detector.

BRIEF DESCRIPTION OF THE DRAWINGS

FIG. 45 is a chart showing the behavior of detection signals from photoelectric transducers.

FIG. 54 is a chart showing signals from the photoelectric transducers.

DESCRIPTION OF THE PREFERRED EMBODIMENT

Figure 1:
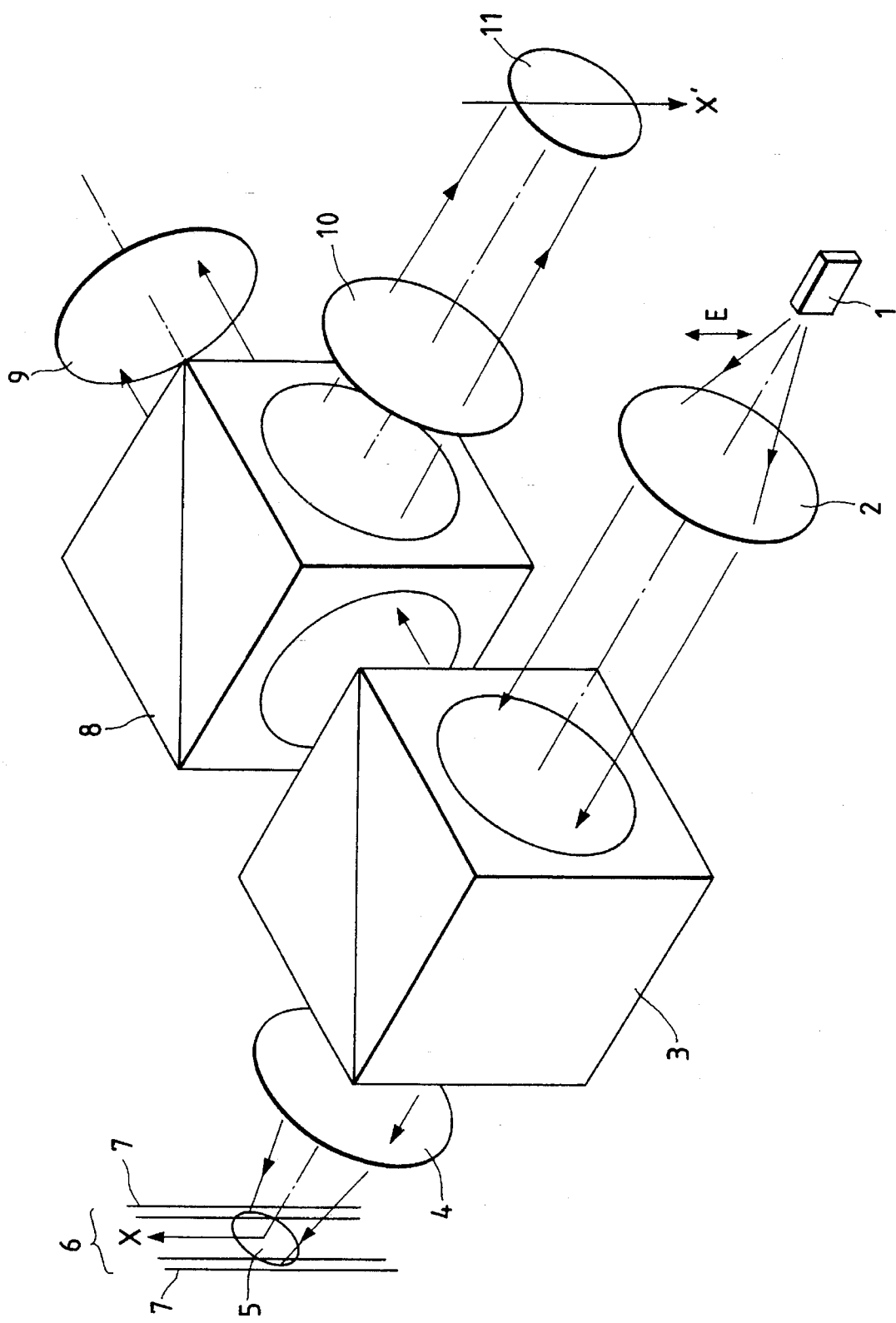
FIG. 1 is a view showing a first embodiment of an optical head for use in an optical information recording/reproducing apparatus of the present invention.

Hereinafter, preferred embodiments of the present invention will be described in detail with reference to the drawings. An embodiment shown in FIG. 1 is implemented as an optical head section for use in an optical information recording/reproducing apparatus of the present invention. In FIG. 1, denoted by reference numeral 1 is a semiconductor laser emitting a beam of linearly polarized light (the direction of which field vector is indicated by E) of wavelength $\lambda_1$ ($\lambda_1$=830 nm), for example. This light beam is converted into a parallel light beam by a collimator lens 2 and impinged upon a first polarized light beam splitter 3. Here, most of the polarized component in the direction E passes through the first polarized light beam splitter 3, but the polarized component in the direction perpendicular to E is reflected 100% thereby. Then, the light beam having passed through the first polarized light beam splitter 3 is Condensed by an objective lens 4 to form a light spot 5 on one information track 6 defined over an opto-magnetic disk (recording medium). The opto-magnetic disk is formed with guide grooves 7 for tracking control along the information track 6. The light reflected by or transmitted through the information track 6 is directed from the objective lens 4 via the first polarized light beam splitter 3 to a second polarized light beam splitter 8 where it is divided into two light beams. One light beam is taken out like the passing-through wave front 9, while the other beam is led to a photoelectric transducer 11 via a sensor lens 10.

When recording information on the information track 6 defined over the opto-magnetic disk (recording medium), the light Spot 5 is irradiated to the information track 6, while applying an external magnetic field to the irradiated portion by a magnetic head (not shown), so that an information signal is recorded there.

In the above arrangement, the light beam emitted from the semiconductor laser 1 is linearly polarized light. Let now it be assumed that the direction E of field vector of the linearly polarized light corresponds to the direction of P-polarized light, and the direction perpendicular to E corresponds to the direction of S-polarized light. When the light beam is irradiated to the opto-magnetic disk, it is focused as the light spot 5 on an opto-magnetic recording film made of TbFeCo or like. The reflected light beam from the opto-magnetic recording film has an S-polarized component perpendicular to the direction E because it has been subjected to the magnetic Kerr effect on the film. This S-polarized component is all reflected by the first polarized light beam splitter 3, and a part of the polarized component originally in the P-direction is also reflected thereby, so that both the components are incident upon the second polarized light beam splitter 8. The second polarized light beam splitter 8 has characteristics to reflect 100% of the S-polarized component and passes 100% of the P-polarized component therethrough. Thus., the light beam having passed through the second polarized light beam splitter 8 as the passing-through wave front 9 is all the P-polarized component. This P-polarized component is led to an AF detection optical system for auto-focusing control and/or an AT detection optical system for autotracking control (both not shown). These detection optical systems can be implemented using any of various techniques known so far.

On the other hand, the light beam of S-polarized component reflected by the second polarized light beam splitter 8 is focused by the sensor lens 10 to enter the photoelectric transducer 11.

Figure 2:
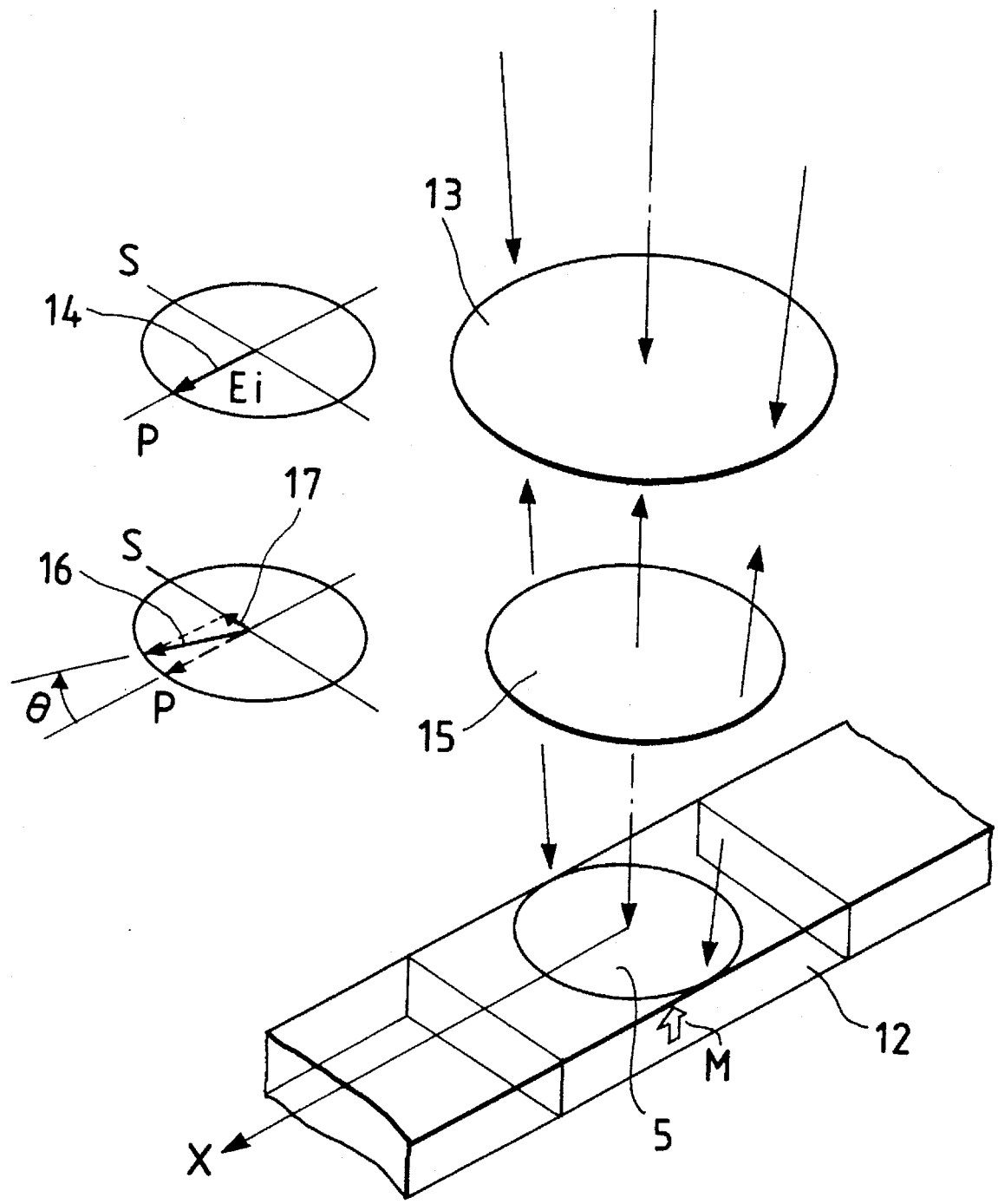
FIG. 2 is a view showing the behavior as occurred when a light spot is incident upon one information magnetic domain.

FIG. 2 illustrates the behavior as occurred when the light spot 5 is incident upon one information magnetic domain 12 (magnetized in a direction M) recorded in the information track on the opto-magnetic recording film. Assuming that the field vector of an incident light beam 13 forming the light spot 5 is Ei, the direction of Ei corresponds to the above direction E in FIG. 1 and is indicated by reference numeral 14. When the incident light beam 13 is reflected as the light spot 5 by the opto-magnetic recording film, it undergoes the magnetic Kerr effect so that the direction of polarization of the linearly polarized light is rotated by θ depending on the direction of magnetization of the information magnetic domain 12, and the field vector of a reflected light beam 15 is indicated by reference numeral 16. The S-polarized component of that field vector is indicated by 17. In case of FIG. 2, since the information magnetic has no edge in the light spot, the reflected light Seam has no information about any edge. In this case, only the S-polarized component 17 is focused on the photoelectric transducer and any edge information of the information magnetic domain is not contained in the reflected light beam, whereby the reflected light beam has no phase distribution in the wave front thereof. As a result, the S-polarized component of the reflected light beam is focused by the sensor lens 10 on the photoelectric transducer 11 in the form of normal single spot light.

Figure 3:
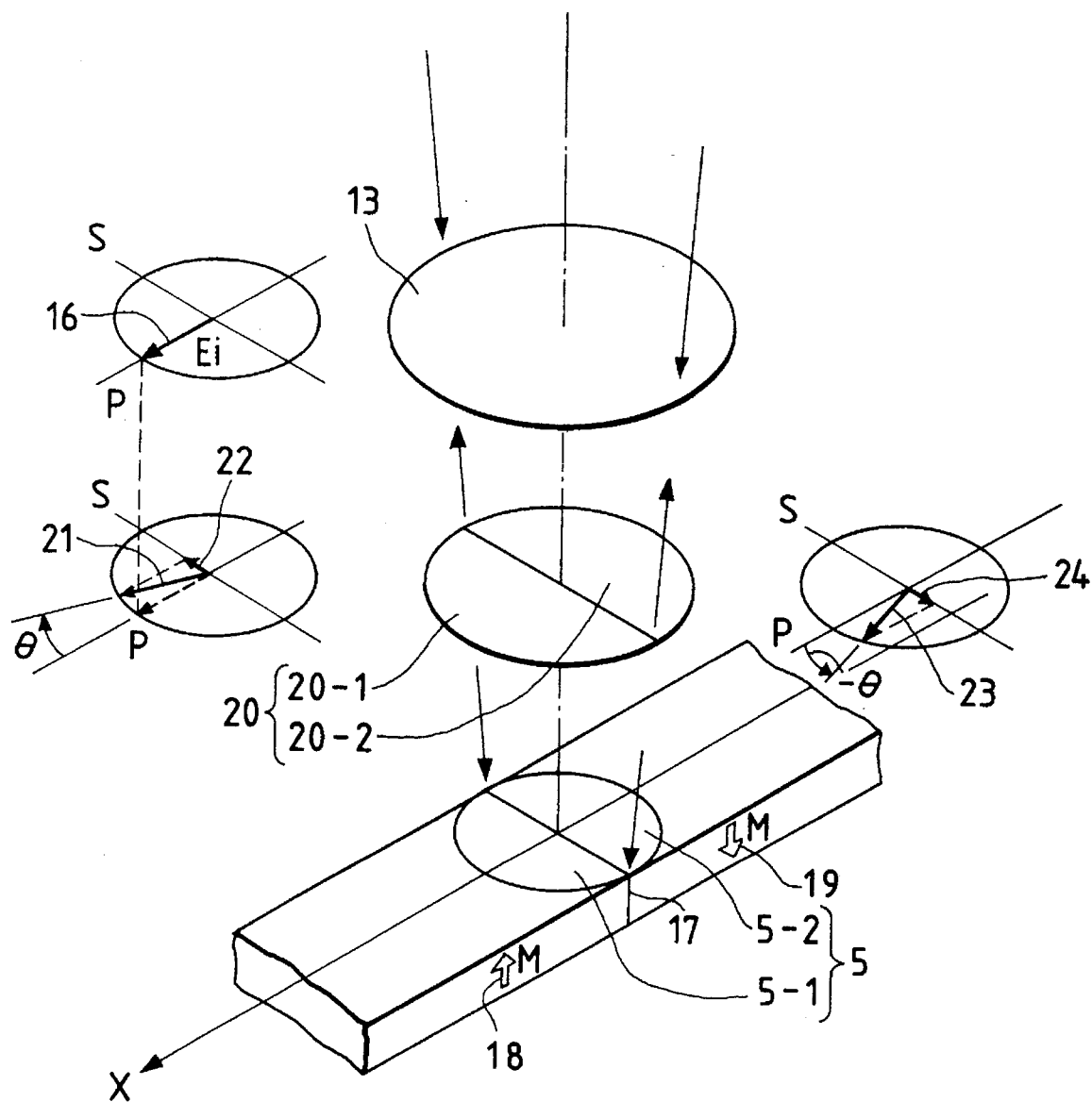
FIG. 3 is a view showing the behavior as occurred when a light spot is incident upon an edge of the information magnetic domain.

FIG. 3 is a view showing the behavior as occurred when the light spot 5 is incident upon an edge of (or between) the information magnetic domain(s) recorded in the information track on the opto-magnetic recording film. The direction of field vector of the incident light beam is the same as FIG. 2 and indicated by 16. The information magnetic domains upon which the spot light 5 impinges are magnetized in opposite directions as indicated by arrows 18, 19 with an edge 17 therebetween. Assuming that the region of the wave front of the incident spot light 5 under an influence of the magnetization 18 is 5-1 and the region thereof under an influence of the magnetization 19 is 5-2, the light in the wave front region 5-1 undergoes the magnetic Kerr effect due to the magnetization 18, and beam portion 20-1 of the reflected light beam 20 corresponding to the region 5-1 is subjected to Kerr rotation in the same direction as the above case of FIG. 2. The resulting field vector of the beam portion 20-1 is indicated by 21 and its S-polarized component by 22. Meanwhile, the light in the wave front region 5-2 undergoes the magnetic Kerr effect due to the magnetization 19, and beam portion 20-2 of the reflected light beam 20 corresponding to the region 5-2 is rotated in the plane of polarization thereof in the opposite direction to the beam portion 20-1. The resulting field vector of the beam portion 20-2 is indicated by 23 and its S-polarized component by 24.

As apparent from comparison between the S-polarized components 22 and 24, their directions are opposite to each other. In other words, phase distribution of the S-polarized component of the reflected light beam 20 is out of phase by $\pi$ between the two regions Separated by the edge 17 of the information magnetic domain.

Figure 4:
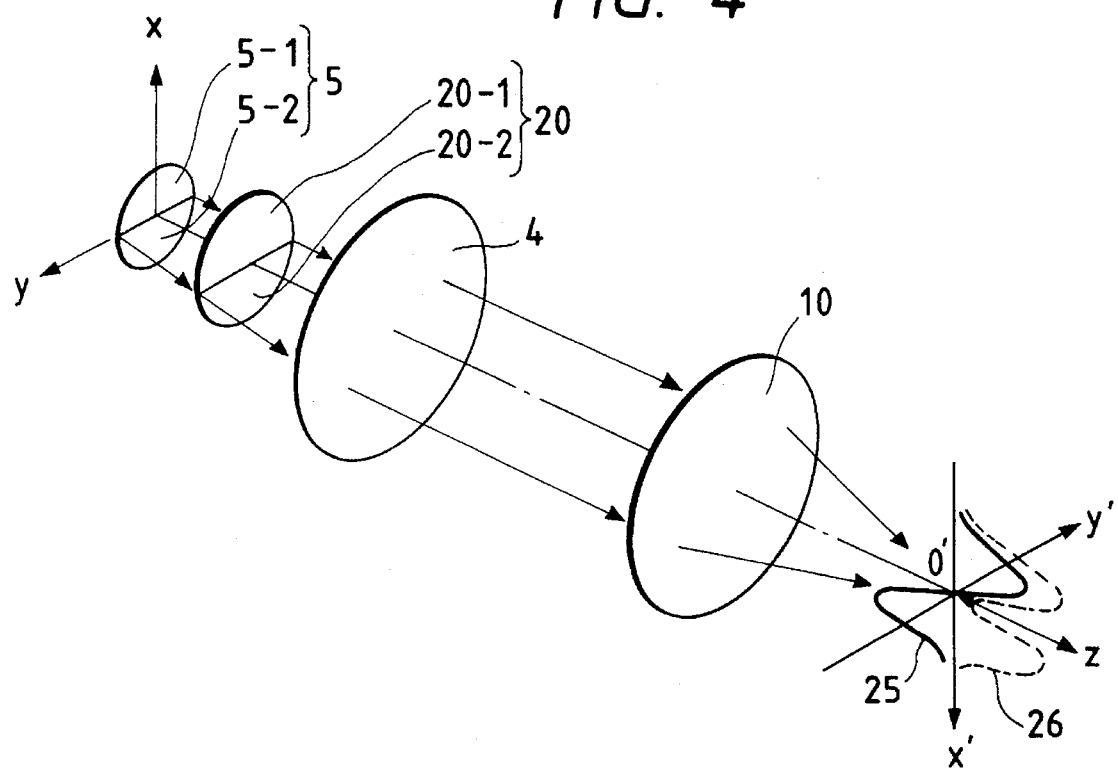
FIG. 4 is a view showing the focusing relation for S-polarized light of the wave front in FIG. 3.

FIG. 4 illustrates the focusing relation of a light receiving optical system for S-polarized light of the wave front in FIG. 3. In case of these drawings, the light spot 5 incident upon the opto-magnetic recording film is reflected thereby such that the S-polarized components in the wave front of the reflected light beam 20 have a phase difference $\pi$ between the beam portions 20-1 and 20-2. When the reflected light beam 20 is focused by the sensor lens 10 after passing through the objective lens 4, it becomes not a single light spot, but two light spots owing to the above phase difference. This results in amplitude distribution 25 lowered down to zero at its central portion, and thus intensity distribution being dark at its central portion as indicated by 26. The size of the dark central portion is almost equal to the size of an airy disk determined by resolving power of the light receiving optical system comprising the objective lens 4 and the sensor lens 10. Thus, the size of the airy disk is determined by both the wavelength of the light beam incident upon the light receiving optical system and he numerical aperture (NA) of the light receiving optical system.

Figure 5:
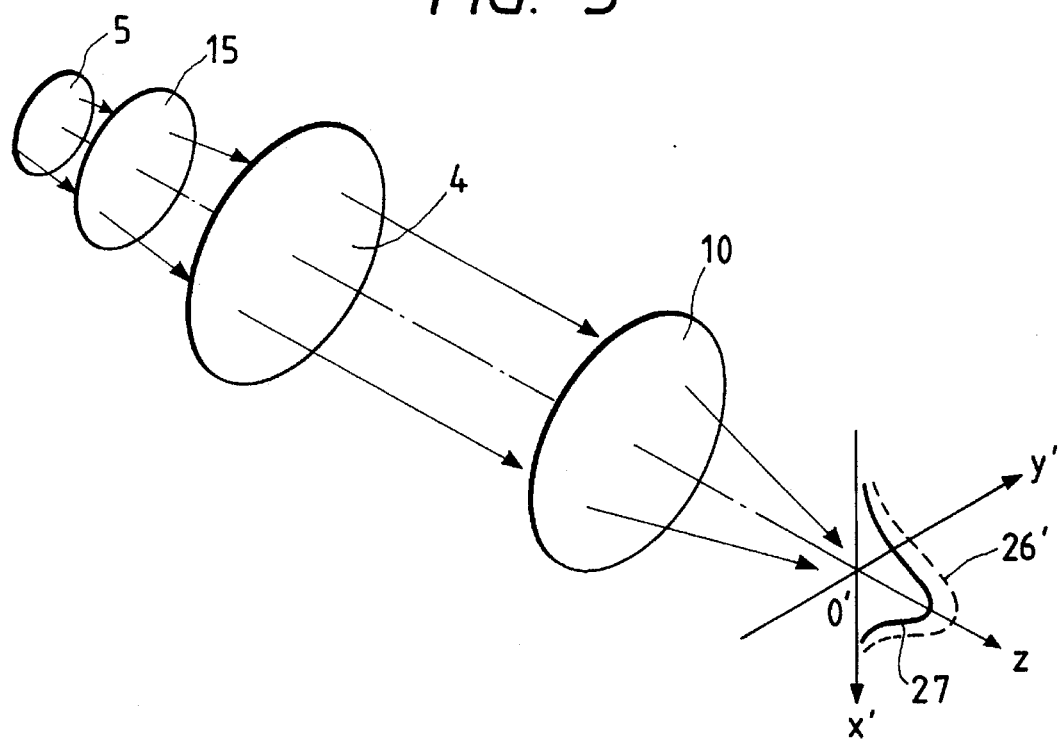
FIG. 5 is a view showing the focusing relation for S-polarized light of the wave front in FIG. 2.

FIG. 5 illustrates the focusing relation of the light receiving optical system for the S-polarized light in case of FIG. 2. In this case, because the S-polarized components in the wave front of the reflected light beam 15 have no phase difference therebetween as explained in connection with FIG. 2, intensity distribution is developed similarly to the light distribution of a normal focused spot. The amplitude distribution of this single light spot is indicated by 27, and the intensity distribution has the lightest portion at its center as depicted by 26'.

Accordingly, with the size of light receiving surface of the photoelectric transducer 11 set almost equal to the airy disk, the presence or absence of edge of the information magnetic domain in the light spot can be determined by judging an output signal level from the transducer 11. More specifically, the detected output of the photoelectric transducer 11 is compared with a preset value in a comparison and decision circuit. If the detected output is higher than the preset value, the comparison and decision circuit outputs a signal indicating the absence of an edge. Conversely, if the detected output is lower than the preset value, the comparison and decision circuit outputs a signal indicating the presence of an edge. Thus, the above embodiment enables it to precisely detect the edge just by modifying the conventional optical system to some extent.

Figure 6:
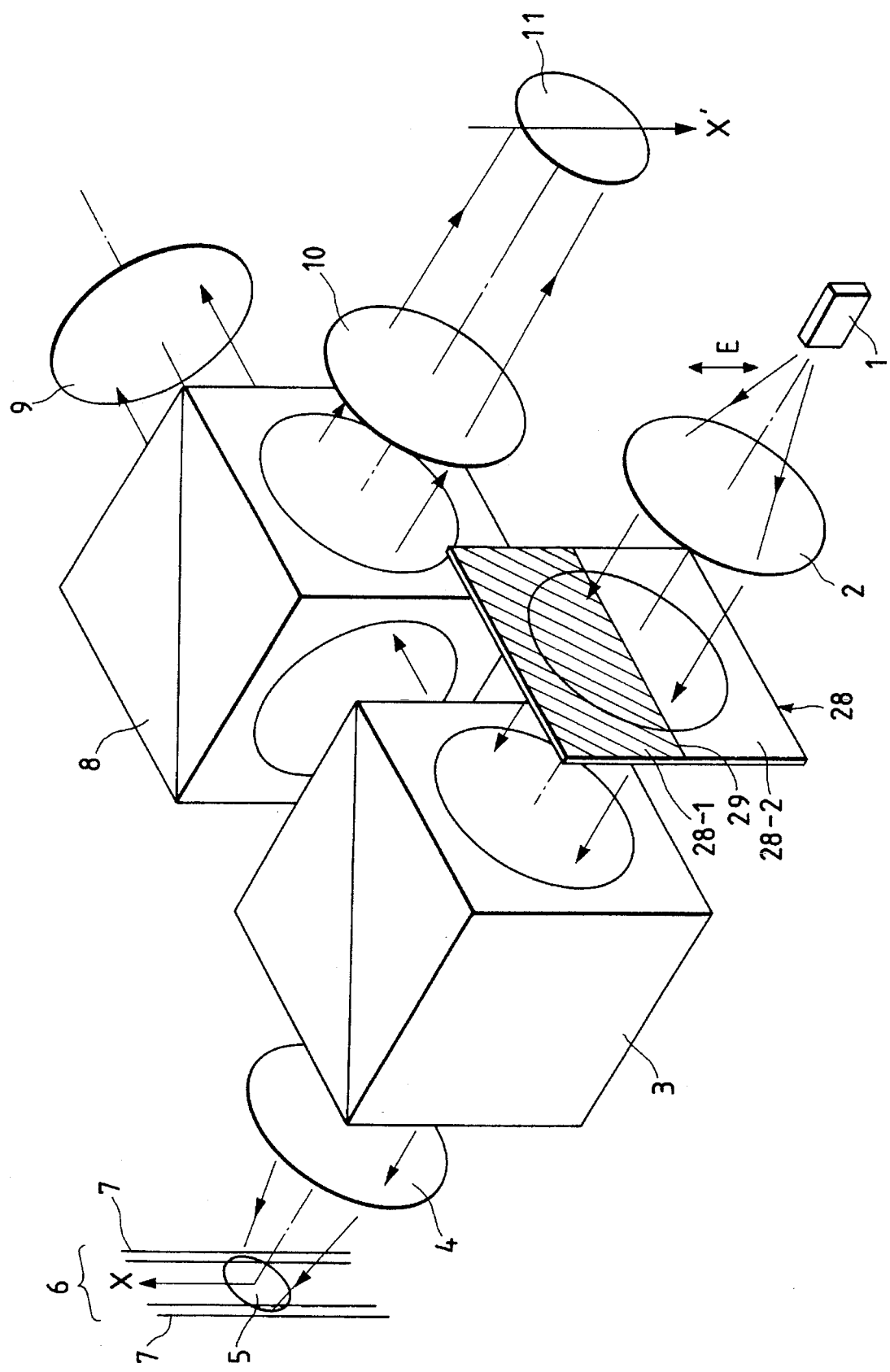
FIG. 6 is a view showing a second embodiment of an optical head for use in an optical information recording/ reproducing apparatus of the present invention.

In the above embodiment, as mentioned above, the output of the photoelectric transducer is substantially zero when the edge of an information bit is present within a spot of the irradiated light beam. However, it is usually advantageous in signal processing that an output pulse is generated when the edge is present. In view of this point, the following embodiment is more preferable to implement. Stated otherwise, an arrangement shown in FIG. 6 is proposed as another embodiment of the present invention. FIG. 6 also illustrates an optical head section for use in an optical recording/reproducing apparatus as with FIG. 1 described hereinbefore. Those members in FIG. 6 which are common to FIG. 1 will not be explained here. In this embodiment, a phase plate 28 is disposed behind or downstream of the collimator lens 2 in FIG. 2. The phase plate 28 is divided into two regions 28-1 and 28-2 by a straight line 29 including the optical axis. An optically transparent dielectric film with a refractive index n and a thickness D is provided in the region 28-1. Among the thickness D, the refractive index n, and the wavelength $\lambda$ of the light beam from the semiconductor laser, there holds the following relationship:

$$2\pi(n-1)\cdot D/\lambda = \pi$$

Accordingly, the irradiated light beam has a phase difference $\pi$ between the wave fronts corresponding to the two regions.

The light beam passing through the phase plate is focused by he objective lens 4 via the first polarized beam splitter 3. At this time, therefore, the phase difference $\pi$ produced by the phase plate 28 is present in the light spot irradiated onto the information track 6.

Figure 7:
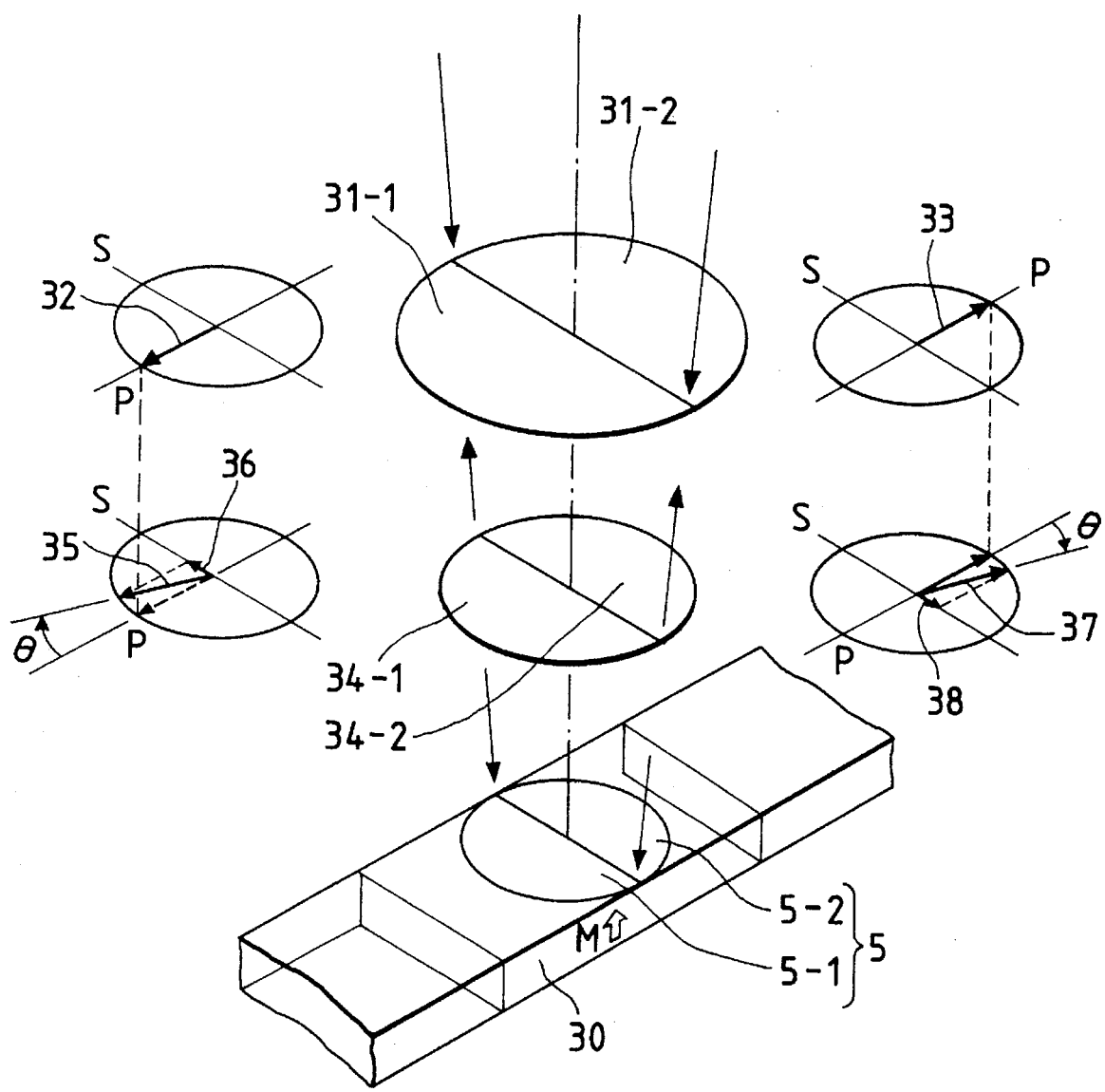
FIG. 7 is a view showing the behavior as occurred when a light spot is incident upon one information magnetic domain.

FIG. 7 illustrates the behavior as occurred when the light spot 5 in FIG. 6 is incident upon one information magnetic domain 30. In this case, since he phase difference $\pi$ produced by the phase plate is present in an irradiated light beam 31, there is also caused a phase difference $\pi$ between two portions 31-1 and 31-2 of the irradiated light beam 31 corresponding to the regions 28-1 and 28-2 of the phase plate. Assuming the field vector of one beam portion (wave front) 31-1 to be indicated by 32, therefore, the field vector of the other beam portion (wave front) 31-2 is indicated by 33. This phase difference of the irradiated wave fronts is further brought into the wave fronts of the light spot 5, causing a phase difference $\pi$ to be present between the wave fronts 5-1 and 5-2 as well. Consequently, the similar phase difference is also present in a light beam 34 which has been reflected by one information magnetic domain 30 and subjected to the magnetic Kerr effect, whereby the wave fronts 34-1, 34-2 of the light beam 34 have their field vectors respectively indicated by 35, 37. The S-polarized components of these wave fronts are indicated by 36, 38 which have also a phase difference $\pi$ therebetween.

Figure 8:
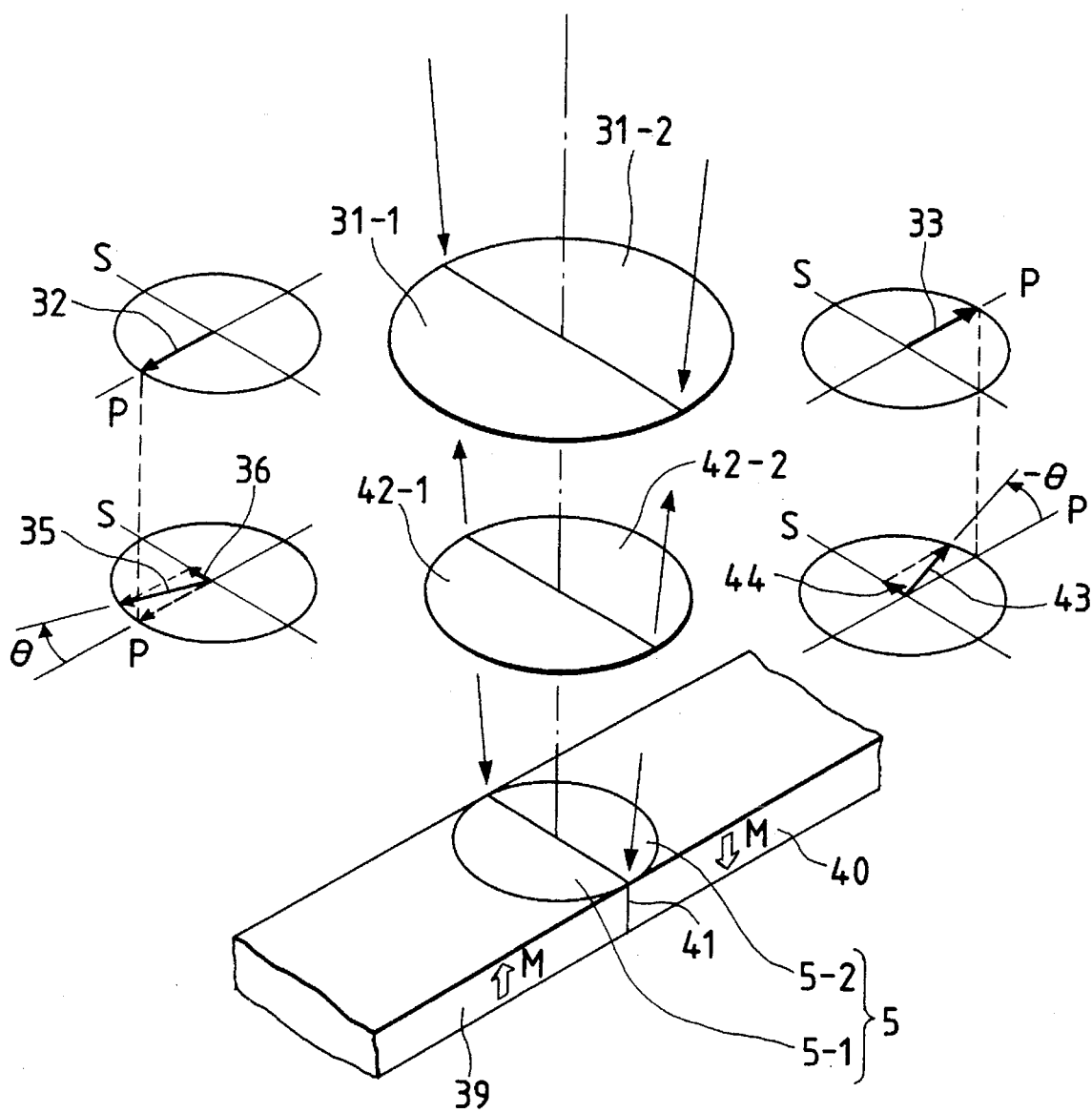
FIG. 8 is a view showing the behavior as occurred when a light spot is incident upon an edge of the information magnetic domain.

FIG. 8 illustrates the behavior as occurred when an edge 41 of information magnetic domains 39, 40 is present in the light spot 5. Here, respective field vectors of the Wave fronts 31-1, 31-2 of the irradiated light beam 31 are expressed as with the above case of FIG. 7. In FIG. 8, the information magnetic domain 39 upon which the light spot 5-1 impinges is magnetized similarly to FIG. 7 and subjected to the magnetic Kerr effect in a like manner. The field vector of the reflected wave front 42-1 corresponding to the light spot 5-1 can be expressed by 35 like FIG. 7, and has its S-polarized component indicated by 36.

Meanwhile, the information magnetic domain 40 upon which the light spot 5-2 impinges is magnetized in the opposite direction, so that the field vector of the reflected wave front 42-2 can be expressed by 43 and has its S-polarized component indicated by 44.

In the embodiment shown in FIG. 6, therefore, the phase difference π present in the irradiated light spot causes a state of no phase difference between the S-polarized components of the reflected wave fronts, when the edge of the information magnetic domain is present in the light spot, on contrary to the above first embodiment. As a result, the spot light formed on the photoelectric transducer by being focused by the light receiving optical system exhibits the same intensity distribution as shown in FIG. 5.

Figure 9:
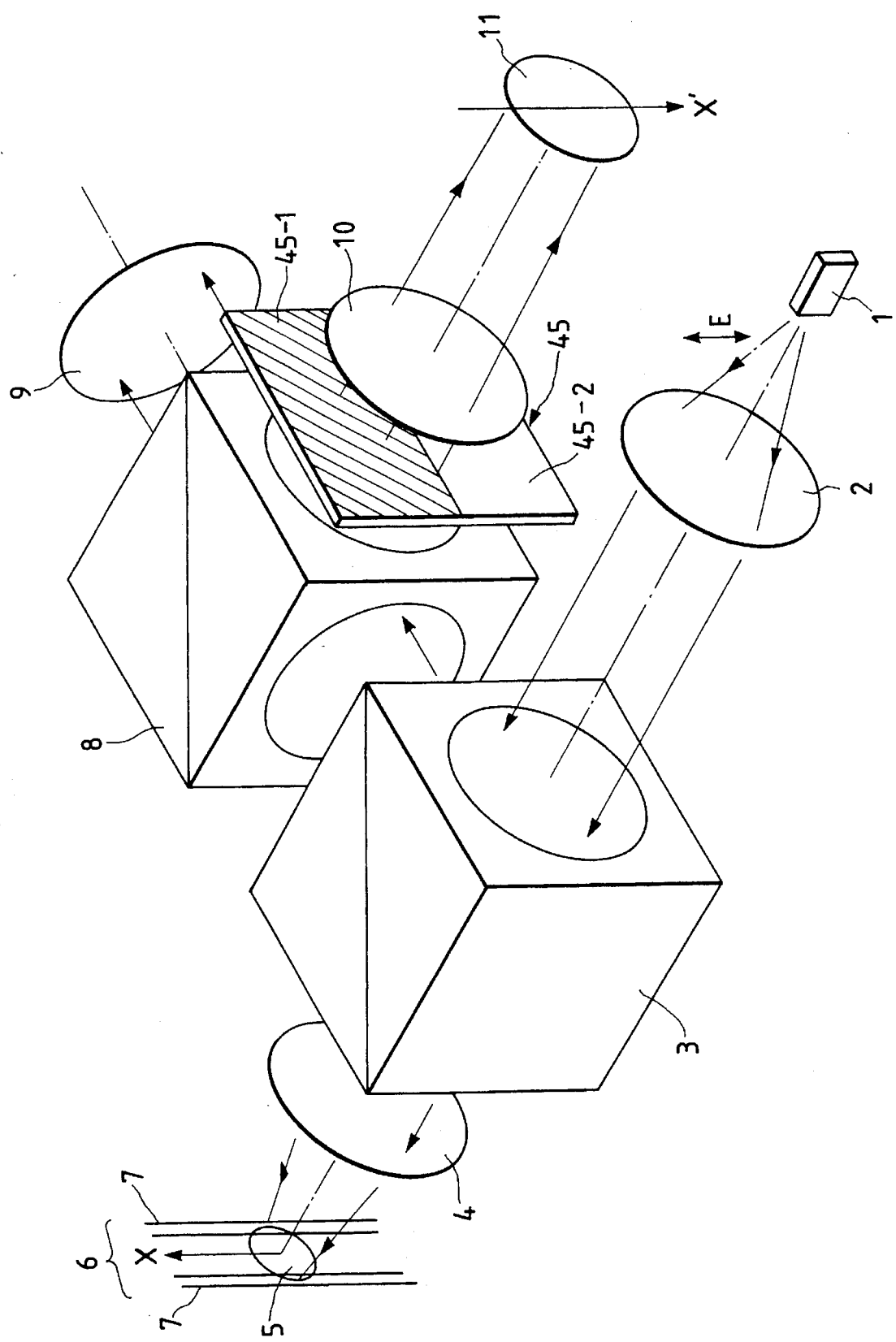
FIG. 9 is a view showing a third embodiment of an optical head for use in an optical information recording/reproducing apparatus of the present invention.

While the size of the spot light in this second embodiment becomes larger than that in the first embodiment because of the phase difference applied to the irradiated light beam, the spot light incident upon the photoelectric transducer gets bright at its central portion when the edge of the information magnetic domain is present in the light spot. This allows the photoelectric transducer to generate an output signal of large amplitude. In this Case, conversely to the above first embodiment, if the detected output of the photoelectric transducer is higher than the preset value, the comparison and decision circuit outputs a signal indicating the presence of an edge, whereas if the detected output is lower than the preset value, the comparison and decision circuit outputs a signal indicating the absence of an edge. In this way, the presence or absence of the edge is determined A third embodiment shown in FIG. 9 is arranged with an aim at reducing the light spot size like the first embodiment to maintain high resolving power. FIG. 9 also illustrates an optical head section for use in an optical recording/reproducing apparatus as with FIG. 1 described hereinbefore. Those elements in FIG. 9 which are common to FIG. 1 will not be explained here. In this embodiment, denoted by 45 is a phase plate disposed in the light receiving optical system. The phase plate 45 is divided into two regions 45- and 45-2 by a straight boundary line 46 including the optical axis of the light receiving optical system and being perpendicular to the direction of the information track. The phase plate 45 is provided with a phase film giving a phase difference π between the light beams passing through the respective regions. Thus, the phase plate 45 is a member similar to the phase plate 28 shown in FIG. 6.

In this embodiment, the irradiated light beam is the same as FIG. 1, and the phase differences in the reflected light beam from one and two information magnetic domains are also the same as FIGS. 2 and 3. But, since the phase plate 45 is disposed in the light receiving optical system, the reflected light beam from the information edge is compensated in the phase difference between its two wave fronts before it is focused on the photoelectric transducer, while passing through the light receiving optical system, so that the focused spot light exhibits the intensity distribution of normal spot light. Stated Otherwise, when the edge of the information magnetic domain is present on the optical axis of the irradiated spot light, the reflected light beam is focused to a light spot having a single intensity peak like a normal light spot. As a result, the photoelectric transducer outputs an output similar to that in the above second embodiment. Furthers, unlike the second embodiment, no optical element for dividing the wave front of the irradiated light beam is provided in the light irradiating optical System in the third embodiment. Therefore, the size of light spot irradiated onto the information track will not be increased and thus the resolving power reading information will not be lowered.

Although the above embodiments are described as focusing a spot image on the light receiving surface of the photoelectric transducer, this arrangement gives rise to a fear that sensitivity may be fluctuated depending On locations over the light receiving surface. To eliminate such a fear, it is preferable, by way of example, to set the light receiving surface of the photoelectric transducer at a position slightly defocused from the focal plane.

In this case, the size of effective light receiving surface of the photoelectric transducer is desirably increased somewhat corresponding to an increase in the spot size resulting from the defocused arrangement.

As described above, according to the present invention represented by the first to third embodiments, there is provided in an optical information recording/reproducing apparatus the features that a light beam from a semiconductor laser is led in the form of a small spot by a light irradiating optical system through an objective lens to an information track formed on an opto-magnetic information recording surface, and the light reflected by or transmitted through the information recording surface is led to a light detector by a light receiving optical system through the objective lens, thereby optically reading the information recorded on the information recording surface, wherein the light detector is provided on the optical axis of the light receiving optical system and has an effective light receiving surface almost equal to the airy disk size determined by resolving power of the light receiving optical system, and only that polarized component which is newly produced under the magneto-optic effect, of the polarized component of the reflected or transmitted light, is focused as a light spot onto the light receiving surface through the light receiving optical system, whereby edges of the information magnetic domains recorded on the information track are detected from a signal output of the light detector.

Also, the light beam forming the irradiated spot light may be divided at a boundary line including the optical axis and that is perpendicular to the direction of the information track, by an optical filter which produces a phase difference π between the light beams passing through the two regions.

Further, the reflected light or the transmitted light by or through the information recording surface maybe divided in the light receiving optical system at a boundary line including the optical axis and hat is perpendicular to e direction of the information track, by an optical filter which produces a phase difference π between the light beams passing through the two regions.

The present invention described above has an advantage of precisely detecting edges of the information magnetic domains by utilizing the S-polarized component produced by the opto-magnetic recording film under,the magnetic Kerr effect, without complicating the structure of a conventional opto-magnetic head.

Figure 10:
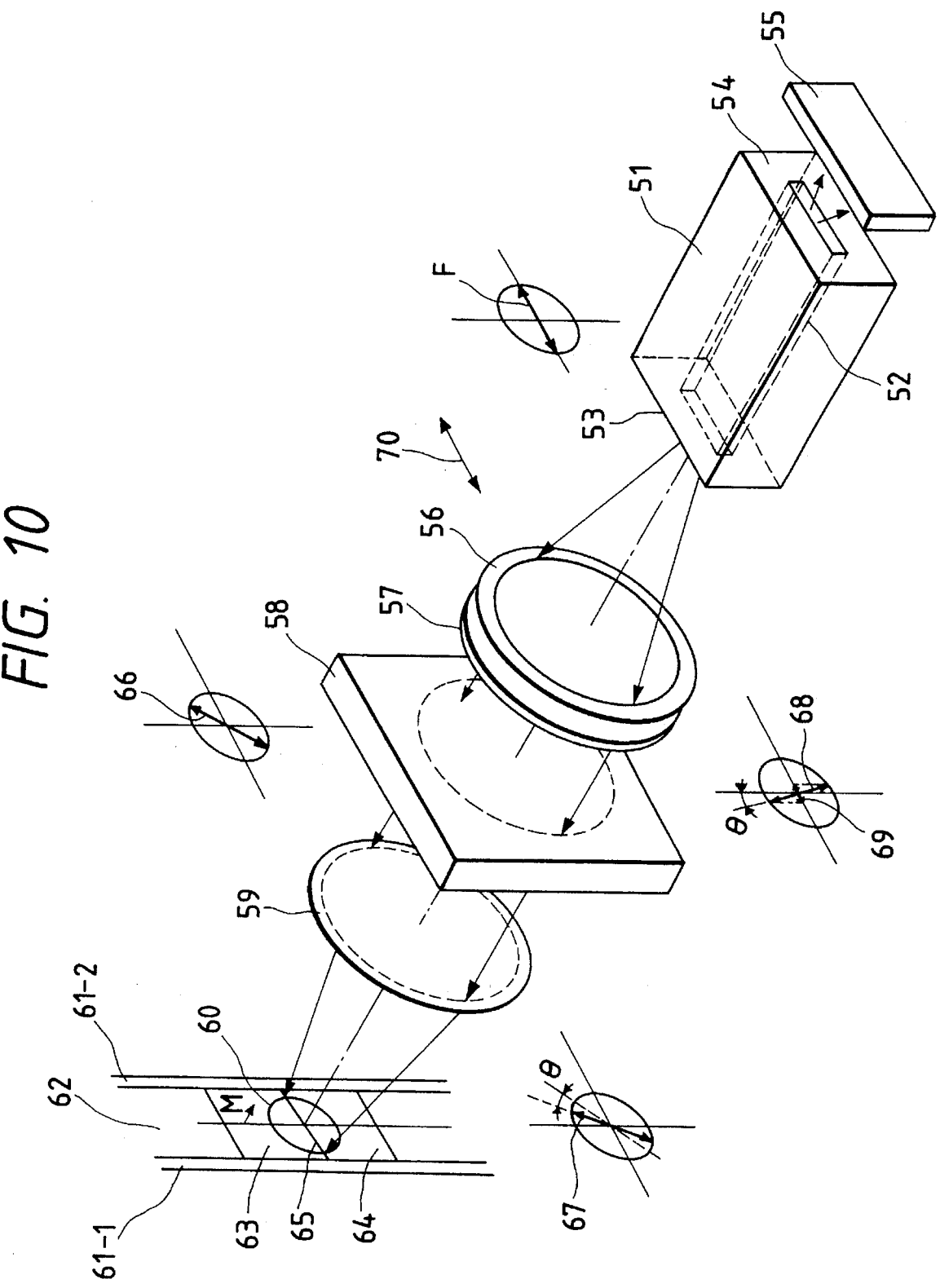
FIG. 10 is a view showing a fourth embodiment of an optical head for use in an optical information recording/ reproducing apparatus of the present invention.
Figure 11:
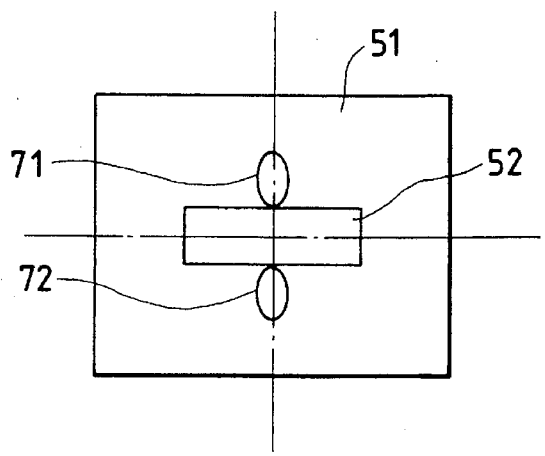
FIG. 11 is a view showing distribution of the intensity of spot light which is focused again on the emergent end face of a semiconductor laser in case of the information magnetic domain having an edge in the spot light.
Figure 12:
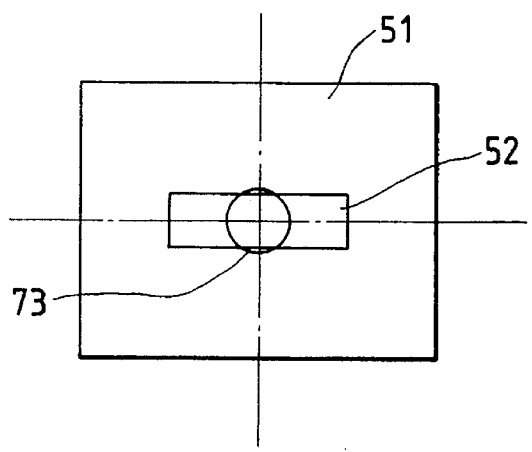
FIG. 12 is a view showing distribution of the intensity of spot light which is focused again on the emergent end face of the semiconductor laser in case of the information magnetic domain having no edge in the spot light.

Still another embodiment of the present invention will be described with reference to the subsequent drawings. FIGS. 10 to 12 are shown for explaining a fourth embodiment of the present invention.

FIG. 10 is a schematic view of the fourth embodiment of an optical head for recording and reproducing an opto-magnetic signal according to the present invention. In FIG. 10, denoted by 51 is a semiconductor laser which has a light waveguide layer 52 and emits abeam of linearly polarized light (the direction of which electric field is indicated by F in the drawing) with the wavelength λ. A reflection preventive film for that wavelength is provided on an end face 53 of the semiconductor laser from which the irradiated light beam is emergent. As with the normal semiconductor laser structure, an end face 54 on the opposite side is provided with no reflection preventive film and formed as a highly reflecting surface. 55 is a photoelectric transducer for detecting the intensity of light beam emergent from the end face 54. 56 is a collimator lens for converting the light beam from semiconductor laser into a parallel light beam, and the light emergent point of the semiconductor laser is located at the focus of the collimator lens. 57 is an analyzer as a polarized light selector optical element which passes most of the polarized component in the horizontal direction indicated by 70 therethrough, but absorbs 100% of the polarized component in a direction perpendicular thereto. 58 is a Faraday rotator which functions as follows. When the linearly polarized light having its field vector in the horizontal direction as indicated by F passes through the Faraday rotator 58, the direction of the field vector is rotated by 45 degrees counterclockwise as indicated by 66. 59 is an objective lens The light beam condensed by the objective lens 59 transmits through a transparent substrate of an opto-magnetic disk and forms a light spot 60 on an information track 62. 62 is one of information tracks defined on a recording medium surface of the opto-magnetic disk, and 61 is a guide groove provided for tracking control of the light spot.

When recording information on the information track 62 defined over the opto-magnetic disk (recording medium), the light spot 60 is irradiated to the information track 62, while applying an external magnetic field to the irradiated portion by a magnetic head (not shown), so that an information signal is recorded there.

Denoted by 63, 64 are information bits recorded on the information track 62, and are magnetized in the opposite directions in their regions. Let it to be assumed that the region 63 is magnetized parallel to the optical axis of the irradiated light beam and directing toward the objective lens 59 as indicated by M in the drawing, while the region 64 is magnetized in the direction opposite to M.

Before the light beam forming the light spot 60 is incident upon the region 63, the direction of field vector thereof is indicated by 66. But, the light beam reflected by the opto-magnetic recording film made of an amorphous alloy such as TbFeCo exhibits the direction of field vector rotated by θ as shown at 67, because it has been affected by the magnetization in the region 63. The reflected light beam is converted again into a parallel light beam by the objective lens 59, and the plane of polarization thereof is further rotated by 45 degrees when it passes through the Faraday rotator 58, resulting in the direction of field vector indicated by 68 in the drawing. This light beam further passes through the analyzer 57 only in its component 69 having the direction of field vector indicated by 70, and the component 69 is then focused by the collimator lens 56 again on the emergent end face of the semiconductor laser over which the reflection preventive film is coated.

On the other hand, the light beam forming the light spot 60 and reflected by the region 64 has its field vector rotated by −θ under an influence of the magnetization in the opposite direction. After passing through the Faraday rotator 58 and the analyzer 57, therefore, only the component represented by the field vector 69 is also focused again on the emergent end face of the semiconductor laser.

At this time looking at phase distribution of the reflected light beam on its wave front immediately after passage of the analyzer 57, but immediately before impingement upon the collimator lens 56, the field vectors of the two beam portions are rotated oppositely under an influence of opposite magnetization of the regions 63 and 64. Thus, the reflected light beam from the region 63 and the reflected light beam from the region 64 are out of phase by π. When the light beam having such wave front is refocused by the collimator lens 56, the presence of the phase difference π makes distribution of the light intensity on the emergent end face of the semiconductor laser 51 exhibit not single spot light, but two spot lights 71, 72 separated vertically above and below the light waveguide layer 52 (of which thickness is usually on the order of 1 μm), as shown in FIG. 11 (see Hiroshi Kubota, "Wave Optics", 1-st Ed., 285 pages, by Iwanami Publishing, 1971), In this case, therefore, the intensity of light reentering the light waveguide layer of the semiconductor laser 51 is reduced greatly, and so is the intensity of light emitted from the semiconductor laser 51.

FIG. 12 is a view showing distribution of the intensity of spot light which is focused again on the emergent end face of the semiconductor laser in case of the information magnetic domain having no edge present in the spot light irradiated onto the information track. In this case, since there occurs no phase difference π in the reflected light beam due to the magnetic domain edge, the reflected light beam exhibits the intensity distribution of a normally refocused light spot, so that spot light 73 is focused again on the light waveguide layer 52.

As a result, in this case, the intensity of light reentering the light waveguide layer of the semiconductor laser 51 is increased much greater than the case of FIG. 11, and so is the intensity of light emitted from the semiconductor laser 51.

Figure 13:
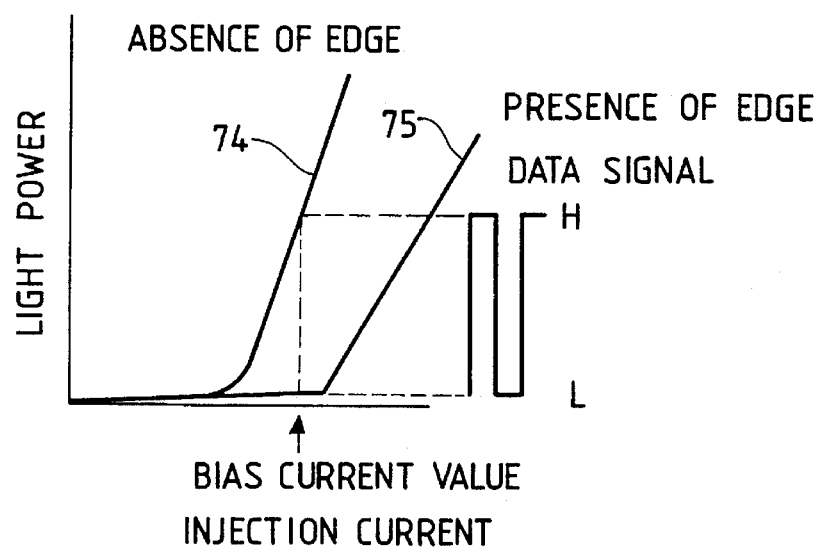
FIG. 13 is a graph showing the relationship between a drive current injected to the semiconductor laser and a detection signal.

FIG. 13 is a graph showing the relationship between a drive current supplied to the semiconductor laser and a detection signal. When the reflected light from the opto-magnetic disk is recoupled to the emergent end face of the semiconductor laser with the present drive current applied thereto, the semiconductor laser selectively takes two states of a laser oscillation mode 74 and an LED oscillation mode 75 depending on the intensity of the reflected light, i.e., the presence or absence of edges of the information magnetic domains forming information bits on the opto-magnetic disk. These two states are converted into the intensity of light emitted from the emergent end face of the semiconductor laser 51 on the opposite Side and detected by the photoelectric transducer (sensor) 55. To put it conversely, the drive current of the semiconductor laser 51 is so set as to establish the above conditions.

As mentioned above, the presence or absence of edges of the information magnetic domains in the light spot can be precisely detected by setting the drive current of the semiconductor laser 51 at such a level as able to make the laser oscillation mode and the LED oscillation mode switched depending on the intensity of light reentering the semiconductor laser 51, and then detecting change in the intensity of light emitted from the semiconductor laser by the photoelectric transducer 55. Thus, the presence of edges of the information magnetic domains is determined by detecting change in the oscillated state of the semiconductor laser.

In this embodiment, the analyzer 57 serves to cut off the polarized bias component always returning back to the emergent end face of the semiconductor laser 51 regardless of the presence or absence of edges of the information magnetic domains. However, if the light waveguide layer 52 in the semiconductor laser 51 has a very high capability of selecting polarized components, the analyzer 57 could be dispensed with because the light waveguide layer 52 could also fulfill the functions of the analyzer 57.

Also, in this embodiment, the polarized-light absorbing type analyzer 57 is used as a polarized light selector optical element to select the polarized component in the horizontal direction within the light irradiating optical system. For the purpose of further improving the efficiency of utilization of light, a polarized light beam splitter capable of passing the polarized component in the horizontal direction therethrough and reflecting other polarized components may be used as the polarized light selector optical element. The efficiency of utilization of light can be still further improved by leading the reflected light from the polarized light beam splitter to a servo optical system essential to the optical head, such as an auto-tracking and auto-focusing optical system, using any of various detection optical systems known so far.

As a result, this embodiment can realize the optical head which is able to precisely detect edges without modifying the optical system of a conventional optical head to large extent. Since a semiconductor laser arranged as an external resonator is used as the light detector, this embodiment also makes it possible to amplify the reflected light from information bits even if its intensity is small, and thus to increase the detecting sensitivity:.

Although this embodiment has been described in connection with thee optical head for opto-magnetic disks, the present invention is not limited to this embodiment and also applicable to, for example, a signal reading system of a magnetic linear scale encoder with high resolution using a vertical magnetic film.

As described above, according to the present invention represented by the fourth embodiment, there is provided an optical information recording/reproducing apparatus that a beam of linearly polarized light from a semiconductor laser is led to an opto-magnetic information recording surface by a light irradiating optical system, and the light reflected by the information recording surface is led to a light detector by a light receiving optical system through the light irradiating optical system so that the information recorded on the information recording surface is reproduced by utilization of the magneto-optic effect, wherein the semiconductor laser has small light emitting areas on both end faces thereof and is provided with a reflection preventive film on at least the end face near the light irradiating optical system; a polarized light selector optical element allowing the linearly polarized light from the semiconductor laser to pass therethrough and a polarizing direction rotator optical element for rotating the plane of polarization of the linearly polarized light by 90 degrees after it reciprocates therethrough are both disposed in the light irradiating optical system; and the reflected light from the information recording surface is focused as a light spot again onto the light emitting area of the semiconductor laser by the light irradiating optical system, whereby edges of the information magnetic domains recorded on the information recording surface are detected by detecting change in the intensity of light emitted from the semiconductor laser.

The polarizing direction rotator optical element in the light irradiating optical system may be a Faraday rotator.

In short, with this embodiment of the present invention, the skip in phase distribution (the phase difference) caused by an opto-magnetic recording film under the magnetic Kerr effect is detected as change in the intensity of light emitted from an external resonator by refocusing a light spot on the resonator, thereby realizing an optical head for opto-magnetic disks which can precisely detect edges of the information magnetic domains without remarkably complicating the structure of a conventional opto-magnetic head.

Figure 14:
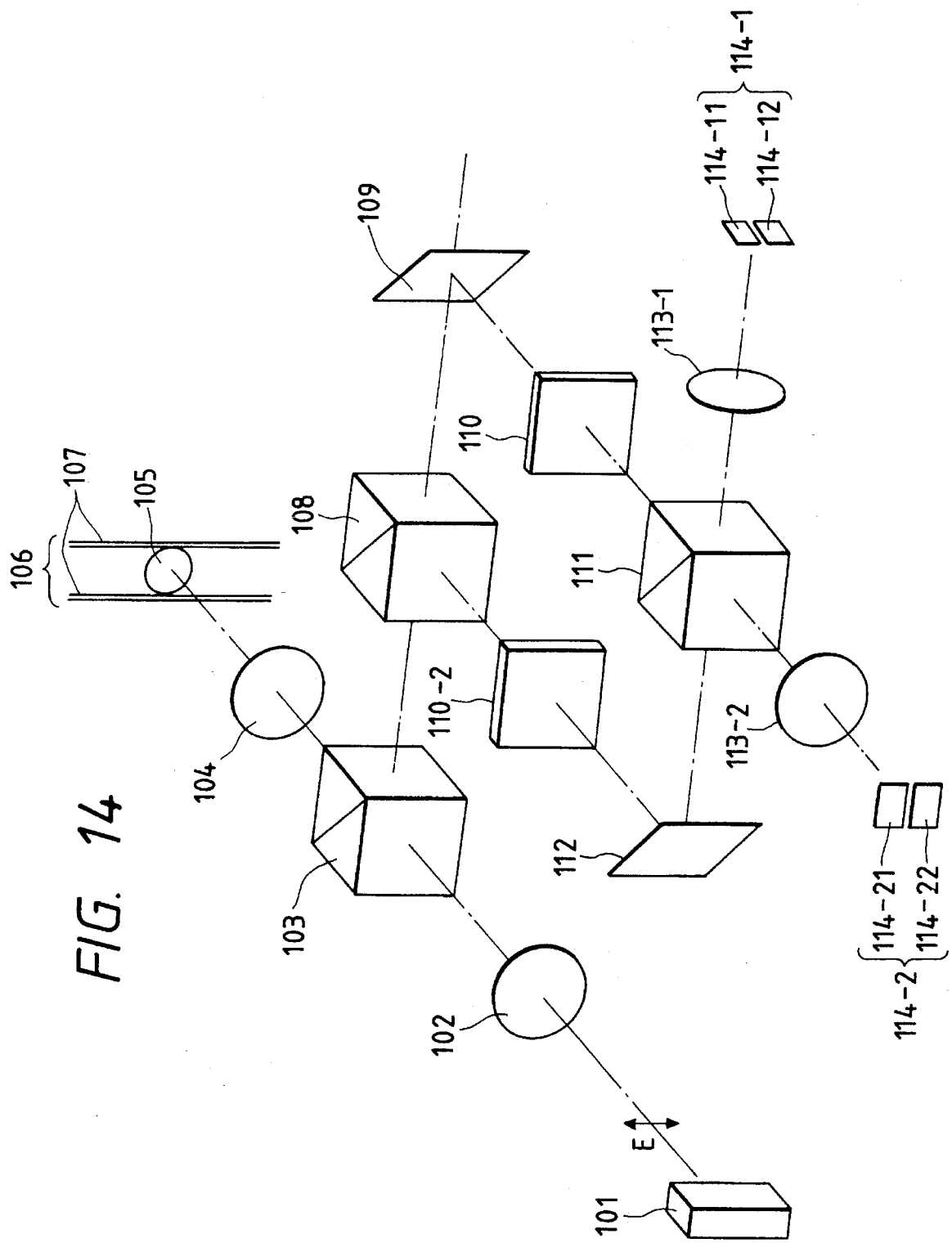
FIG. 14 is a view showing a fifth embodiment of an optical head for recording and reproducing opto-magnetic information according to the present invention.

Still another embodiment of the optical information recording/reproducing apparatus of the present invention will be described with reference to the subsequent drawings FIG. 14 is a schematic view of a fifth embodiment of an optical head for recording and reproducing opto-magnetic information according to the present invention. In FIG. 14, denoted by 101 is a semiconductor laser emitting a beam of linearly polarized light (the direction of which field vector is indicated by arrow E in the drawing), 102 is a collimator lens for converting the light beam from the laser into a parallel light beam, 103 is a first polarized light beam splitter for passing most of the polarized component in the direction E therethrough and reflecting 100% of the polarized component in a direction perpendicular to E, and 104 is an objective lens. 105 is a light spot focused by the objective lens, 106 is one information track defined on an opto-magnetic disk, and 107 is a guide groove provided for tracking control of the light spot. 108 is a second polarized light beam splitter, 109 is a semi-transmissive mirror half mirror), 110 is a ½ wavelength plate, 111 is a beam splitter (hereinafter referred to as a neutral beam splitter) for passing about 50% of the light beam and reflecting about 50% of the light beam regardless of the direction of polarization, 112 is a total reflection mirror, 113-1 is a first sensor lens, 1132 is a second sensor lens being the same type as the first sensor lens 113-1, 114-11 and 114-12 are respectively upper and lower light receiving surfaces of a first light detector 114-1 located near the focal plane of the first sensor lens 113-1, and 114-21 and 114-22 are respectively upper and lower light receiving surfaces Of a second light detector 114-2 located near the focal plane of the second sensor lens 113-2.

When recording information on the information track 106 defined over the opto-magnetic disk (recording medium), the light spot 105 is irradiated to the information track 106, while applying an external magnetic field to the irradiated portion by a magnetic head (not shown), so that an information signal is recorded there.

The light beam emitted from the semiconductor laser 101 is linearly polarized light and the direction of its field vector is indicated by E in the drawing. Let it to be now assumed that the direction E is a direction of P-polarization and the direction perpendicular to E is a direction of S-polarization. The emitted light beam is converted into a parallel light beam by the collimator lens 102. The parallel light beam passes through the first polarized light beam splitter 103, and is focused as the light spot 105 by the objective lens 104 on the information track 106 formed in an opto-magnetic recording film made of TbFeCo or the like, after transmitting through a transparent substrate of the opto-magnetic disk (not shown).

The light beam reflected by the opto-magnetic recording film and thus subjected to the magnetic Kerr effect has the S-polarized component perpendicular to the direction E. The first polarized light beam splitter 103 reflects all of that S-polarized component and also a part of the originally P-polarized component, these two components entering the second polarized light beam splitter 108. The second polarized light beam splitter 108 has characteristics to reflect 100% of the S-polarized component and passes 100% of the P-polarized component therethrough. Accordingly, the light beam passing through the second polarized light beam splitter 108 is all the P-polarized component, while the light beam reflected by the second polarized light beam splitter 108 is all the S-polarized component.

The P-polarized component passing through the second polarized light beam splitter 108 is reflected in part by the semi-transmissive mirror 109, and the remaining passes through the semi-transmissive mirror 109.

The light beam passing through the semi-transmissive mirror 109 is led to a focus detection optical system for auto-focusing control and a track detection optical system for auto-tracking control (both not shown). These detection optical systems can be implemented using any of various techniques known so far.

On the other hand, the light beam reflected by the semi-transmissive mirror 109 passes through the ½ wavelength plate 110 to be rotated in the direction of polarization thereof by 90°, followed by reaching the neutral beam splitter 111 as a light beam of the S-polarized component (in the following description, this light component reaching the neutral beam splitter 111 after passing through the second polarized light beam splitter 108, being reflected by the semi-transmissive mirror 109 and passing through the ½ wavelength plate 110 will be referred to as a light beam A).

The S-polarized component reflected by the second polarized light beam splitter 108 passes through an optical path length compensator plate 110-2, is all reflected by the total reflection mirror 112 and then reaches the neutral beam splitter 111 (this light component being referred to as a light beam B hereinafter). The neutral beam splitter 111 reflects about 50% of the light beam A and passes about 50% of the light beam B therethrough, so that these two light beams are combined with each other under interference and focused by the sensor lens 113-1 onto the first 2-division light detector 114-1.

Meanwhile, the neutral beam splitter 111 passes about 50% of the light beam A therethrough and reflects about 50% of the light beam B, so that these two light beams are combined with each other under interference and focused by the sensor lens 113-2 onto the second 2-division light detector 114-2. The phase difference produced by a difference in optical path length between the light beam A and the light beam B is corrected by the optical path length compensator plate 110-2 so that the interference effect becomes maximum (e.g., interference at zero or large phase interference).

The 2-division light detectors 114-1 and 114-2 have independent effective light receiving areas 114-11, 114-12 and 114-21, 114-22 divided by boundary lines extending perpendicularly to the direction of the information track, respectively.

Figure 15:
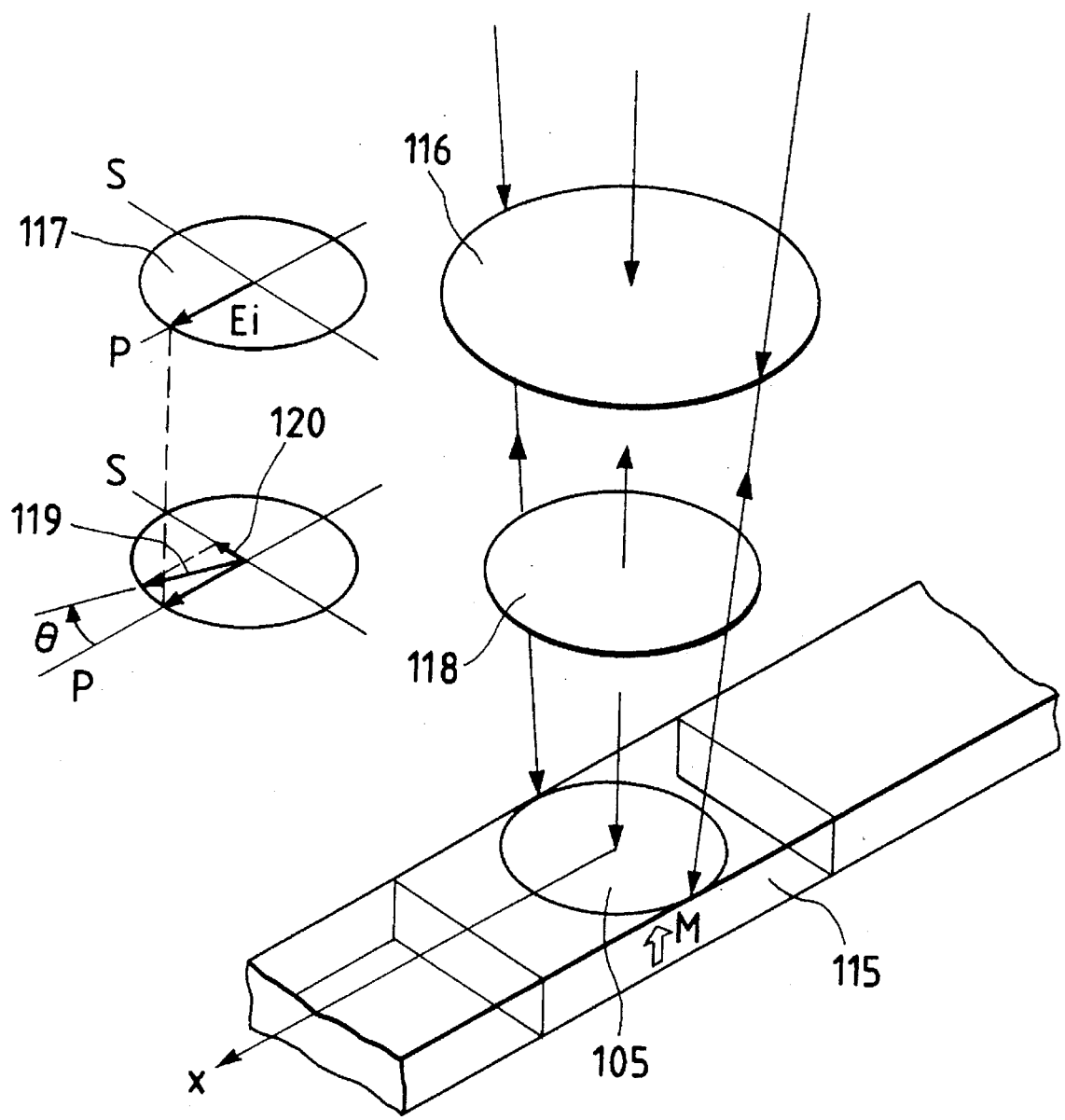
FIG. 15 is a view showing the behavior as occurred when a light spot is incident upon the center of the information magnetic domain.

FIG. 15 illustrates the behavior as occurred when the light spot 105 is incident upon the center of one information magnetic domain 115 (magnetized in the direction M) recorded in the information track over the opto-magnetic recording film.

Let it be now assumed that the field vector of an incident light beam 116 forming the light spot is Ei. This field vector has the P-direction indicated here by 117, as explained above in connection with FIG. 14. When the incident light beam 116 is reflected in the form of the light spot 105 by the opto-magnetic recording film, it is subjected to the magnetic Kerr effect, resulting in that the direction of polarization of the linearly polarized light is rotated by θ depending on the direction of magnetization of the information magnetic domain 115 and a reflected light beam 118 has its field vector indicated by 119. The S-polarized component of this field vector is indicated by 120. In case of FIG. 15, the edge of the information magnetic domain is not present in the light spot and, therefore, the reflected light beam has no edge information.

Figure 16:
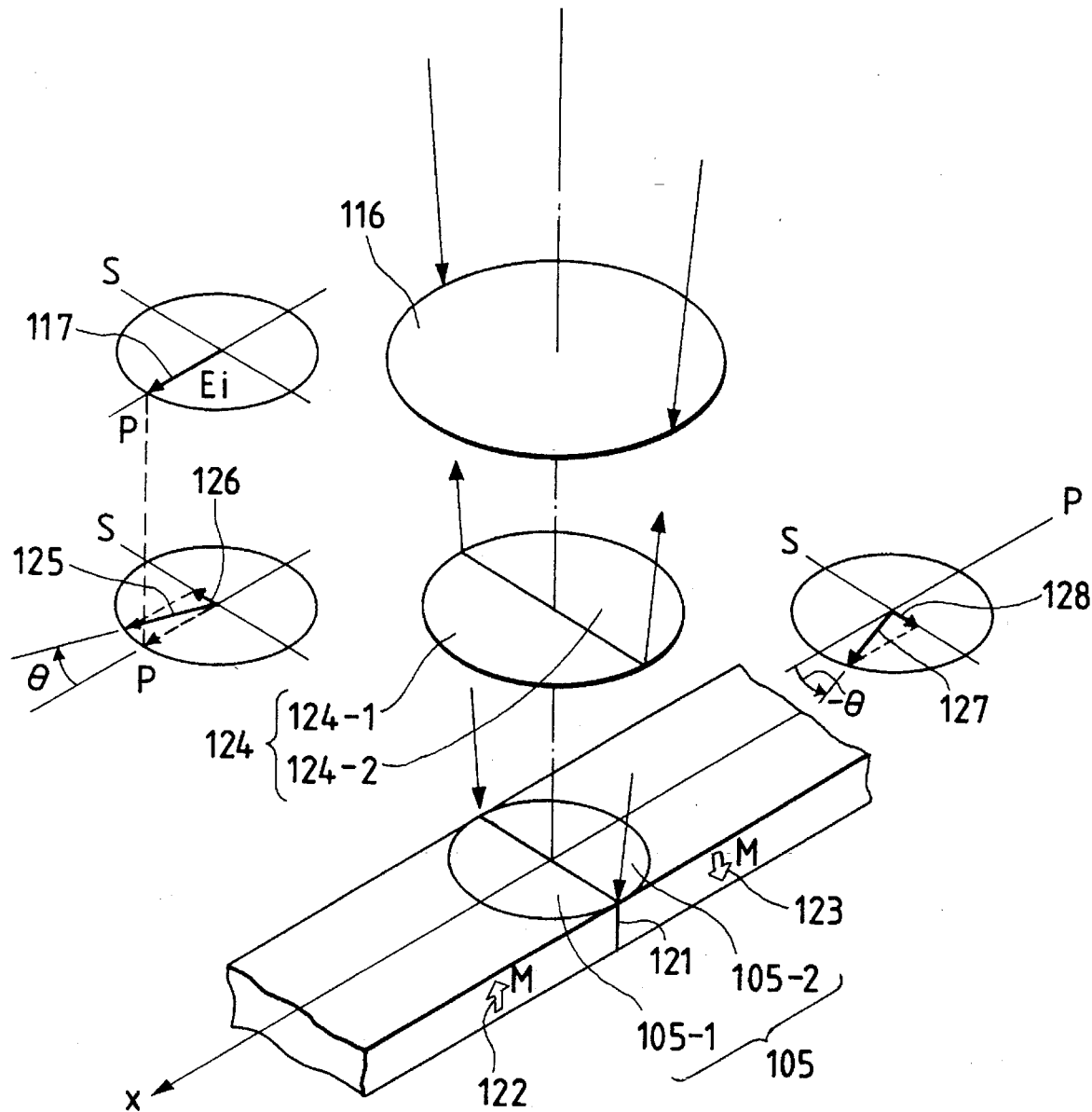
FIG. 16 is a view showing the behavior as occurred when a light spot is incident upon an edge of the information magnetic domain.

FIG. 16 illustrates the behavior as occurred when the center of the light spot 105 is incident upon an edge of the information magnetic domain recorded in the information track over the opto-magnetic recording film.

The direction of field vector of the incident light beam 116 is the same as the above case of FIG. 15 and thus indicated by 117. The information magnetic domains upon which the light spot 105 impinges are magnetized in the opposite directions, as indicated by 122 and 123, with an edge 121 as a boundary therebetween. Let it be assumed that of the wave front of the incident light spot 105, the region under an influence of the magnetization 122 is 105-1 and the region under an influence of the magnetization 123 is 105-2. The light in the wave front region 105-1 undergoes the magnetic Kerr effect due to the magnetization 122, whereby a beam portion 124-1 of the reflected light beam 124 corresponding to the region 105-1 is subjected to Kerr rotation in the same direction as the above case of FIG. 15. The resulting field vector of the beam portion 124-1 is indicated by 125 and its S-polarized component by 126.

On the other hand, the light in the wave front region 105-2 undergoes the magnetic Kerr effect due to the magnetization 123, whereby a beam portion 124-2 of the reflected light beam 124 corresponding to the region 105-2 is rotated in the plane of polarization thereof in the opposite direction to the beam portion 124-1. The resulting field vector of the beam portion 124-2 is indicated by 127 and its S-polarized component by 128.

As apparent from comparison between the S-polarized components 126 and 128, their directions are opposite to each other. In other words, phase distribution of the S-polarized component of the reflected light beam 124 is out of phase by π between the two regions separated by the edge 121 of the information magnetic domain. To describe signal processing in this embodiment hereinafter, an optical system comprising the sensor lens 131-1 and the 2-division light detector 114-1 will first be described.

Figure 17:
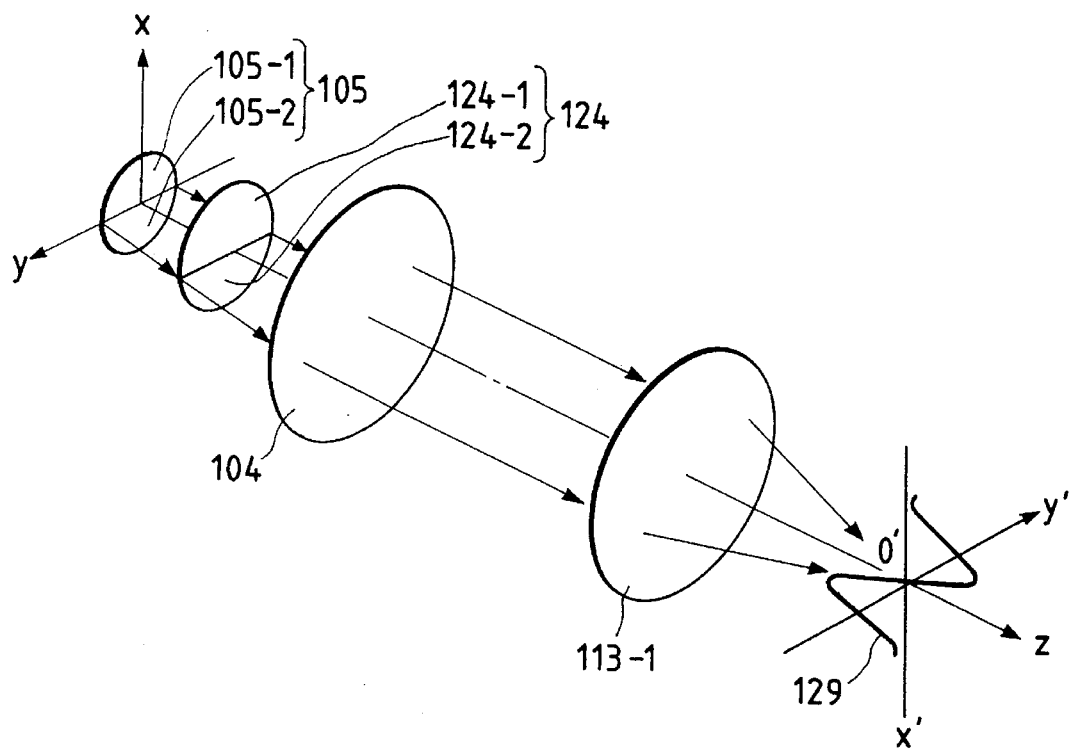
FIG. 17 is a view showing the focusing relation for S-polarized light of the wave front in FIG. 16.

FIG. 17 illustrates the focusing relation of the optical system for S-polarized light of the wave front 124 in FIG. 16. In case of these drawings, the light spot 105 incident upon the opto-magnetic recording film is reflected thereby such that the S-polarized components in the wave front of the reflected light beam 124 have a phase difference π between the beam portions 124-1 and 124-2. When the reflected light beam 124 is focused by the sensor lens 113, it become not a single light spot, but two light spots owing to the above phase difference. This results in amplitude distribution 129 being lowered down to zero at its central portion.

Consequently, when the center of the light spot 105 is incident upon the edge of the information magnetic domain, the light beam B develops the amplitude distribution on the 2-division light detector 114-1 as indicated by 129 in the drawing.

Figure 18:
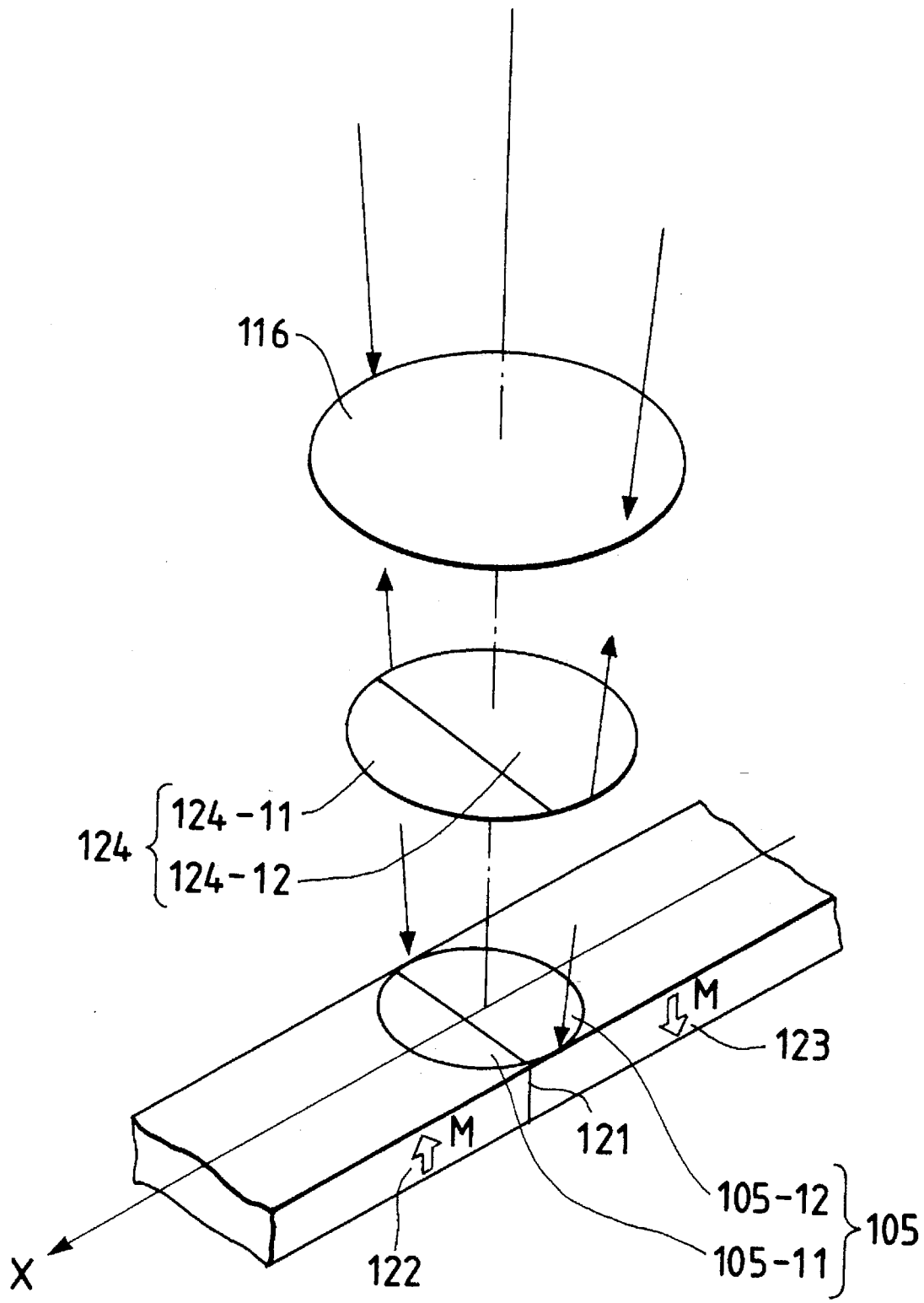
FIG. 18 is a view showing the behavior as occurred when a light spot is incident upon a position offset from the edge of the information magnetic domain.

FIG. 18 illustrates the behavior as occurred when the light spot 105 is incident upon the edge of the information magnetic domain recorded in the information track over the opto-magnetic recording film, but the center of the light spot 105 is slightly offset from the information magnetic domain edge 121. Let it be here assumed that the region of the wave front of the light spot 105 under an influence of the magnetization 122 is 105-11, the beam portion of the reflected light beam 124 corresponding to the region 105-11 is 124-11, the region of the wave front of the light spot 105 under an influence of the magnetization 123 is 105-12, and the beam portion of the reflected light beam 124 corresponding to the region 105-12 is 124-12.

The beam portion 124-11 is rotated in the direction of polarization thereof in the same manner as the beam portion 124-1 in FIG. 16, so that the resulting field vector is the same as indicated by 125 and its S-polarized component is the same as indicated by 126. On the other hand, the beam portion 124-12 is rotated in the direction of polarization thereof in the same manner as the beam portion 124-2 in FIG. 16, so that the resulting field vector is the same as indicated by 127 and its S-polarized component iS the same as indicated by 128.

Figure 19:
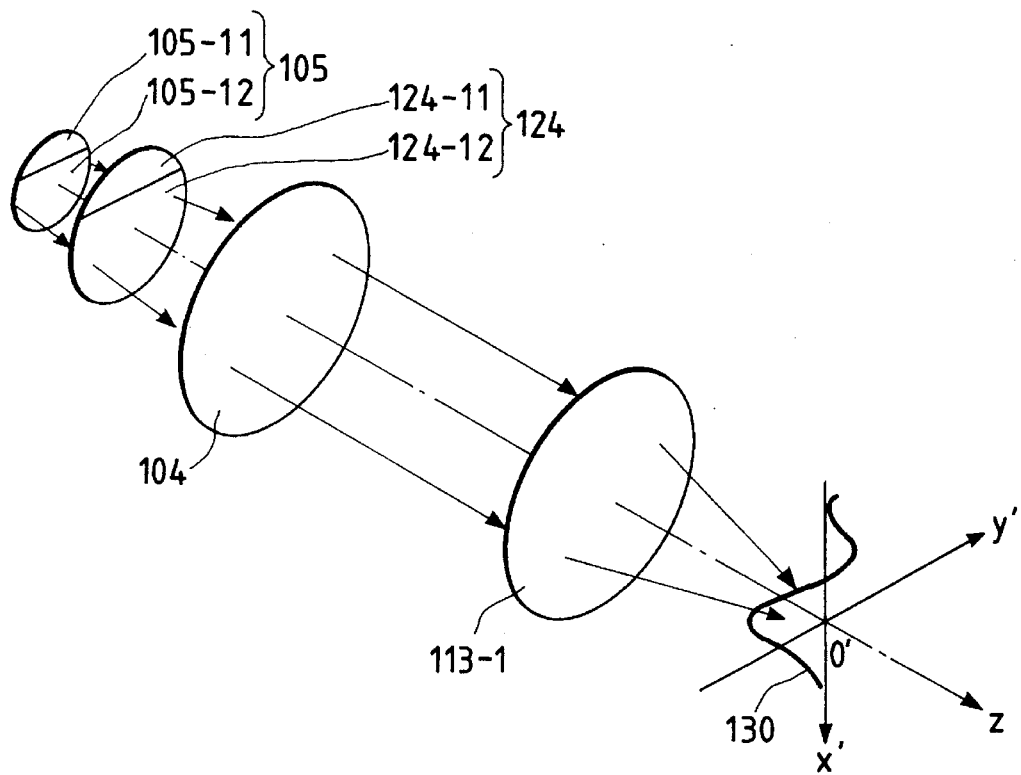
FIG. 19 is a view showing the focusing relation for S-polarized light of the wave front in FIG. 18.

Accordingly, phase distribution of the S-polarized components of the beam portions 124-11 and 124-12 is out of phase by π between the two regions separated by the edge 121 of the information magnetic domain. FIG. 19 is a view showing the focusing relation of the optical system for S-polarized light of the wave front (reflected light beam) 124 in FIG. 18.

When the reflected light beam is focused by the sensor lens 113-1, it becomes not a single light spot and includes a portion where the amplitude is 0, because of the phase difference π between the beam portions 124-11 and 124-12. That portion is reflective of the fact that the center of the light spot 105 is offset from the edge 121 of the information magnetic domain and, therefore, it is also offset from the optical axis.

Figure 20:
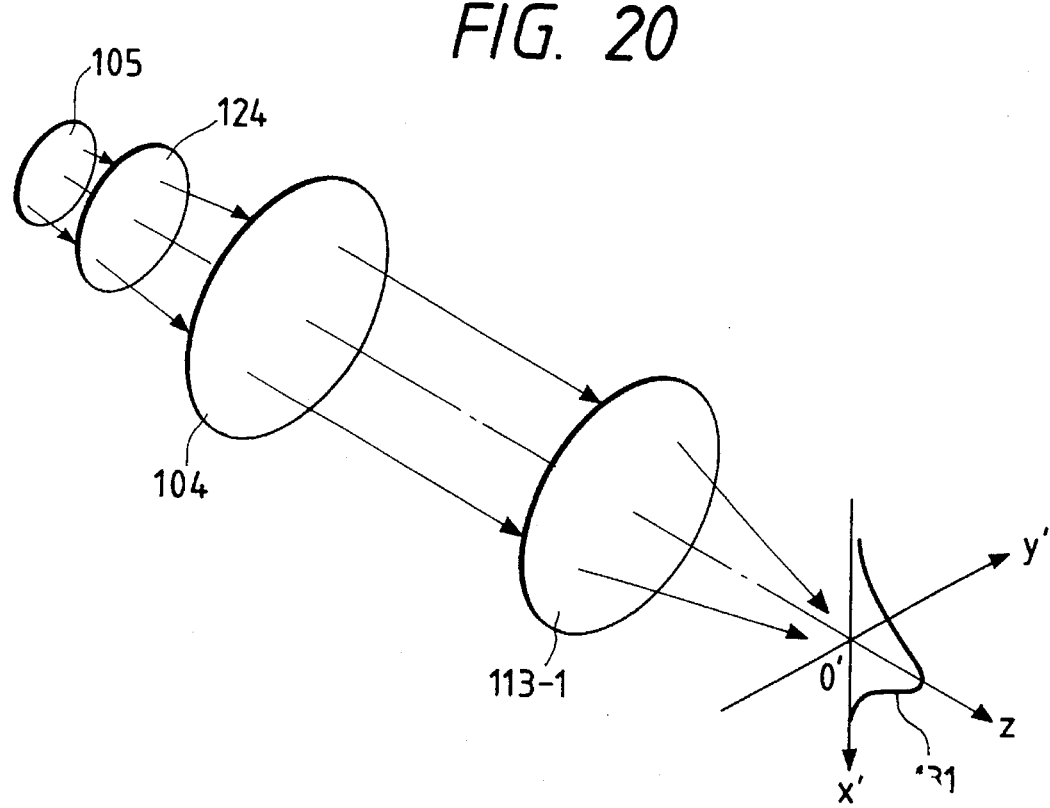
FIG. 20 is a view showing the focusing relation for P-polarized light of the wave front in FIG. 16.

FIG. 20 is a view showing the focusing relation of the optical system for P-polarized light of the wave front (reflected light beam) 124 in FIG. 16. The P-polarized components of the beam portions 124-1, 124-2 shown in FIG. 16 have no phase difference therebetween. In this case, when the reflected light beam is focused by the sensor lens 113-1, it develops amplitude distribution indicated by 131 in FIG. 20. Although the light beam A is rotated midway by 90° in the direction of polarization thereof by the ½ wavelength plate 110, this action will not affect the fact that the phase distribution of the light beam A is uniform in the pupil. Consequently, the light beam A develops the amplitude distribution indicated by 131 upon the 2-division light detector 114-1.

Note that the amplitude distribution curves indicated by 129 in FIG. 17, 130 in FIG. 19 and 131 in FIG. 20 are normalized based on maximums of absolute values of the respective amplitudes. In general opto-magnetic recording media, the magnitude of Kerr rotation angle θ shown in FIGS. 15, 16 and 18 is on the order of 0.5° to 1° and, therefore, the amplitude (indicated by 126, 128 in FIG. 16) of S-polarized component of the reflected light beam does not amount to several percentages of the magnitude of P-polarized component thereof.

The amplitude distribution upon the 2-division light detector 114-1 depends on the sum of respective contributions given by the light beam A and the light beam B. Assuming that the amplitude distribution given by the light beam A is $E_A$ and the amplitude distribution given by the light beam B is $E_B$, distribution I of the light intensity upon the 2-division light detector 114-1 is expressed by:

$$I=(E_A+E_B)^2=E_A^2+E_B^2+2E_AE_B \quad (1)$$

Here, $E_A$ is constant and has a large absolute value regardless of whether or not the above light spot 105 is incident upon the edge of the information magnetic domain, while $E_B$ is different in its distribution depending on whether or not the light spot 105 is incident upon the edge of he information magnetic domain, as well as depending on which portion of the light spot 105 the edge of the information magnetic domain is located, when the light spot is incident upon the edge of the information magnetic domain. Thus, $E_B$ containing magnetic domain information is amplified by the constant, large absolute value of $E_A$ as expressed at the third term in Equation (1), and then appears as the light intensity on the 2-division light detector 114-1.

Figure 21A:
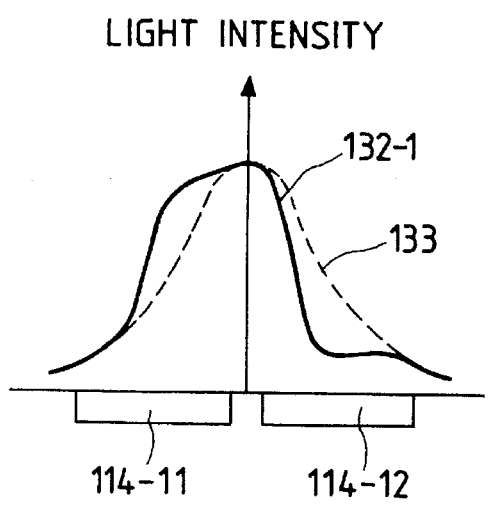
FIGS. 21A and 21B are graphs showing examples of distribution of the light intensity on different light detectors.
Figure 21B:
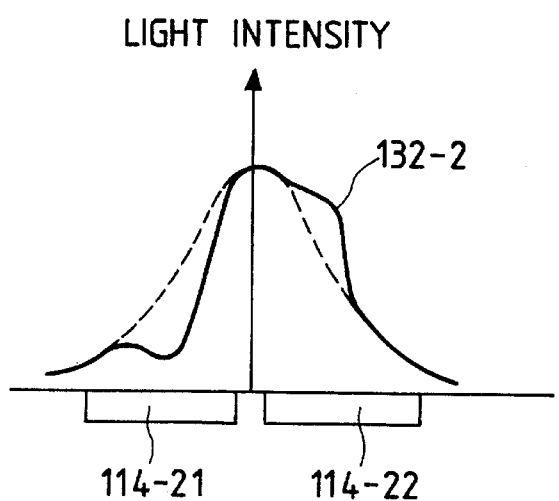

FIGS. 21A and 21B are graphs showing distribution of the light intensity on the light detectors 114-1 and 114-2 when the center of the light spot 105 is incident just upon the edge of the information magnetic domain. Curves 132-1, 132-2 indicate respective distribution of the intensity of the light beams A and B.

FIG. 21A represents distribution of the light intensity on the light detector 114-1, in which the intensity distribution 133 produced by the light beam A interferes with the light beam B and the resulting distribution is asymmetric about the optical axis as indicated by 132-1. This is because the amplitude distribution 131 (FIG. 20) produced by the light beam A is superposed with the amplitude distribution 129 (FIG. 17) produced by the light beam B on the light detector 114-11 in in-phase relation, but on the light detector 114-12 in out-of-phase relation. To put it conversely, the difference in optical path length between the light beam A and the light beam B is adjusted by the optical path length compensator plate 110-2 to establish the above phase relation. At this time, in another arm of the interference system, i.e., in the optical system containing the 2-division light detector 114-2, distribution of the light intensity upon the 2-division light detector 114-2 is shown in FIG. 21B. Thus, the light beams A and B are superposed in in-phase relation on the light detector 114-21 corresponding in the light detector 114-11, but in out-of-phase relation on the light detector 114-22 corresponding to the light detector 114-12. As a result, the distribution of FIG. 21A and the distribution of FIG. 21B are symmetrical about the optical axis. Therefore, assuming a signal from each light detector i to be expressed by Si, there holds:

$$(S_{14\text{-}11}-S_{14\text{-}21})-(S_{14\text{-}12}-S_{14\text{-}22})=(S_{14\text{-}11}-S_{14\text{-}12})-(S_{14\text{-}21}-S_{14\text{-}22}) \quad (2)$$

In other words, the intensity distribution of the light beam B containing edge information develops a detectable difference between the upper and lower positions with the optical axis therebetween.

As stated before, depending on whether or not the edge of the information magnetic domain is present in the light spot, or depending on which portion of the light spot the edge of the information magnetic domain is located, when it is present in the light spot, the light beam B develops different amplitude distribution upon the upper and lower light detectors with respect to the optical axis as seen from FIG. 19. Accordingly, the edge of the information magnetic domain can be detected by similarly detecting such difference in the amplitude distribution of the light beam B.

In this embodiment, it is important that the intensity of the light beam A can be freely changed depending on the reflectivity of the semi-transmissive mirror 109.

By changing the intensity of the light beam A with respect to the intensity of the light beam B, the interference effect between the light beams A and B can be adjusted to become maximum. Furthermore, while noises generated when reading information in the opto-magnetic information recording/ reproducing apparatus include those due to a medium, a laser source and a light detector, which noise is dominant depends on selection Of types of recording media, light receiving elements and so forth. This embodiment makes it possible to select the value of $E_A$ which maximizes the S/N ratio, by properly selecting the reflectivity of the semi-transmissive mirror 109.

Figure 22:
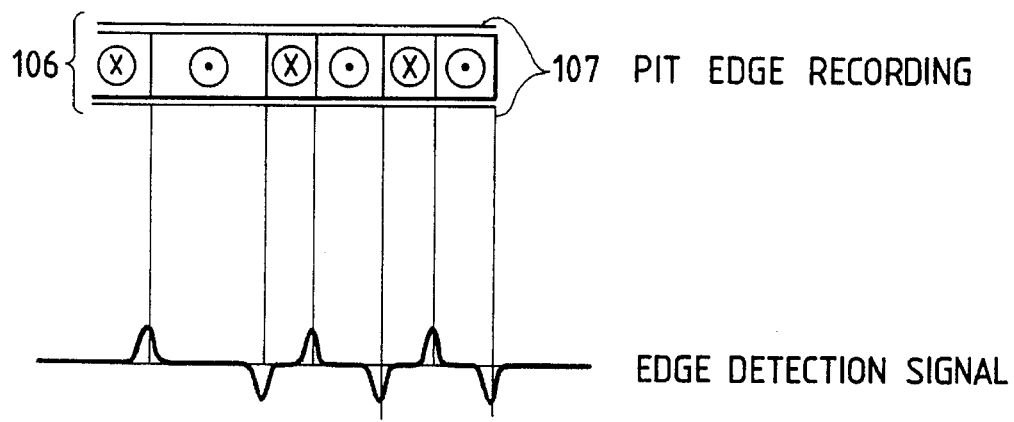
FIG. 22 is a diagram showing edges of the information magnetic domains and edge detection signals.

FIG. 22 is a diagram showing edges of the information magnetic domains and edge detection signals. In FIG. 22, the mark ⊙ indicates the upward direction of magnetic field with respect to the paper surface, and ⊗ indicates the downward direction of magnetic field with respect to the paper surface. The edge detection signals result from processing respective signals of the light detectors 114-1 to 114-22 in accordance with the above Equation (2). The positive or negative direction of each pulse can be reversed by adjustment of the optical path length compensator plate.

This embodiment also has an advantage that noises commonly present in both signals are canceled out through Signal processing in accordance with the above Equation (2).

Figure 23:
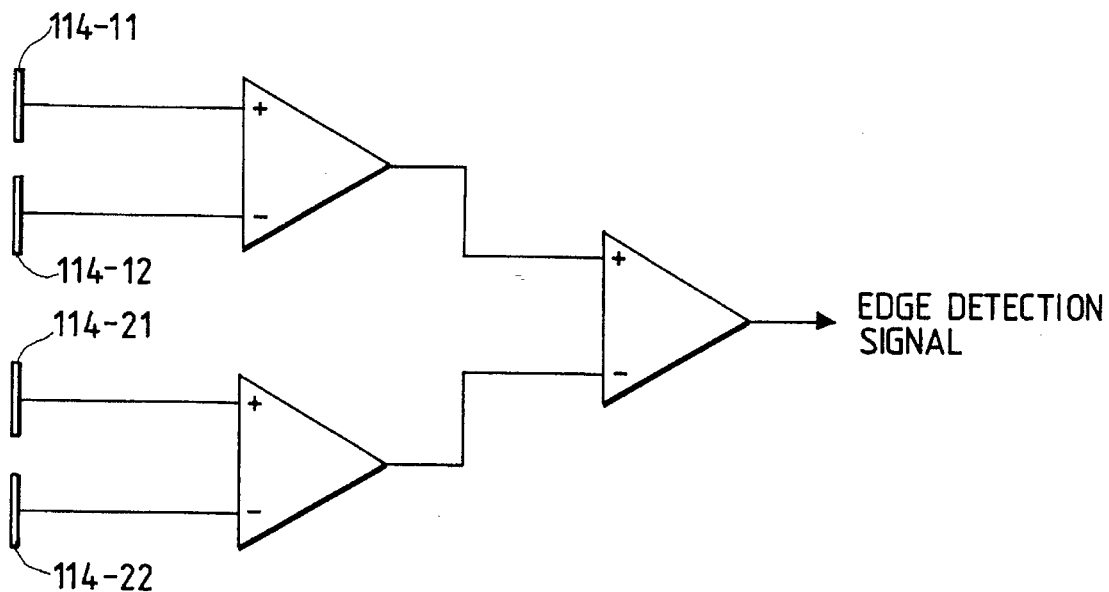
FIG. 23 is a block diagram showing an arithmetic operation of signals from respective light receiving surfaces.

FIG. 23 is a block diagram showing an arithmetic operation 0f signals from the respective light receiving surfaces.

Figure 24:
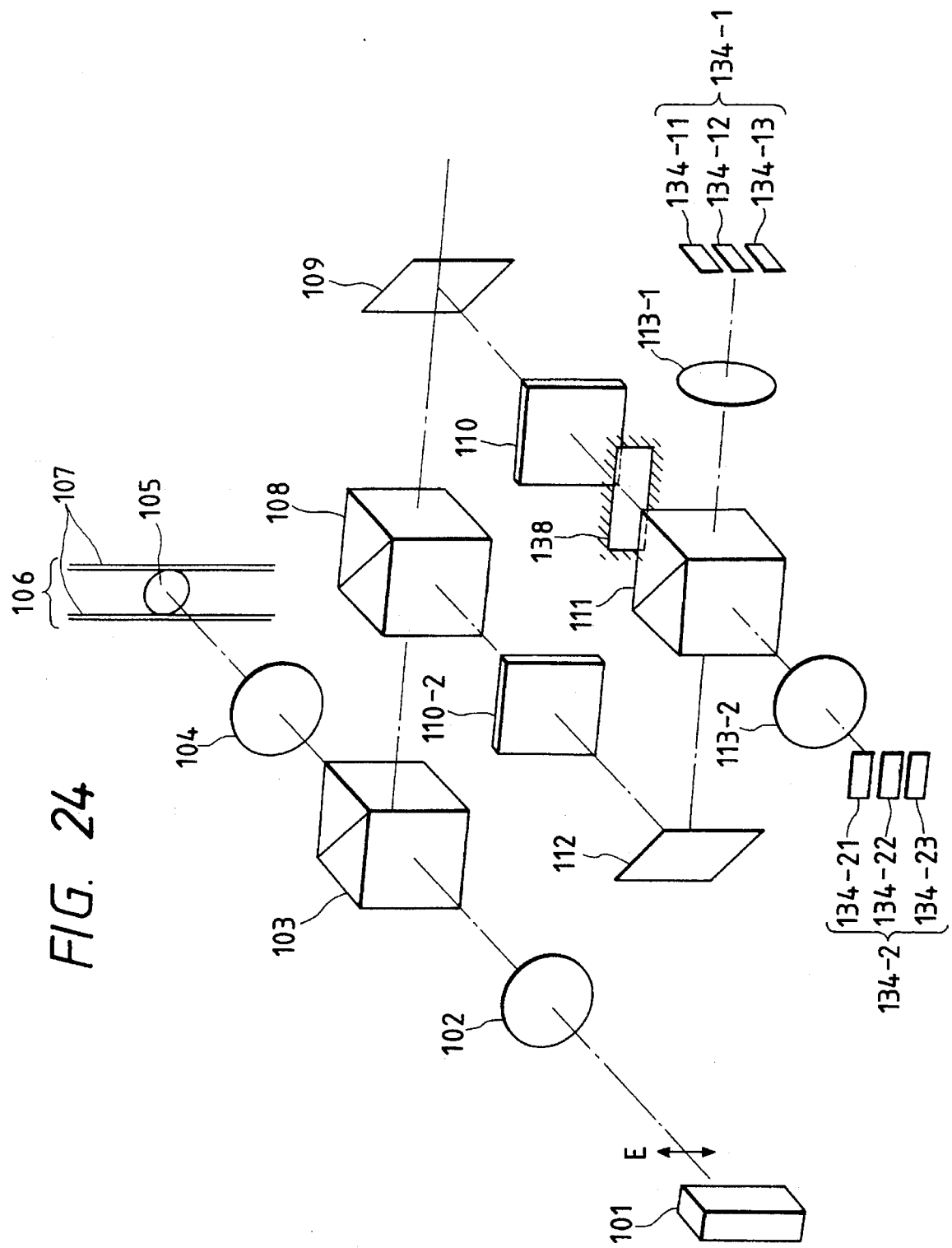
FIG. 24 is a view showing a sixth embodiment of an optical head for recording and reproducing opto-magnetic information according to the present invention.

FIG. 24 is a Conceptual view showing a sixth embodiment of an optical head for recording and reproducing opto-magnetic information according to the present invention. The elements in FIG. 24 common to those in FIG. 14 are denoted by the same reference numerals and will not be described again.

Denoted by 138 is an aperture stop provided to limit the effective NA of the sensor lenses 113-1, 113-2 in the track direction for the light beam A.

Figure 25:
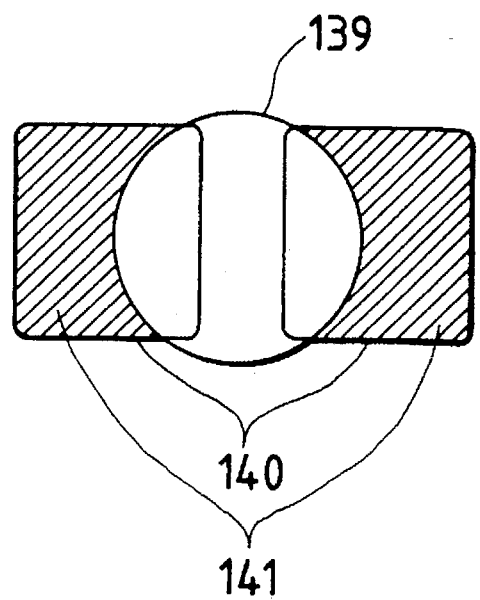
FIGS. 25 and 26 are views showing the behavior of spots respectively created by light beams A and B.

FIG. 25 illustrates the size of and the positional relationship between a spot 139 of the light beam A and a spot 140 of the light beam B created by the sensor lenses 113-1 and 113-2, when the aperture stop 138 is not used.

The spot 140 is spreading over a wider area than the spot 139, leaving a portion 141 where both the spots 139 and 140 are not superposed with each other. In the portion 141, the light beams A and B are not combined under interference, so the light beam B containing information about the magnetic domain edge contributes to the light intensity to very small extent.

Figure 26:
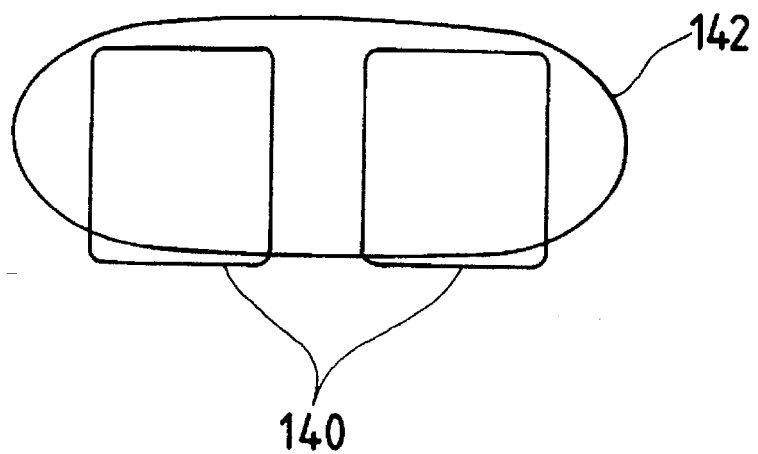

FIG. 26 illustrates the size of and the positional relationship between a spot 142 of the light beam A and a spot 140 of the light beam B created by the sensor lenses 113-1 and 113-2, when the aperture stop 138 is used.

The spot 140 formed by the light beam B is the same as FIG. 25. The presence of the aperture stop 138 reduces the effective NA of the sensor lenses 113-1, 113-2 in the track direction for the light beam A, with the result that the spot 142 formed by the light beam A is spread so as to superpose with most of the spot 140 formed by the light beam B.

Accordingly, most of the light beam B containing information about the magnetic domain edge is combined with the light beam A under interference and, therefore, can be captured by light detectors 134-1 and 134-2 to produce signals without waste of the light intensity.

These 3-division light detectors 134-1 and 134-2 have independent effective light receiving surfaces 134-11, 134-12, 134-13 and 134-21, 134-22, 134-23 divided by boundary lines perpendicular to the direction of the information track.

The above embodiments have been explained as rotating the direction of polarization of the light beam A by 90° to become the same direction of polarization as the light beam B for purpose of interference. According to the gist of the present invention, however, any one or both of the light beams may be rotated in the direction of polarization thereof to make both the light beams have the same direction of polarization for interference therebetween.

Although the foregoing explanation has been made in connection with signal detection from the opto-magnetic disk, the above embodiments of the present invention are also applicable to reading in a high-precision magnetic linear scale using a vertical magnetic film or a scan type laser microscope for those objects which produce phase changes in either polarized light as with the opto-magnetic disk.

As described above, according to the fifth and sixth embodiments of the present invention, there is provided an optical information recording/reproducing apparatus in which a light beam from a semiconductor laser is led as small spot light by a light irradiating optical system to an opto-magnetic information recording surface through an objective lens, and the light reflected by or transmitted through the information recording surface is led to a light detector by a light receiving optical system through the objective lens so that the information recorded on the information recording surface is reproduced by utilization of the magneto-optic effect, wherein the light detector has at least two independent effective light receiving surfaces divided by at least one boundary line perpendicular to the direction of the information track; the reflected or transmitted light of the spot light from the information track is separated into a light beam having the polarized component newly produced under the magneto-optic effect and a light beam having the polarized component perpendicular to the above polarized component; an element having a function to independently adjust the intensity of both or either one of the polarized light beams thus separated is provided to rotate the directions of polarization of both the two polarized light beams or the direction of polarization of one polarized light beam so that the directions of polarization of both the polarized light beams coincide with each other to take out the component of one polarized light beam in coincidence with the other polarized light beam; the two polarized light beams after rotation are combined with each other under interference; and the resulting interference light is focused by the light receiving optical system on the light detector, whereby edges of the information magnetic domains recorded on the information track are detected by using signal outputs from at least two effective light receiving surfaces of the light detector.

In short, the present invention represented by the fifth and sixth embodiments is to realize an optical information recording/reproducing apparatus which can precisely detect edges of the information magnetic domains by combining the polarized component due to rotation of the direction of polarization of the reflected light produced by the opto-magnetic recording film and the polarized component perpendicular to the above polarized component under interference at an appropriate ratio of the light intensity, focusing the interference light, and detecting the focused light by the light detector divided to have at least two light receiving surfaces.

Still another embodiment of the optical information recording/reproducing apparatus of the present invention will be described with reference to the subsequent drawings.

Figure 27:
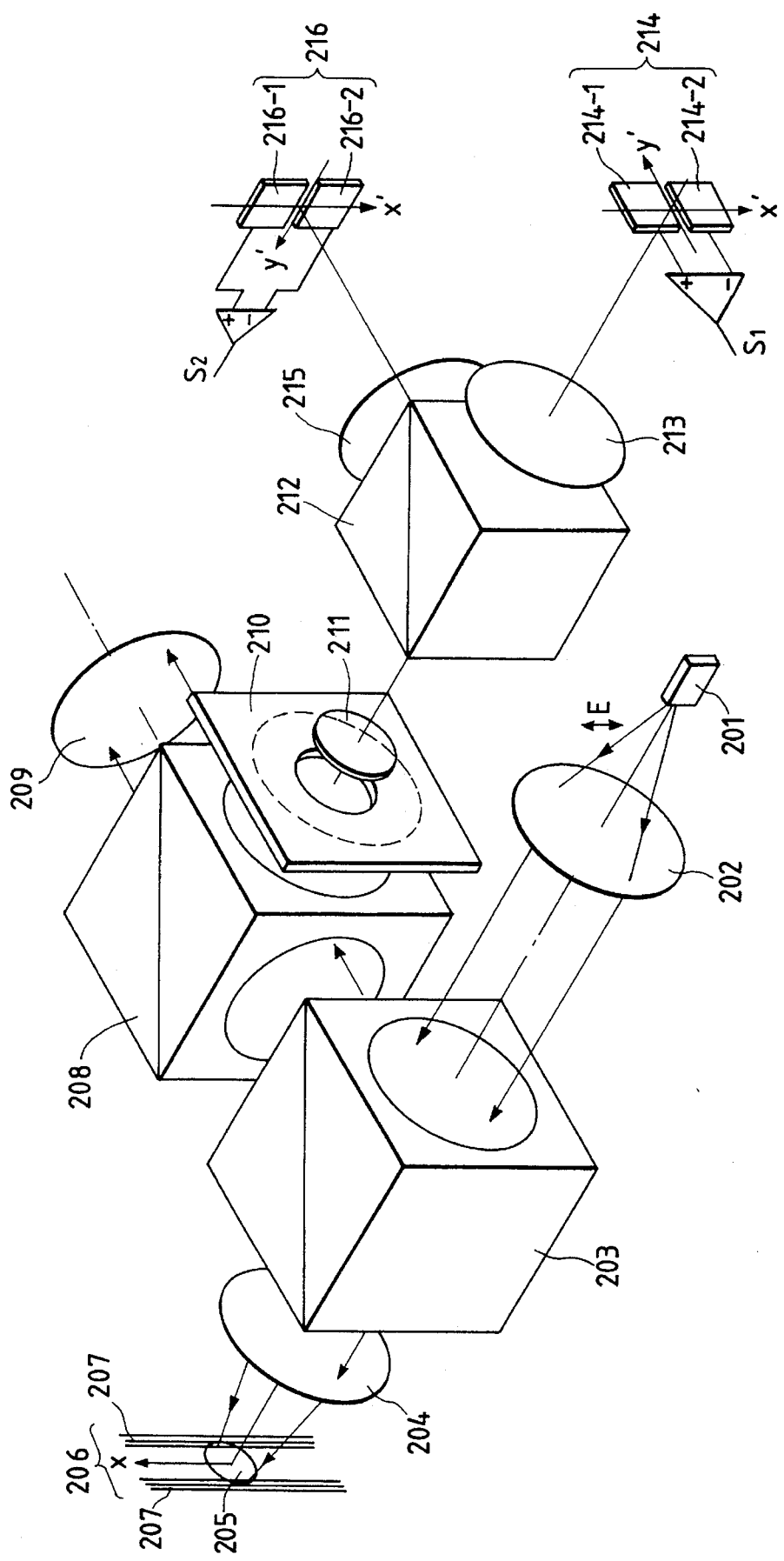
FIG. 27 is a schematic view showing a seventh embodiment of an optical head for use in an optical information recording/reproducing apparatus of the present invention.

FIG. 27 is a schematic view showing a seventh embodiment of an opto-magnetically recording and reproducing head for use in the optical information recording/reproducing apparatus of the present invention. In FIG. 27, denoted by 201 is a semiconductor laser emitting a beam of linearly polarized light (the direction of which field vector is indicated by E) of wavelength $\lambda$ ($\lambda$=830 nm), 202 is a collimator lens for converting the emitted light beam into a parallel light beam, 203 is a first polarized light beam splitter for passing most of the polarized component in the direction E therethrough and reflecting 100% of the polarized component In a direction perpendicular to E, and 204 is an objective lens. 205 is a light spot focused by the objective lens, 206 is one information track defined on an opto-magnetic disk as an opto-magnetic recording medium, and 207 is a guide groove provided for tracking control of the light spot. 208 is a second polarized light beam splitter for reflecting 100% of the S-polarized component and reflecting a part of the P-polarized component, and 209 is the wave front having passed through the beam splitter 208. 210 is a phase difference adjuster optical element for adjusting a phase difference in the light beam, 211 is a ½ wavelength plate, 212 is a third polarized light beam splitter for reflecting 100% of the S-polarized component and passing 100% of the P-polarized component, 213 and 215 are focusing lenses, and 214 and 216 are 2-division photoelectric transducers respectively comprising two elemental transducers 214-1, 214-2 and 216-1, 216-2.

When recording information on the information track 206 defined over the opto-magnetic disk (recording medium), the light spot 205 is irradiated to the information track 206, while applying an external magnetic field to the irradiated portion by a magnetic head (not shown), so that an information signal is recorded there.

The light beam emitted from the semiconductor laser 201 is linearly polarized light and the direction of its field vector is indicated by E in the drawing. Let it be now assumed that the direction E is a direction of P-polarization and the direction perpendicular to E is a direction of S-polarization. The emitted light beam is converted into a parallel light beam by the collimator lens 202. The parallel light beam passes through the first polarized light beam splitter 203, and is focused as the light spot 205 by the objective lens 204 on the information track 206 formed in an opto-magnetic recording film made of TbFeCo or the like, after transmitting through a transparent substrate of the opto-magnetic disk (not shown).

The light beam reflected by the opto-magnetic recording film and thus subjected to the magnetic Kerr effect has the S-polarized component perpendicular to the direction E. The first polarized light beam splitter 203 reflects all of that S-polarized component and also a part of the originally P-polarized component, these two components entering the second polarized light beam splitter 208. The second polarized light beam splitter 208 has characteristics to reflect 100% of the S-polarized component and passes a part of the P-polarized component therethrough. Accordingly, a light beam 209 passing through the second polarized light beam splitter 208 is all the P-polarized component, and is led to a focus detection optical system for auto-focusing control and a track detection optical system for auto-tracking control (both not shown). These detection optical systems can be implemented using any of various techniques known so far.

On the other hand, the light beam reflected by the second polarized light beam splitter 208 passes through the phase difference adjuster optical element 210. This optical element 210 adjusts the phase difference produced by a difference in optical path length between the light beam passing through the ½ wavelength plate 211 (described later) and the light beam in a peripheral region not passing through the ½ wavelength plate 211, so that it becomes 0 or π. In this embodiment, the phase difference is adjusted to 0. Therefore, assuming that the ½ wavelength plate 211 has a thickness d and a refractive index no for the ordinary ray, and the phase difference adjuster optical element 210 has a refractive index n, it is only required that a thickness D of the phase difference adjuster optical element made of an optically isotropic, transparent dielectric is set to meet no·d=n·D. After passing through the phase difference adjuster optical element 210, the central light beam passes through the ½ wavelength plate 211. The ½ wavelength plate 211 is set to rotate respective field vectors of P-polarized light and S-polarized light passing therethrough by 90°. In fact, the optical axis of the ½ wavelength plate 211 forms an angle of 45° with respect to the direction of P- or S-polarized light. On the other hand, the light beam in the peripheral region does not pass through the ½ wavelength plate 211 and, therefore, is not rotated in the direction of polarization thereof. 212 is a polarized light beam splitter for separating the interference light beam into two beams of P- and S-polarized light. The light beam of P-polarized component passes through the polarized light beam splitter 212 and is focused by the focusing lens 213 to enter the 2-division photoelectric transducer 214 disposed near the focal plane of the focusing lens 213, while the light beam of S-polarized component is reflected by the polarized light beam splitter 212 and focused by the focusing lens 215 to enter the 2-division photoelectric transducer 216 disposed near the focal plane of the focusing lens 215. The 2-division photoelectric transducers 214, 216 each have a division line extending in a direction (that is, y'-direction) perpendicular to the direction of the information track ( that is, x'-direction).

Figure 28:
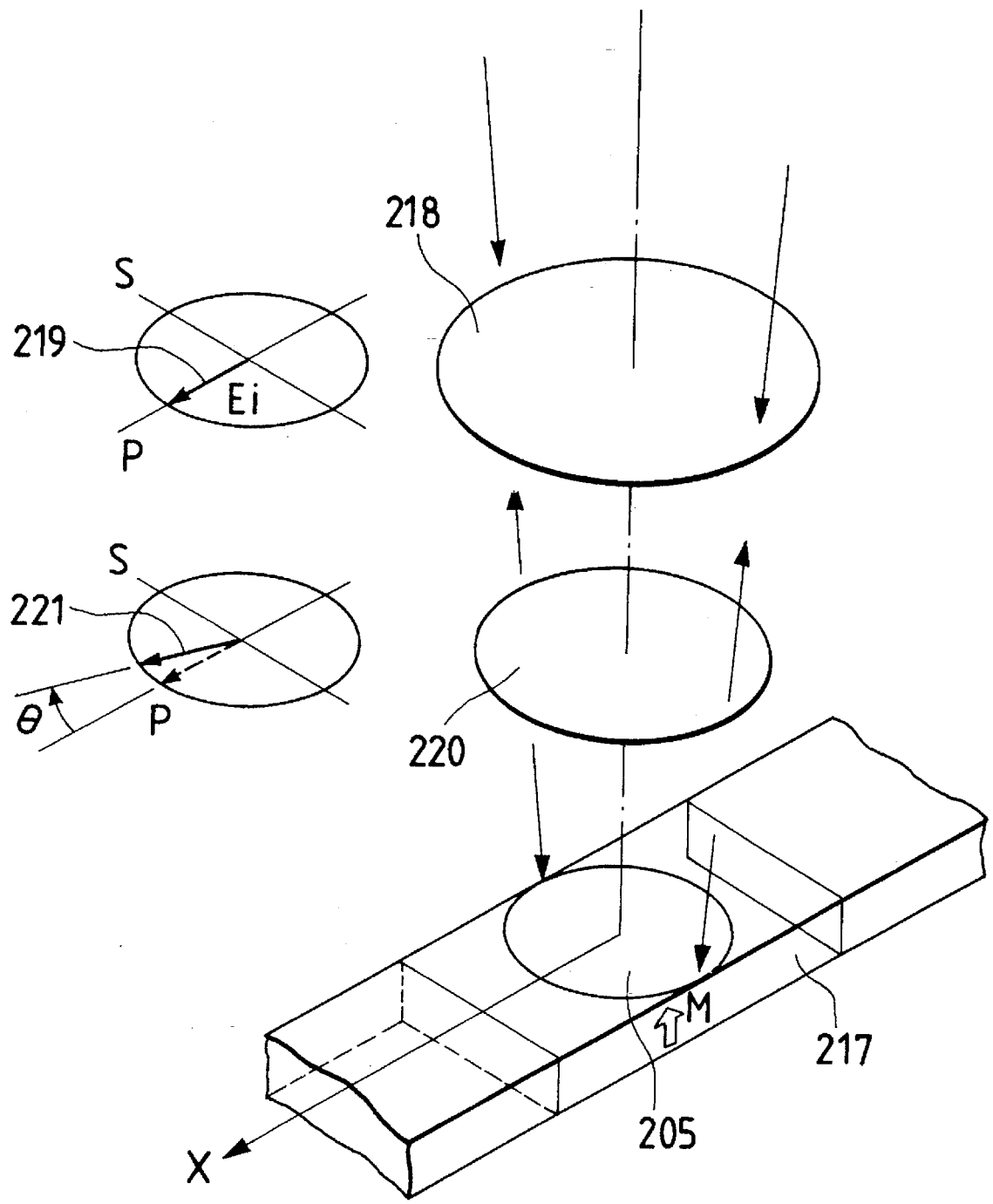
FIG. 28 is a view showing the behavior as occurred when a light spot is incident upon the information magnetic domain of a recording medium.

FIG. 28 illustrates the behavior as occurred when the light spot 205 is incident upon one information magnetic domain 217 (magnetized in the direction M) recorded on the opto-magnetic recording film.

Let it to be now assumed that the field vector of an incident light beam 218 forming the light spot is Ei. This field vector has the P-direction indicated here by 217, as explained above in connection with FIG. 27. When the incident light beam 218 is reflected in the form of the light spot 205 by the opto-magnetic recording film, it is subjected to the magnetic Kerr effect, resulting in that the direction of polarization of the linearly polarized light is rotated by θ depending on the direction of magnetization of the information magnetic domain 217 and a reflected light beam 220 has its field vector indicated by 221.

In case of FIG. 28, the edge of the information magnetic domain is not present in the light spot 205 and, therefore, the reflected light beam has no edge information.

After passing through the objective lens 204, the reflected light beam is further reflected by the first polarized light beam splitter 203 and then the second polarized light beam splitter 208, followed by going toward the phase difference adjuster optical element 210 and the ½ wavelength plate 211. Looking at polarized components of the light beams after passing the ½ wavelength plate, they appear as shown in FIG. 29.

Figure 29:
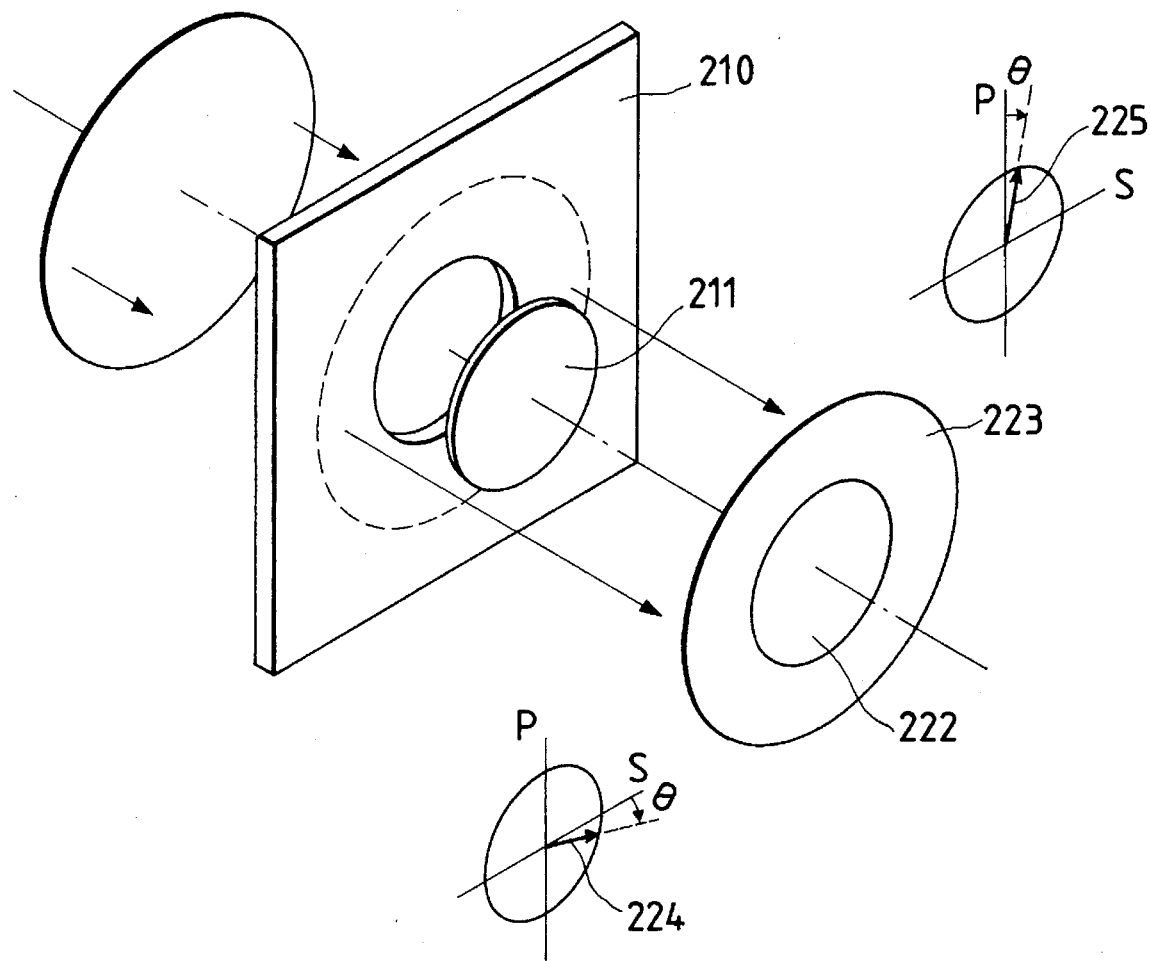
FIGS. 29, 34 and 42 are views showing the behavior of light beams after passing through a ½ wavelength plate.

FIG. 29 is a view showing the light beams after passing the ½ wavelength plate 211 as viewed in front of or upstream of the third polarized light beam splitter 212. The direction of polarization of a light beam 222 in the central region having passed through the ½ wavelength plate 211 is indicated by 224 and angularly spaced 90° from the direction 225 of polarization of a light beam 223 in the peripheral region having not passed through the ½ wavelength plate 211.

Figure 30:
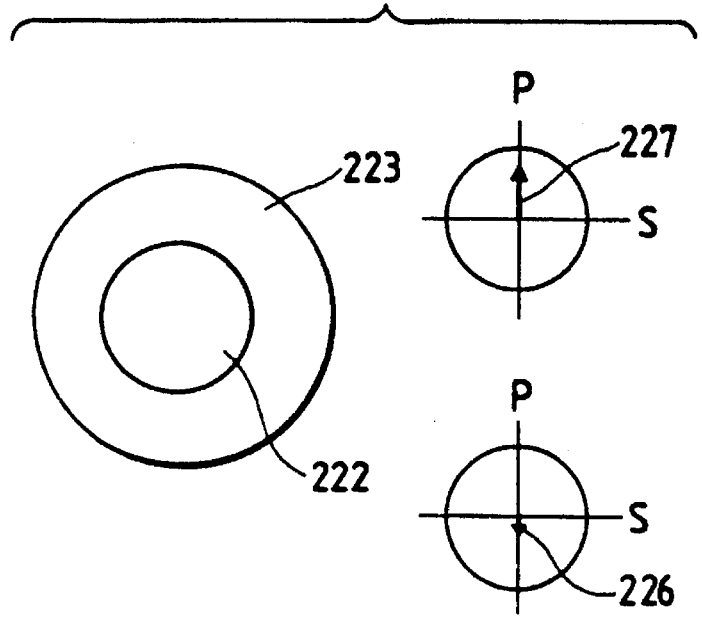
FIGS. 30, 31, 35, 36, 43 and 44 are views showing polarized components of light beams after passing through a polarized light beam splitter.

Accordingly, looking at the P-polarized components of the light beams 222, 223 after passing through the third polarized light beam splitter 212, they appear as shown in FIG. 30. In FIG. 30, the polarized components of the transmitted light beams 222 in the central region and 223 in the peripheral region are given by P-polarized components of the light beams polarized in the directions 224, 225 as shown in FIG. 29, and thus have field vectors indicated by 226, 227, respectively.

Figure 31:
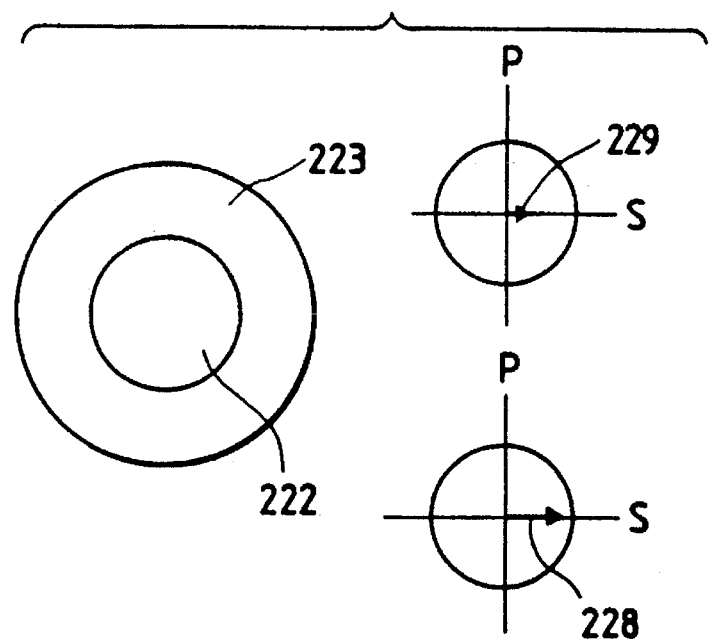

Likewise, looking at the S-polarized components of the light beams 222, 223 after being reflected by the third polarized light beam splitter 212, they appear as shown in FIG. 31. In FIG. 31, the polarized components of the reflected light beams 222 in the central region and 223 in the peripheral region are given by S-polarized components of the light beams polarized in the directions 224, 225 as shown in FIG. 29, and thus have field vectors indicated by 228, 229, respectively.

Figure 32:
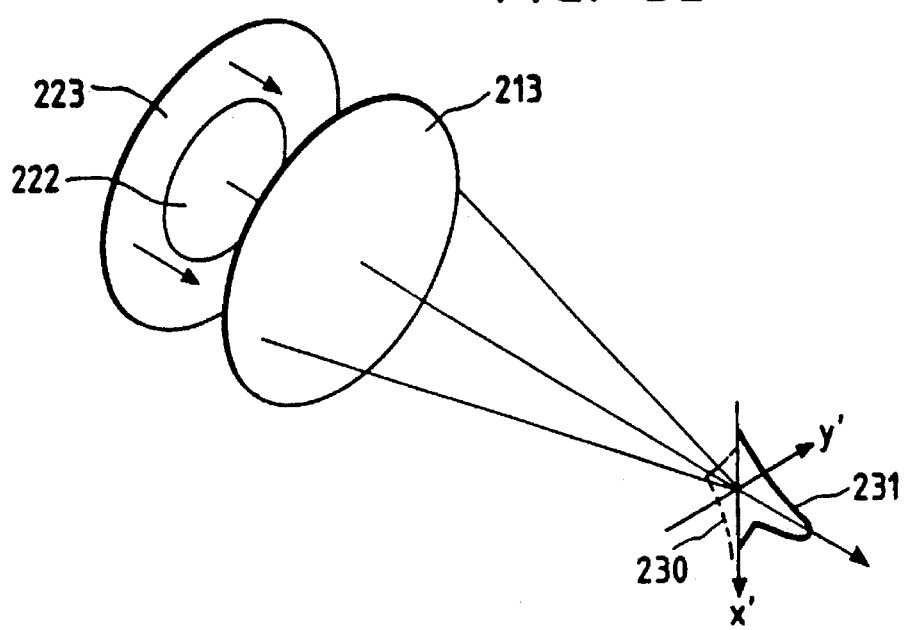
FIGS. 32, 37, 38, 39 and 40 are views showing examples of amplitude distribution of spot light.

FIG. 32 illustrates amplitude distribution of the spot light which is formed by the focusing lens 213 on the photoelectric transducer 214 from the light beams of P-polarized component, shown in FIG. 30, after passing through the third polarized light beam splitter 212. The light beam 223 in the peripheral region exhibits amplitude distribution 231.

On the other hand, the light beam 222 in the peripheral region exhibits amplitude distribution 230 out of phase by $\pi$ with respect to the amplitude distribution 231. These two profiles of amplitude distribution 230, 231 are each in point symmetry about the optical axis. The photoelectric transducers detect the intensity distribution resulted from interference between the two profiles of amplitude distribution. Accordingly, the light beams of equal intensity are incident upon the two divided photo-electric transducers 214-1, 214-2 in FIG. 27, so that these two photoelectric transducers issue output signals of equal amplitude and thus a difference signal therebetween becomes zero.

Meanwhile, for amplitude distribution of the spot light which is formed by the focusing lens 215 on the photoelectric transducer 216 from the light beams of S-polarized component, shown in FIG. 31, reflected by the third polarized light beam splitter 212, the intensity distribution resulting from interference between amplitude distribution of the spot light due to the light beam 222 in the central region and amplitude distribution of the spot light due to the light beam 223 in the peripheral region is similarly incident upon the 2-division photoelectric transducer 216. In this case, the phase difference between the two profiles of amplitude distribution is zero, and each amplitude distribution is in point symmetry about the optical axis. Therefore, the two photoelectric transducers 216-1, 216-2 issue output signals of equal amplitude and thus a difference signal therebetween becomes zero.

Figure 33:
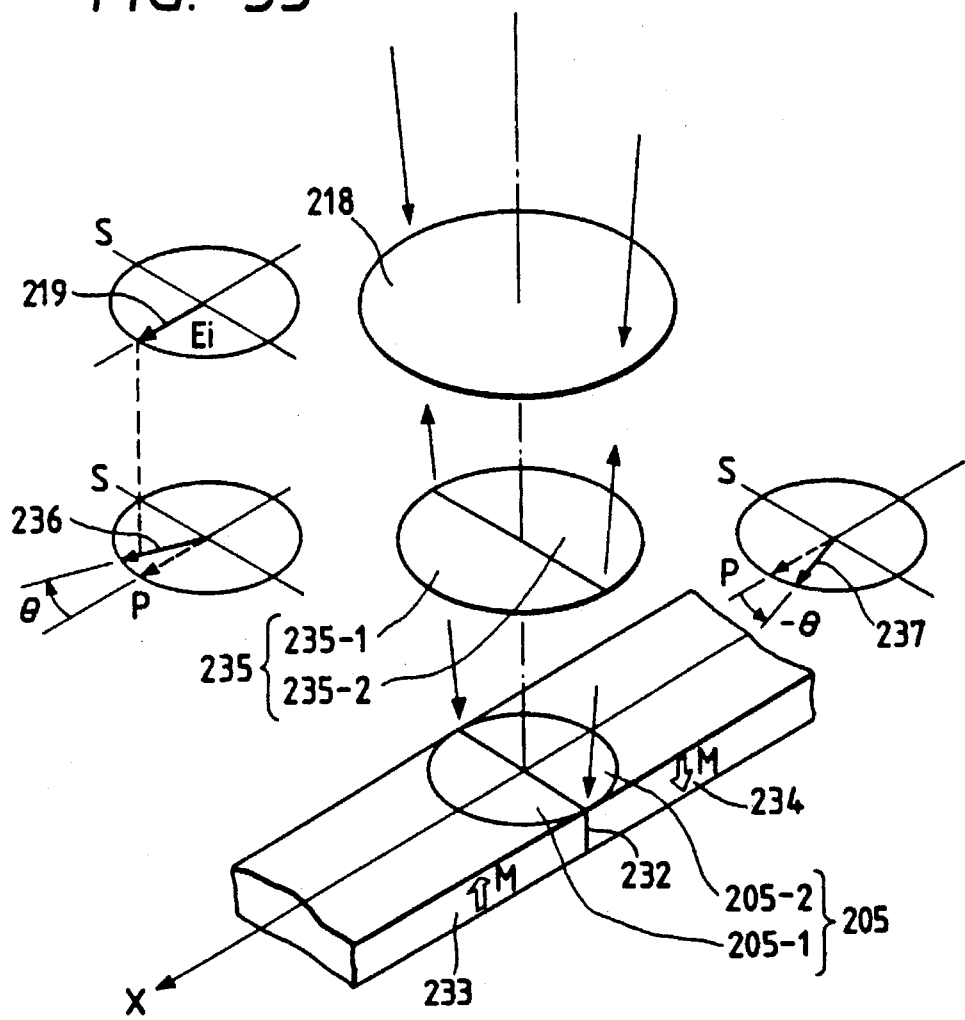
FIGS. 33 and 41 are views showing the behavior as occurred when a light spot is incident upon an edge of the information magnetic domain of the recording medium.

FIG. 33 illustrates the behavior as occurred when the light spot 205 is incident upon an edge of the information magnetic domain recorded on the opto-magnetic recording film.

The direction of field vector of the incident light beam 218 is the same as the above case of FIG. 28 and thus indicated by 219. The information magnetic domains upon which the light spot 205 impinges are magnetized in the opposite directions, as indicated by 233 and 234, with an edge 232 as a boundary therebetween. Let it be assumed that of the wave front of the incident light spot 205, the region Under an influence of the magnetization 233 is 205-1 and the region under an influence of the magnetization 234 is 205-2. The light in the wave front region 205-1 undergoes the magnetic Kerr effect due to the magnetization 233, whereby a beam portion 235-1 of the reflected light beam 235 corresponding to the region 205-1 is subjected to Kerr rotation in the same direction as the above case of FIG. 28. The resulting field vector of the beam portion 235-1 is indicated by 236.

On the other hand, the light in the wave front region 205-2 undergoes the magnetic Kerr effect due to the magnetization 234, whereby a beam portion 235-2 of the reflected light beam 235 corresponding to the region 205-2 is rotated in the plane of polarization thereof in the opposite direction to the beam portion 235-1. The resulting field vector of the beam portion 235-2 is indicated by 237

After passing through the objective lens 204, the reflected light beam is further reflected by the first polarized light beam splitter 203 and then the second polarized light beam splitter 208, followed by going toward the phase difference adjuster optical element 210 and the ½ wavelength plate 211. Looking at polarized components of the light beams after passing the ½ wavelength plate, they appear as shown in FIG. 34.

Figure 34:
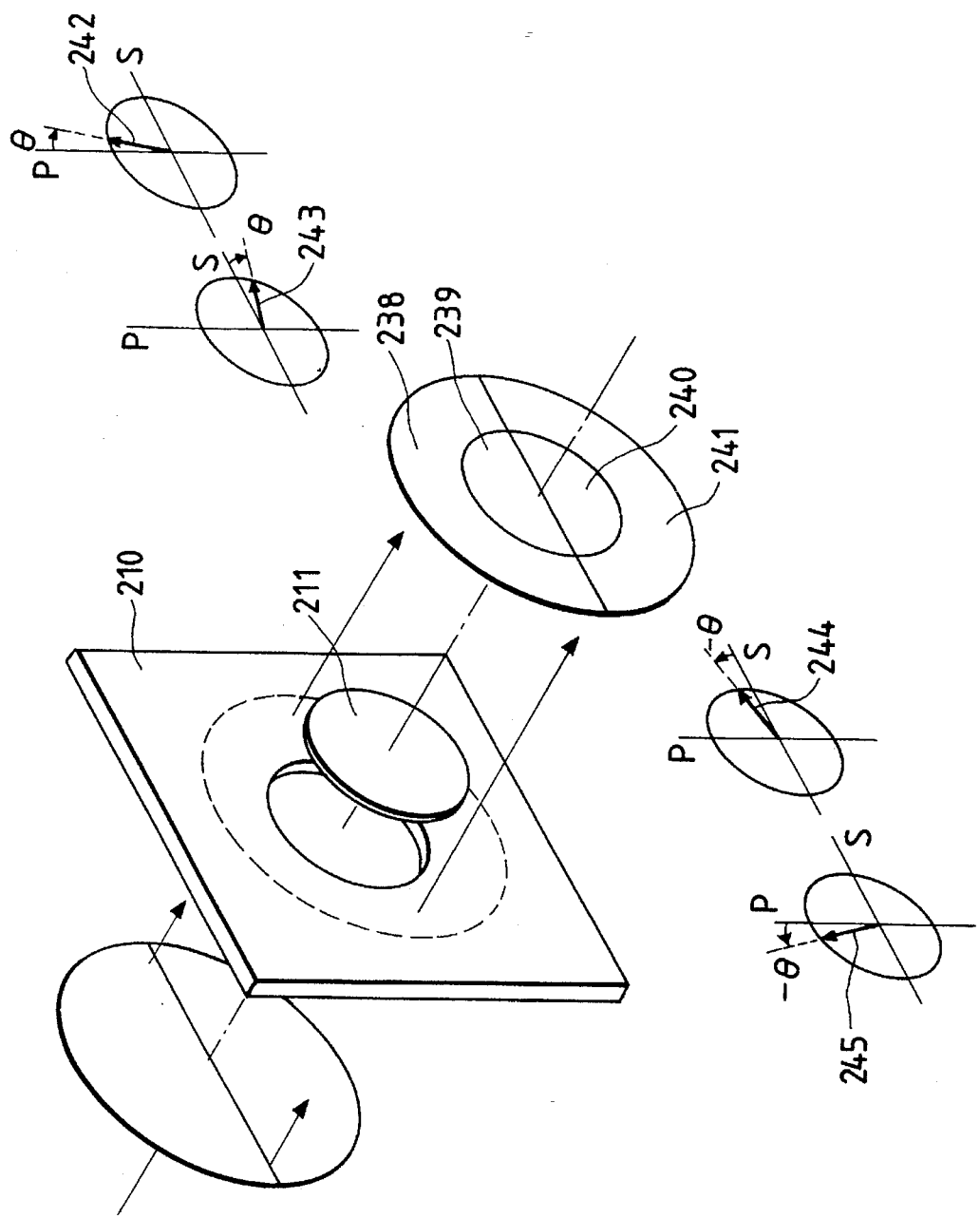

FIG. 34 is a view similar to FIG. 29, in which the direction of polarization of a light beam 239 in the upper central region having passed through the ½ wavelength plate 211 is indicated by 243 and angularly spaced 90° from the direction 242 of polarization Of a light beam 238 in the upper peripheral region having not passed through the ½ wavelength plate 211. In a like manner, the direction of polarization of a light beam 240 in the lower central region is indicated by 244 and angularly spaced 90° from the direction 245 of polarization of a light beam 241 in the lower peripheral region.

Figure 35:
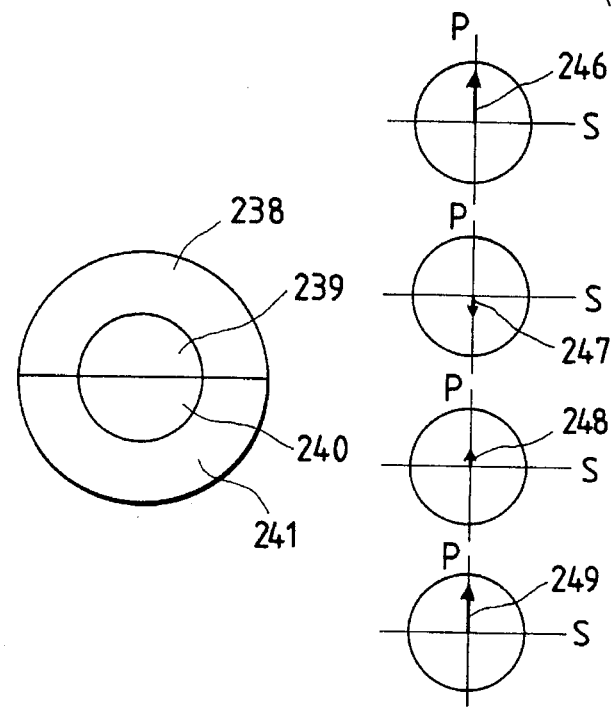

Accordingly, looking at the P-polarized components of the light beams 238 to 241 after passing through the third polarized light beam splitter 212, they appear as shown in FIG. 35. In FIG. 35, the polarized components of the transmitted light beams 239 in the upper central region and 238 in the upper peripheral region are given by P-polarized components of the light beams polarized in the directions 243, 242 as shown in FIG. 34, and thus have field vectors indicated by 247, 246, respectively. In a like manner, the polarized components of the transmitted light beams 240 in the lower central region and 241 in the lower peripheral region are given by P-polarized components of the light beams polarized in the directions 244, 245 as shown in FIG. 34, and thus have field vectors indicated by 248, 249, respectively.

Figure 36:
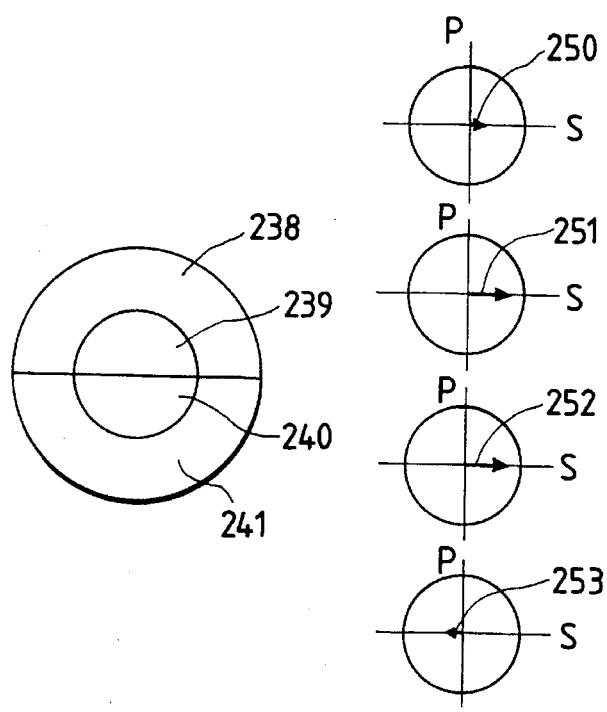

Likewise, looking at the S-polarized components of the light beams 238 to 241 after being reflected by the third polarized light beam splitter 212, they appear as shown in FIG. 36. In FIG. 36, the polarized components of the reflected light beams 239 in the upper central region and 238 in the upper peripheral region are given by S-polarized components of the light beams polarized in the directions 243, 242 as shown in FIG. 34, and thus have field vectors indicated by 251, 250, respectively. In a like manner, the polarized components of the transmitted light beams 240 in the lower central region and 241 in the lower pheripheral region are given by S-polarized components of the light beams polarized in the directions 244, 245 as shown in FIG. 34, and thus have field vectors indicated by 252, 253, respectively.

Figure 37:
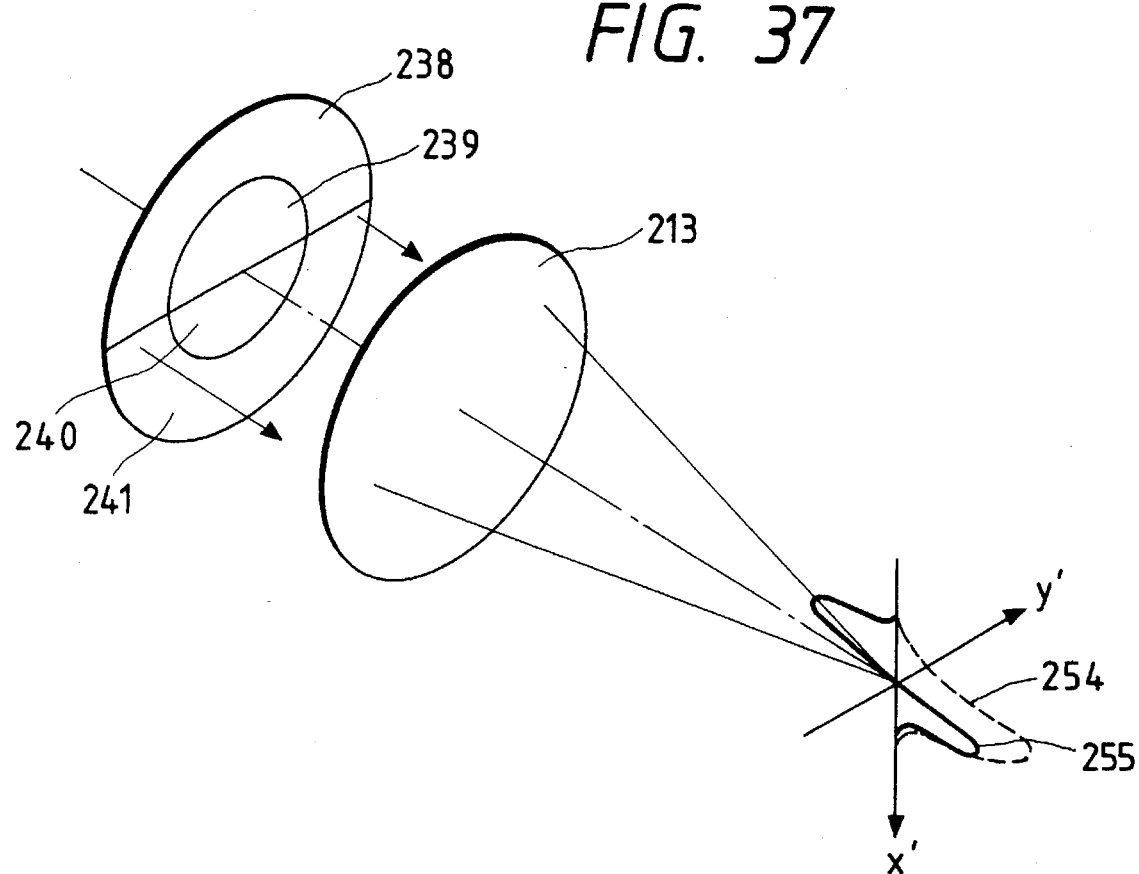
Figure 38:
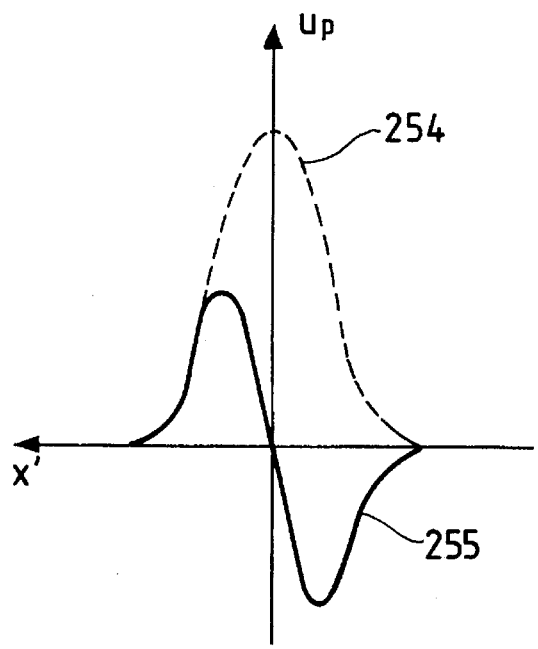

FIG. 37 illustrates amplitude distribution of the spot light which is formed by the focusing lens 213 on the photoelectric transducer 214 from the light beams of P-polarized component, shown in FIG. 35, after passing through the third polarized light beam splitter 212. The P-polarized light beams 238, 241 in the peripheral regions have large amplitudes as indicated by 246, 249 in FIG. 35 and are in phase, thereby developing amplitude distribution 254 (broken line) through the focusing lens 213. On the other hand, the P-polarized light beams 239, 240 in the central regions have small amplitudes as indicated by 247, 248 in FIG. 35 and are out of phase by $\pi$ in the wave fronts of those light beams, thereby developing amplitude distribution 255 (solid line) through the focusing lens 213. Unlike the amplitude distribution 254, the amplitude distribution 255 is reduced down to zero on the optical axis and exhibits positive and negative amplitudes on both sides of the optical axis. Given the x', y' coordinates being on the surface of the photoelectric transducer with the origin set on the optical axis, as shown in FIG. 27, the amplitude distribution along the x' axis at y'=0 is plotted in FIG. 38. The photoelectric transducer detects the intensity distribution resulting from interference between the two profiles of amplitude distribution 254, 255. As a result of this interference between the two profiles of amplitude distribution, the smaller intensity distribution is produced on one 214-1 of the 2-division photoelectric transducer 214 in FIG. 27, while the larger intensity distribution is produced on the other photoelectric transducer 214-2, so that these two photoelectric transducers issue output signals of unequal amplitude and a difference signal therebetween becomes minus.

Figure 39:
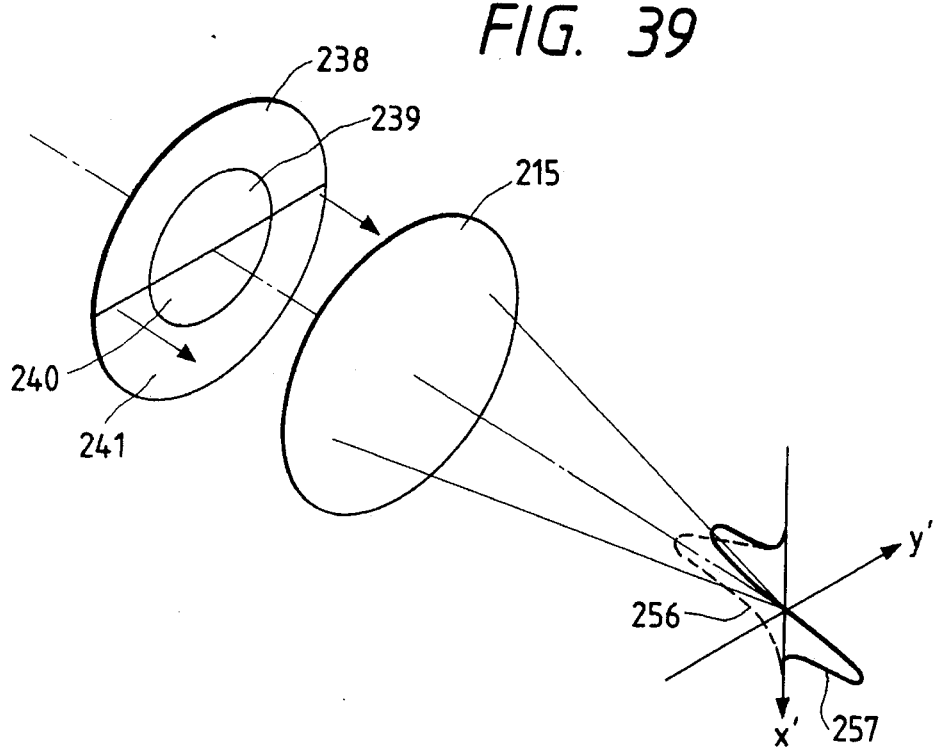
Figure 40:
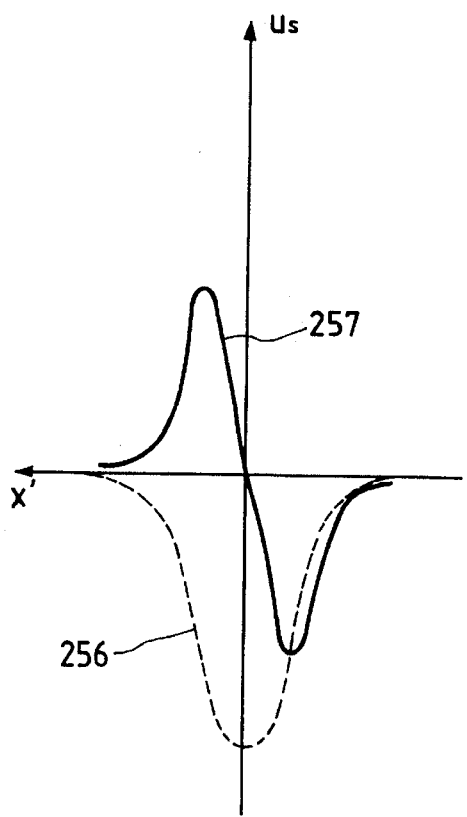

Meanwhile, for amplitude distribution of the spot light which is formed by the focusing lens 215 on the photoelectric transducer 216 from the light beams of S-polarized component, shown in FIG. 36, reflected by the third polarized light beam splitter 212, the intensity distribution resulted from interference between amplitude distribution 256 (broken line) of the spot light due to the in-phase light beams in the central regions 239, 240 of large amplitude and amplitude distribution 257 (solid line) of the spot light due to the out-of-phase light beams in the peripheral regions 238, 240 of small amplitude, having a phase skip of $\pi$, is similarly incident upon the 2-division photoelectric transducer 216 as shown in FIG. 39. The respective profiles of amplitude distribution 256, 257 are shown in FIG. 40 in a like manner to FIG. 38. In this case, the two profiles of amplitude distribution are also interfered with each other like the above case of FIG. 37, leading to a difference in the intensity distribution on both sides of the optical axis. Consequently, the two photoelectric transducers 216-1, 216-2 issue output signals of unequal amplitude and a difference signal therebetween becomes positive.

Figure 41:
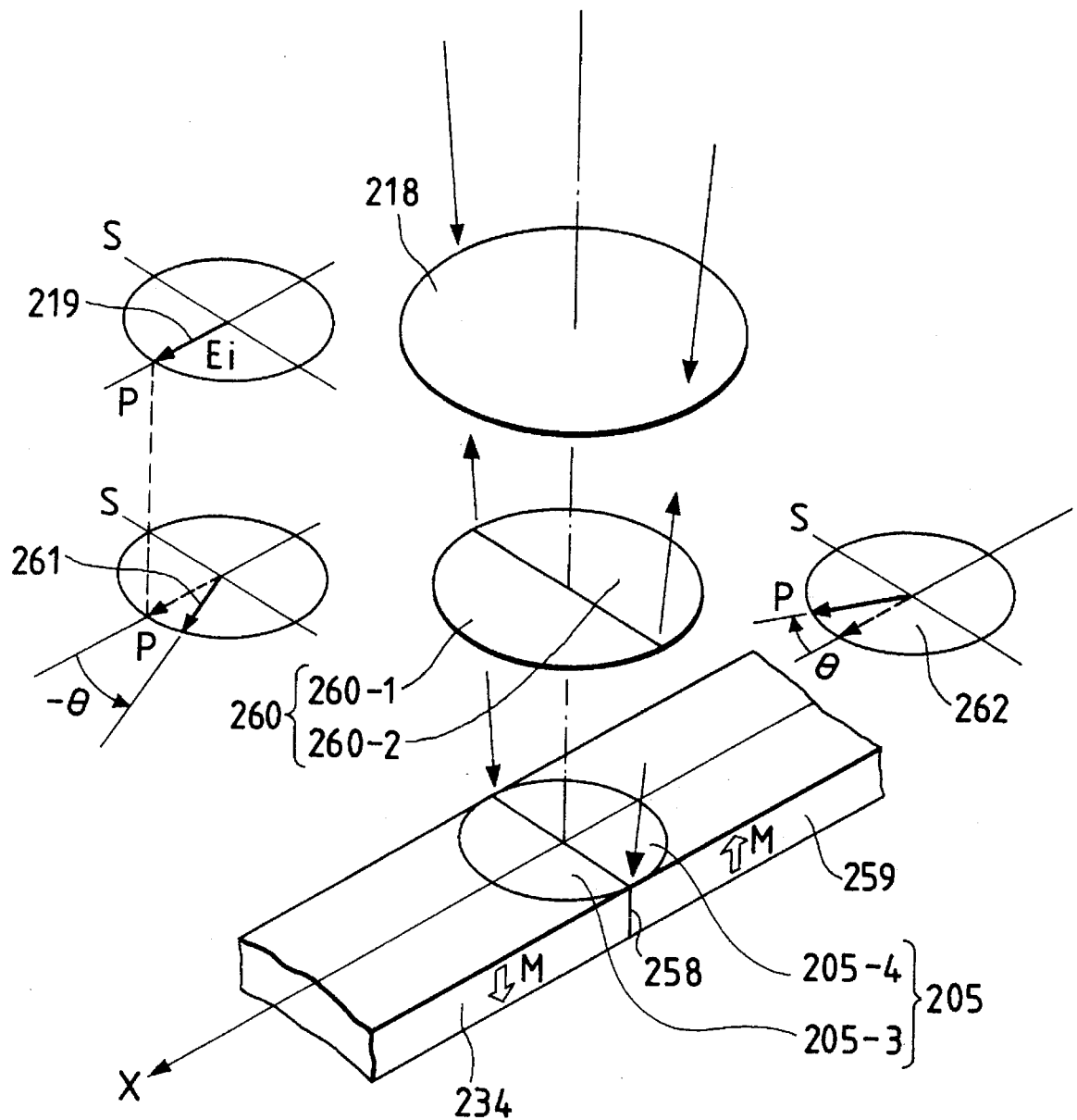

FIG. 41 illustrates the behavior as occurred when the light spot 205 is moved relative to the information track and crossing over a next one to the edge of the information magnetic domain shown in FIG. 33. The direction of field vector of the incident light beam 218 is the same as the above case of FIG. 33 and thus indicated by 219. The information magnetic domains upon which the light spot 205 impinges are magnetized in the opposite directions, as indicated by 234 and 259, with an edge 258 as a boundary therebetween. Let it be assumed that of the wave front of the incident light spot 205, the region under an influence of the magnetization 234 is 205-3 and the region under an influence of the magnetization 259 is 205-4. As with the case of FIG. 33, the reflected wave front 260 is affected by the directions of magnetization differently in respective regions 260-1 and 260-2, and the field vectors in these wave front regions have their directions indicated by 261, 262, respectively. In comparison with the case of FIG. 33, it will be found that the directions of two field vectors in the reflected wave front 260 are opposite to each other.

Figure 42:
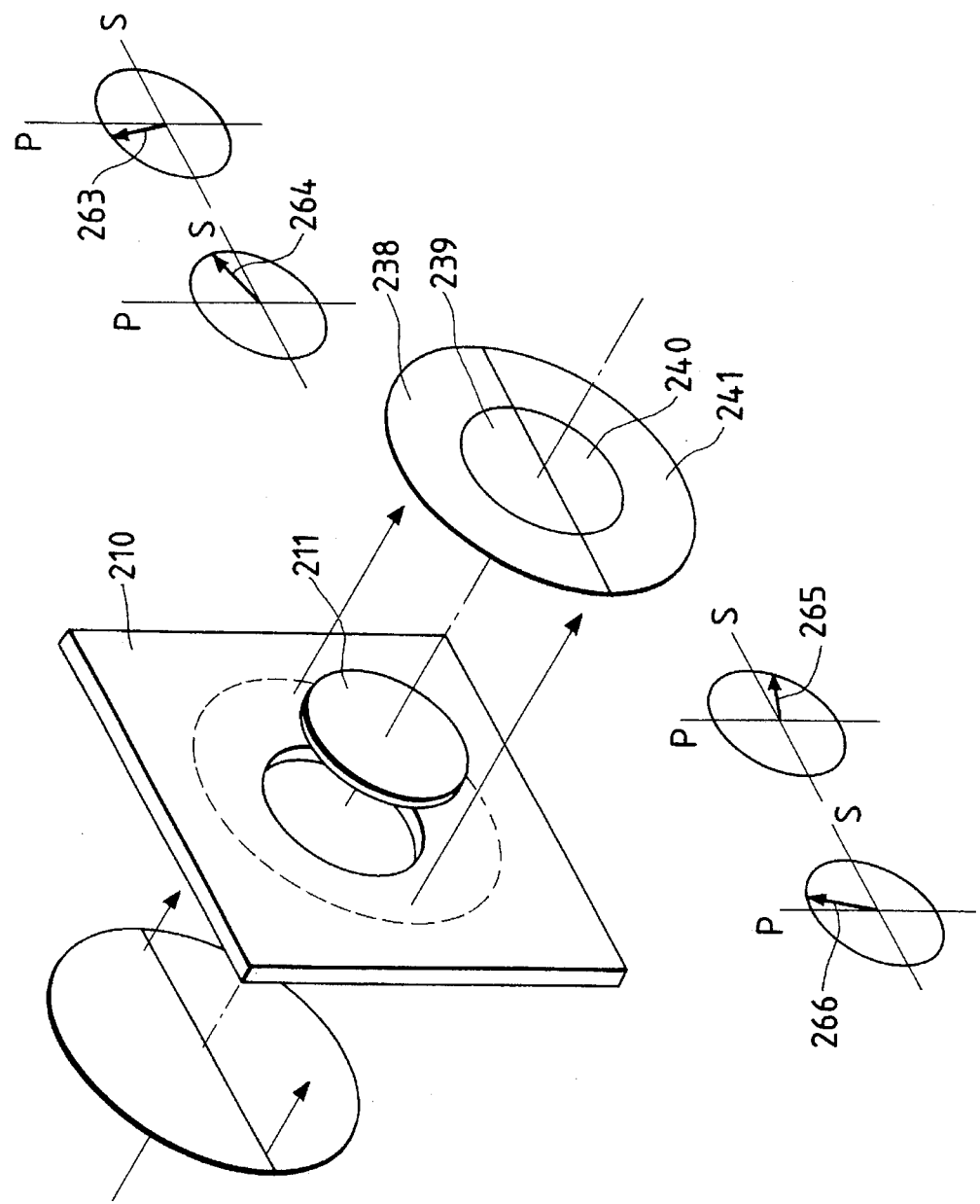
Figure 43:
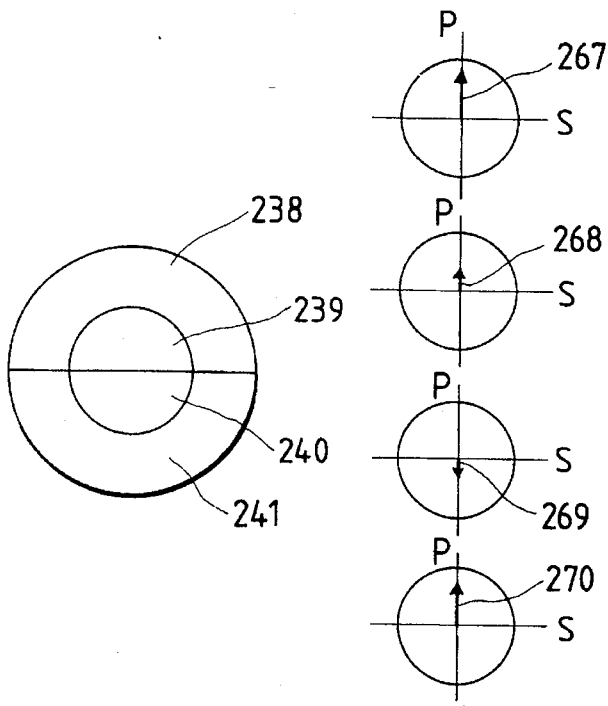
Figure 44:
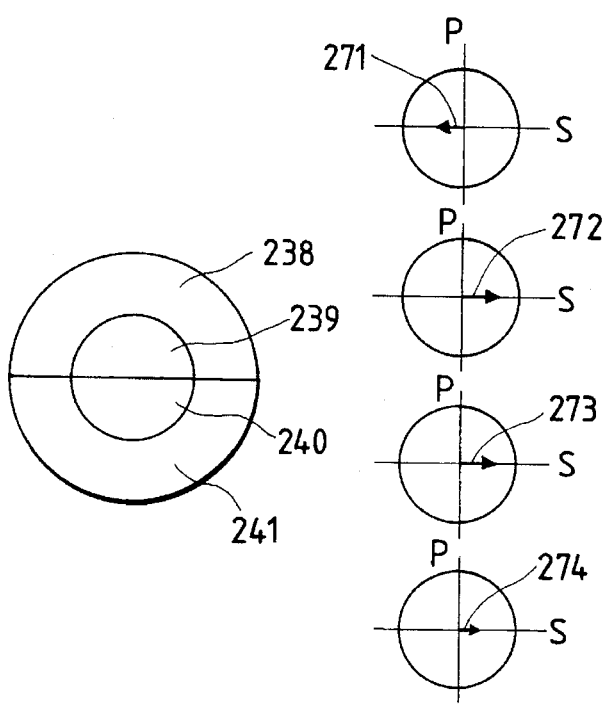

Accordingly, as with FIG. 34, the directions of field vectors of the wave fronts 238, 239, 240, 241 after passing the ½ wavelength plate can be indicated by 263, 264, 265, 266 in FIG. 42, respectively. Also, as with FIGS. 35 and 36, the P- and S-polarized components of field vectors of the wave fronts 238, 239, 240, 241 after passing through the ½ wavelength plate and then passing through or being reflected by the third polarized light beam splitter 212 can be expressed as shown in FIGS. 43 and 44, respectively. In either polarized component, the light beams of larger amplitude component (e.g., 267, 270) have the same directions as the cases of FIGS 35 and 36, whereas the light beams of smaller amplitude component (e.g., 268, 269), containing edge information, have the their directions opposite it the cases of FIGS. 35 and 36. Accordingly, the profiles of amplitude distribution created by the light beams of smaller amplitude component are reversed in their positive and negative directions as compared with the profiles of corresponding amplitude distribution of FIGS. 38, 40. As a result, a difference signal from each 2-division photosensitive transducer has a sign opposite to the case of FIG. 33.

With this embodiment, as mentioned above, it is possible to realize an optical head for an opto-magnetic disk which can precisely detect magnetic domain edges by using a difference signal from the 2-division photoelectric transducer, without modifying a conventional optical system to large extent.

Further, by Creating a difference signal between the two difference signals from both the 2-division photoelectric transducers, it is also possible to detect the direction of change in magnetization on both sides of the edge by using the final difference signal. More specifically, assuming that the difference signal from the two divided photoelectric transducers 214-1, 214-2 is S1, the difference signal from the two divided photoelectric transducers 216-1, 216-2 is S2, and the difference S1–S2 between those two signals is an edge detection signal, there can be obtained trains of signals as shown in FIG. 45. This means that the edge detection signal can result corresponding to the directions of change in magnetization on both sides of the edge. In FIG. 45, 275-1, 275-2, 275-3 each indicate one information magnetic domain. The arrow in each information magnetic domain represents the direction of magnetization.

In this embodiment, the presence or absence of edge is detected depending on whether or not there is a phase skip in the S-polarized component contained in the light beam immediately after reflection from the opto-magnetic recording medium. The phase skip is produced by the presence of boundary edge between the information magnetic domains recorded on the opto-magnetic recording medium and, therefore, the light beam of S-polarized component immediately after reflection from the opto-magnetic recording medium polarized has a phase change distributed on both sides of a straight line including the optical axis and is perpendicular to the tack direction. Accordingly, in order to detect the phase skip in the light beam of S-polarized component, the phases of the light beam distributed on both sides of the straight line including the optical axis and being perpendicular to the track direction must be compared with each other. The ½ wavelength plate used for rotating the S-polarized light by 90 degrees to that end is only required to pass the light beams to be compared therethrough, and is not necessarily required to have a concentric shape including the optical axis like this embodiment. Alternatively, a polarized light rotator element such as a Faraday rotator may be used instead.

Figure 46:
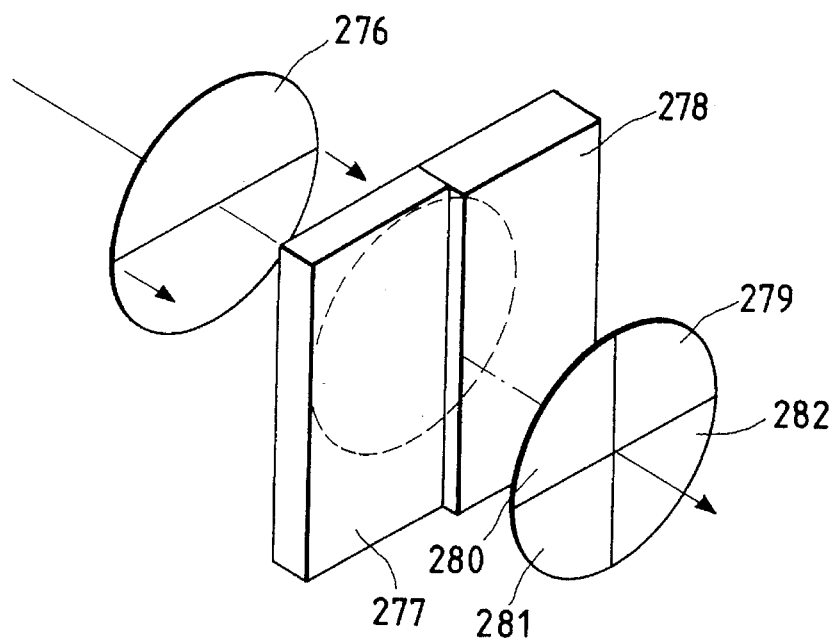
FIG. 46 is a view showing a ½ wavelength plate and a phase difference adjuster optical element.

FIG. 46 illustrates another configuration example of a ½ wavelength plate and a phase difference adjuster optical element which are to be replaced with the ½ wavelength plate 211 and the phase difference adjuster optical element 210. In FIG. 46, denoted by 276 is a reflected light beam from the second polarized light beam splitter 208, 277 is a ½ wavelength plate, and 278 is a phase difference adjuster optical element, the ½ wavelength plate 277 and the phase difference adjuster optical element 278 being arranged to divide the light beam 276 into two left and right regions at a vertical center line thereof. Accordingly, the wave front of the light beam after passing through those optical elements is divided to four beam portions 279, 280, 281, 282 corresponding to the light beams 238, 239, 240, 241 in FIG. 34, respectively. Thus, field vectors of the beam portions 279 to 282 are also the same as those indicated by 242 to 245 in FIG. 34. By leading those beam portions to the third polarized light beam splitter 212, it is possible to constitute an optical head which can perform the same function as the foregoing example.

In this embodiment, the bias light amplitude is secured using the light beam of P-polarized component in the reflected light beam immediately after reflection by the opto-magnetic recording medium, and the light beam of S-polarized component containing edge information is interfered with the light beam of this bias light amplitude, thereby detecting the edge information. For increasing sensitivity of the detection, it is desirable that the two light beams to be interfered with each other have their amplitudes as equal as possible. However, since the Kerr rotation angle θ produced by the opto-magnetic recording medium is a small value on the order of about 1 degree, the amplitude of the light beam of P-polarized component is much smaller than that of the light beam of S-polarized component. It is therefore desirable for improved sensitivity of the edge detection to reduce the amplitude of the light beam of P-polarized component using an absorption filter or the like in an allowable range in consideration of the light intensity necessary for the photoelectric transducer, thereby making the amplitudes of both the light beams close to each other.

Further, in this embodiment, the two light beams of P- and S-polarized components, which are contained in the reflected beam from the opto-magnetic recording medium and crossing perpendicularly, are interfered with each other by causing the S-polarized component of a part of the light beam in the pupil to pass through the ½ wavelength plate, for rotating the field vector of that S-polarized component light by 90 degrees so that it can interfere with the P-polarized component light in other region of the pupil which has not been rotated in the direction of polarization thereof. Then, the light beams occupying different spatial positions in the pupil are focused by the focusing lens to make interference therebetween. Accordingly, as to the size of focused light spots formed by both the light beams, the light spot size of the P-polarized component light corresponding to the aforesaid bias light amplitude is desirably slightly larger than or almost equal to that of the S-polarized component light. For this purpose, it is desirable that an aperture is disposed in front of the focusing lens to control each focused spot size.

Figure 47:
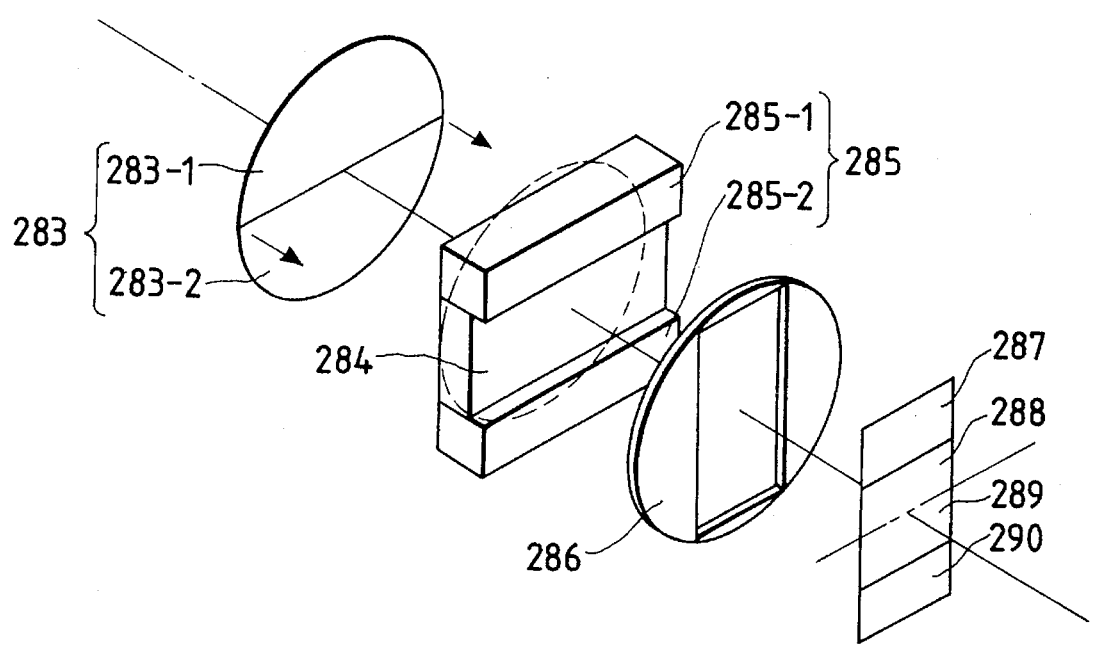
FIG. 47 is a view showing an optical system replaceable with the=optical system of FIG. 34.

FIG. 47 illustrates one example of an optical system designed to meet Such a demand and being replacable with the foregoing optical system of FIG. 34. Denoted by 283 is a reflected light beam from the second polarized light beam splitter 208, 284 is a ½ wavelength plate, and 285 is a phase difference adjuster optical element comprising two parts 285-1 and 285-2. 286 is a shield plate having a rectangular aperture (or opening) defined at the center. The aperture size corresponds to two squares which are inscribed in an upper region 283-1 and a lower region 283-2 of the incident light beam 283, respectively, and are joined to each other vertically. The vertical width of the ½ wavelength plate 284 is a half the vertical width of the aperture, and the vertical width of each phase difference adjuster optical element 285-1, 285-2 is a quarter the vertical width of the aperture. Therefore, the light beam after passing through the ½ wavelength plate the phase difference adjuster optical element and the aperture is divided into four beam portions 287, 288, 289, 290. These beam portions correspond to the light beams 238, 239, 240, 241 in FIG. 34,respectively, and have rectangular shapes of almost equal size. As a result, by leading those beam portions to the third polarized light beam splitter 212 and focusing them through the focusing lens 213 or 215, the spot sizes formed by the respective beam portions are almost equal to each other.

Moreover, the phase difference adjuster optical element used in this embodiment is not limited to the one described in connection with FIG. 27. As an alternative, for example, the phase difference adjuster optical element may be formed by using the same member (made of the same material and having the same thickness) as the ½ wavelength plate in the above embodiment and arranging it such that the direction of optical axis thereof is aligned with the direction of the P-polarized light, i.e., may be the same member as the ½ wavelength plate which is changed in the direction of optical axis thereof. This modification is advantageous in eliminating a stepped margin due to a thickness difference between the two optical elements as can be seen in FIGS. 46 and 47, and thus generating no diffraction noise from the stepped margin.

In this embodiment, since the irradiated linearly polarized light (P-polarized light) is interfered with the polarized component (S-polarized light) produced under the Kerr effect perpendicularly thereto, there is no need of arranging a polarized light beam splitter in a 45°-rotated state as usually practiced in a differential detection system of the prior art.

As described%above, according to the seventh embodiment and its modifications of the present invention, there is provided an optical information recording/reproducing apparatus in which a light beam from a semiconductor laser is led as small spot light by a light irradiating optical system to an information track defined on an opto-magnetic information recording surface through an objective lens, and the light reflected by the information recording surface is led to a light detector by a light receiving optical system through the objective lens so that the information recorded on the information recording surface is reproduced by utilization of the magneto-optic effect, wherein the light receiving optical system includes a polarizing direction rotator optical element for rotating the direction of polarization of the light beam by 90 degrees in a partial area of the reflected light beam from the information track and a phase difference adjuster optical element capable of adjusting a phase difference between the light beam in the above area and the light beam out of the above area to a certain value; the light beam portion rotated in the direction of polarization thereof and the light beam portion not rotated in the direction of polarization thereof are interfered with each other; and a focused light spot of the interference light beam is led to a 2-division photoelectric transducing light detector, whereby edges of the information magnetic domains recorded on the information track are detected by using a differential signal from the 2-division photoelectric transducing light detector.

In short, the present invention represented by the seventh embodiment and its modifications are to realize an optical head for an opto-magnetic disk which can precisely detect edges of the information magnetic domains by using the S-polarized component produced b an opto-magnetic recording film under the magnetic Kerr effect, without complicating the structure of a conventional opto-magnetic head.

Yet another embodiment of the optical information recording/reproducing apparatus of the present invention will be described with reference to the subsequent drawings.

FIGS. 48 to 53 are views for explaining an eighth embodiment of he present invention.

Figure 48:
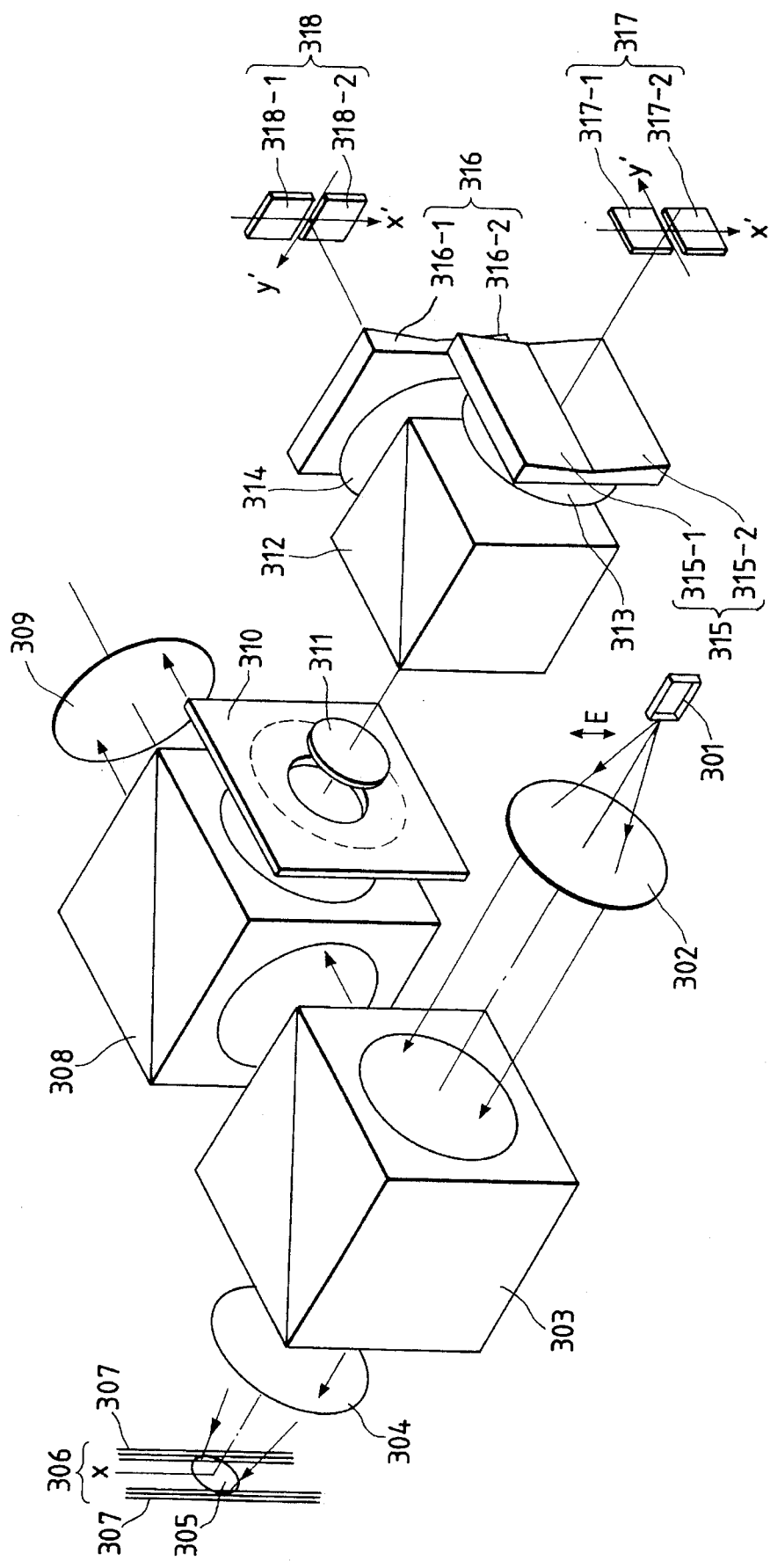
FIG. 48 is a schematic view of another optical head for use in an optical information recording/reproducing apparatus of the present invention.

FIG. 48 is a schematic view of an opto-magnetically recording and reproducing optical head for use in the optical information recording/reproducing apparatus of the present invention. In FIG. 48, denoted by 301 is a semiconductor laser emitting a beam of linearly polarized light (the direction of which field vector is indicated by E) of wavelength λ (λ=830 nm), 302 is a collimator lens for converting the emitted light beam into a parallel light beam, 303 is a first polarized light beam splitter for passing most of the polarized component in the direction E therethrough and reflecting 100% of the polarized component in a direction perpendicular to E, and 304 is an objective lens. 305 is a light spot focused by the objective lens, 306 is one information track defined on an opto-magnetic disk as an opto-magnetic recording medium, and 307 is a guide groove provided for tracking control of the light spot. 308 is a second polarized light beam splitter for reflecting 100% of the S-polarized component and reflecting a part of the P-polarized component, and 309 is the wave front having passed through the beam splitter 308. 310 is a phase difference adjuster optical element for adjusting a phase difference in the light beam, 311 is a ½ wavelength plate, 312 is a third polarized light beam splitter for reflecting 100% of the S-polarized component and passing 100% of the P-polarized component, 313 and 314 are focusing lenses, 315 and 316 are pupil beam divider optical elements each comprising two prisms, and 317 and 318 are 2-division photoelectric transducers respectively comprising two elemental transducers 317-1, 317-2 and 318-1, 318-2.

When recording information on the information track 306 defined over the opto-magnetic disk (recording medium), the light spot 305 is irradiated to the information track 306, while applying an external magnetic field to the irradiated portion by a magnetic head (not shown), so that an information signal is recorded there.

The light beam emitted from the semiconductor laser 301 is linearly polarized light and the direction of its field vector is indicated by E in the drawing. Let it to be now assumed that the direction E is a direction of P-polarization and the direction perpendicular to E is a direction of S-polarization. The emitted light beam is converted into a parallel light beam by the collimator lens 302. The parallel light beam passes through the first polarized light beam splitter 303, and is focused as the light spot 305 by the objective lens 304 on the information track 306 formed in an opto-magnetic recording film made of TbFeCo or the like, after transmitting through a transparent substrate of the opto-magnetic disk (not shown).

The light beam reflected by the opto-magnetic recording film and thus subjected to the magnetic Kerr effect has the S-polarized component perpendicular to the direction E. The first polarized light beam splitter 303 reflects all of that S-polarized component and also a part of the originally P-polarized component, these two components entering the second polarized light beam splitter 308. The second polarized light beam splitter 308 has characteristics to reflect 100% of the S-polarized component and passes a part of the P-polarized component therethrough. Accordingly, a light beam 309 passing through the second polarized light beam splitter 308 is all the P-polarized component and is led to a focus detection optical system for auto-focusing control and a track detection optical system for auto-tracking control (both not shown). These detection optical systems can be implemented using any of various techniques known so far.

On the other hand, the light beam reflected by the second polarized light beam splitter 308 passes through the phase difference adjuster optical element 310. This optical element 310 adjusts the phase difference produced by a difference in optical path length between the light beam passing through the ½ wavelength plate 311 (described later) and the light beam in a peripheral region not passing through the ½ wavelength plate 311, so that it becomes 0. Therefore, assuming that the ½ wavelength plate 311 has a thickness d and a refractive index no for the ordinary ray, and the phase difference adjuster optical element 310 has a refractive index n, it is only required that a thickness D of the phase difference adjuster optical element made of an optically-isotropic, transparent dielectric is set to meet no·d=n·D. After passing through the phase difference adjuster optical element 310, the central light beam passes through the ½ wavelength plate 311. The ½ wavelength plate 311 is set to rotate respective field vectors of P-polarized light and S-polarized light passing therethrough by 90°. In fact, the optical axis of the ½ wavelength plate 311 forms an angle of 45° with respect to the direction of P-polarized light. On the other hand, the light beam in the peripheral region does not pass through the ½ wavelength plate 311 and, therefore, is not rotated in the direction of polarization thereof. 312 is a polarized light beam splitter for separating the interference light beam into two beams of P- and S-polarized light. The light beam of P-polarized component passes through the polarized light beam splitter 312 and is focused by the focusing lens 313 and the pupil divider prism 315, after which the light beam passing through the prism 315-1 enters one elemental photoelectric transducer 317-1 of the two-division photoelectric transducer 317 disposed near the focal plane of the focusing lens 313, whereas the light beam passing through the prism 315-2 enters the other elemental photoelectric transducer 317-2 also disposed near the focal plane of the focusing lens 313. Meanwhile, the light beam of S-polarized component is reflected by the polarized light beam splitter 312 and focused by the focusing lens 315 and the pupil divider prism 316, after which the light beam passing through the prism 316-1 enters one elemental photoelectric transducer 318-1 of the two-division photoelectric transducer 318 disposed near the focal plane of the focusing lens 314, whereas the light beam passing through the prism 316-2 enters the other elemental photoelectric transducer 318-2 also disposed near the focal plane of the focusing lens 314. The 2-division photoelectric transducers 317, 318 each have a division line extending in a direction (that is, y'-direction) perpendicular to the direction of the information track (that is, x'-direction).

Figure 49:
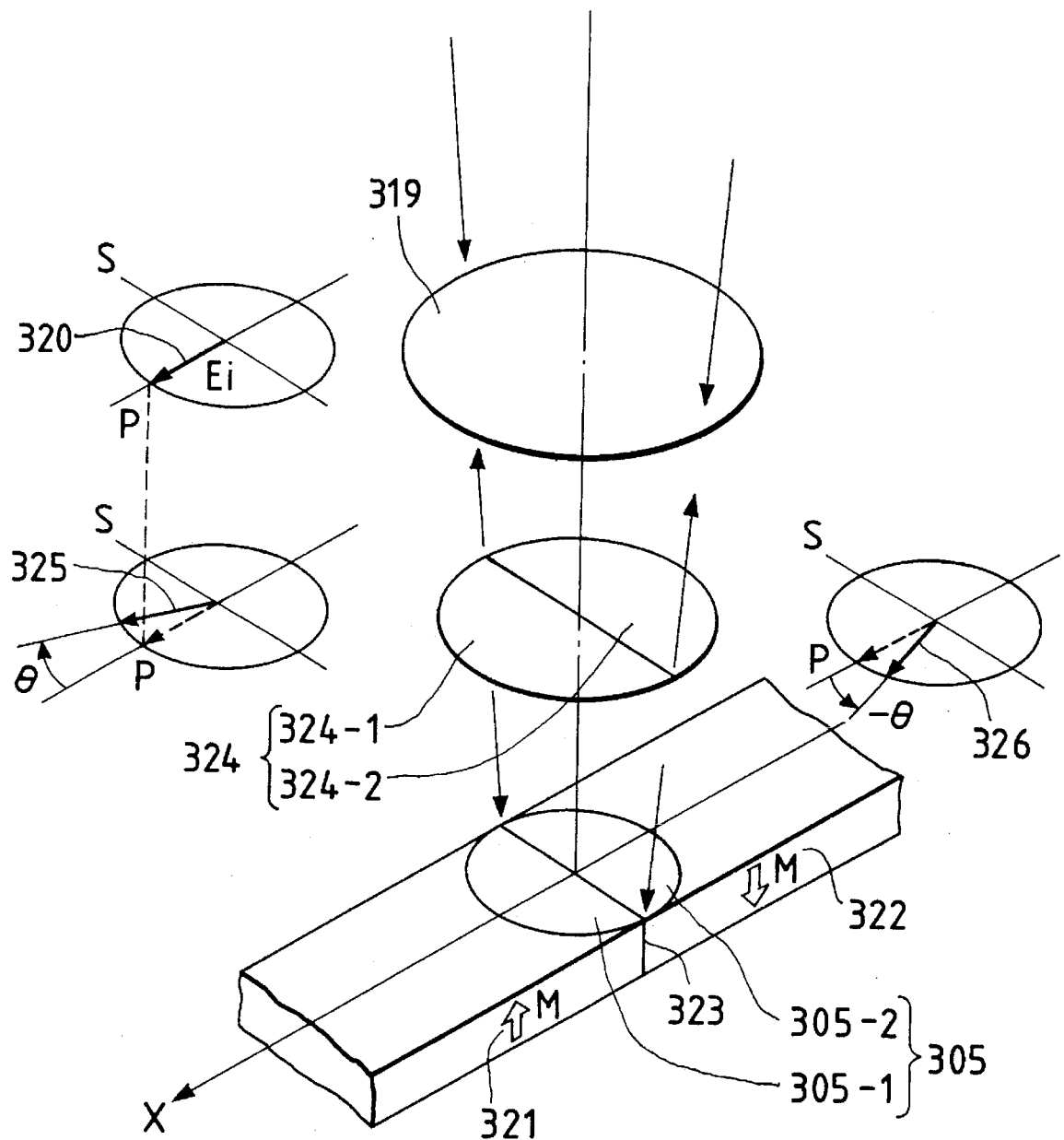
FIG. 49 is a view showing the behavior as occurred when a light spot is incident upon an edge of the recorded information magnetic domain.

FIG. 49 illustrates the behavior as occurred when the light spot 305 is incident upon an edge of the information magnetic domain recorded on the opto-magnetic recording film.

The direction of field vector of an incident light beam 319 is the same as the above-described case of FIG. 33 and indicated by 320. The information magnetic domains upon which the light spot 305 impinges are magnetized in the opposite directions, as indicated by 321 and 322, with an edge 323 as a boundary therebetween. Let it be assumed that of the wave front of the incident light spot 305, the region under an influence of the magnetization 321 is 305-1 and the region under an influence of the magnetization 322 is 305-2. The light in the wave front region 305-1 undergoes the magnetic Kerr effect due to the magnetization 321, whereby a beam portion 324-1 of the reflected light beam 324 corresponding to the region 305-1 is subjected to Kerr rotation, and the resulting field vector of the beam portion 324-1 is indicated by 325.

On the other hand, the light in the wave front region 305-2 undergoes the magnetic Kerr effect due to the magnetization 322, whereby a beam portion 324-2 of the reflected light beam 324 corresponding to the region 305-2 is rotated in the plane of polarization thereof in the opposite direction to the beam portion 324-1, and has its resulting field vector indicated by 326.

After passing through the objective lens 304, the reflected light beam is further reflected by the first polarized light beam splitter 303 and then the second polarized light beam splitter 308, followed by going toward the phase difference adjuster optical element 310 and the ½ wavelength plate 311. Looking at polarized components of the light beams after passing the ½ wavelength plate, they appear as shown in FIG. 50.

Figure 50:
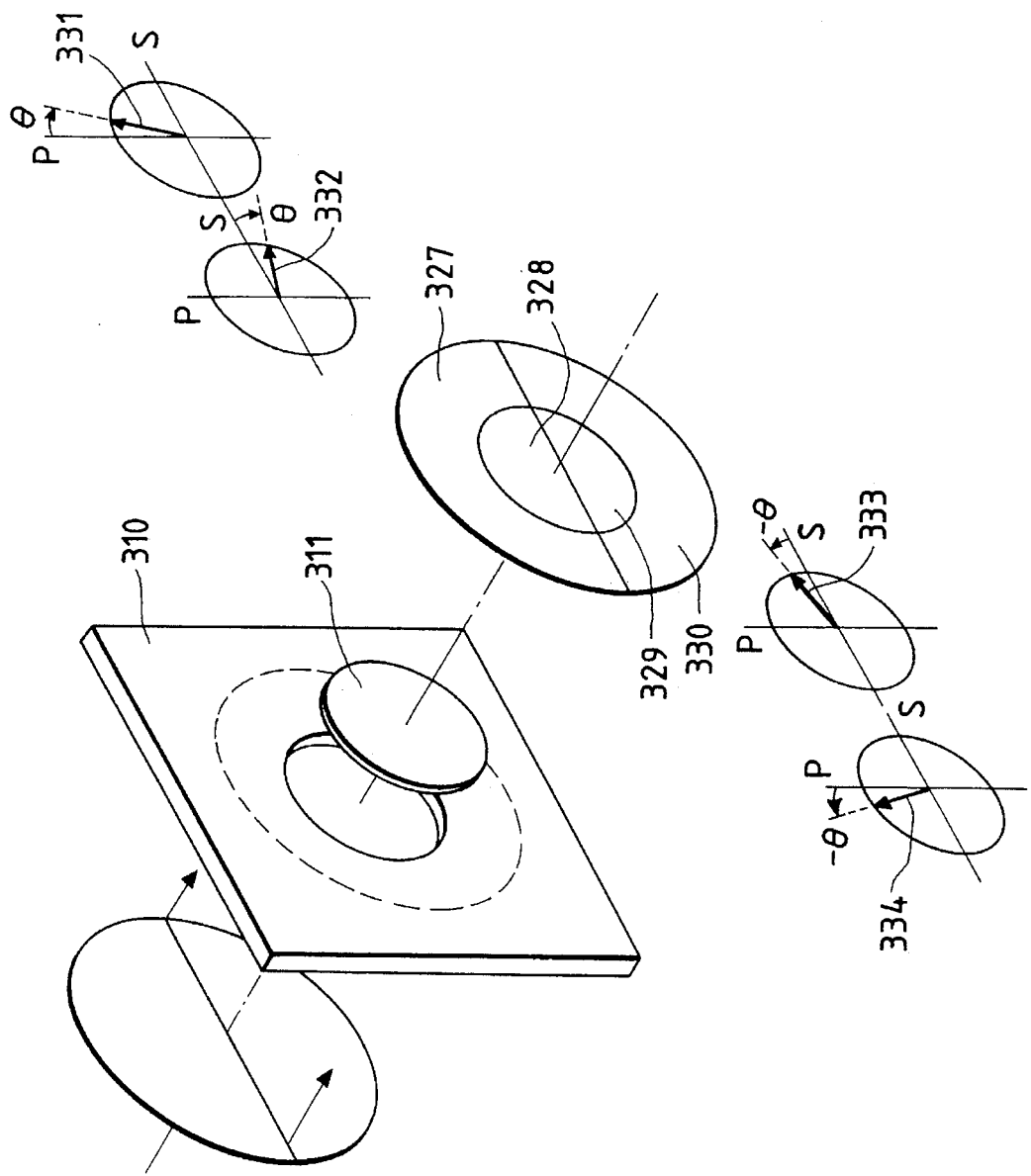
FIG. 50 is a view showing polarized components of light beams having passed through a ½ wavelength plate.

FIG. 50 is a view showing the light beams after passing the ½ wavelength plate 311 as viewed in front of or upstream of the third polarized light beam splitter 312. The directions of polarization of light beams 328, 329 in the central region having passed through the ½ wavelength plate 311 are indicated by 332, 333, and angularly spaced 90° from the directions 331, 334 of polarization of light beams 327, 330 in the peripheral region having not passed through the ½ wavelength plate 311, respectively.

Figure 51:
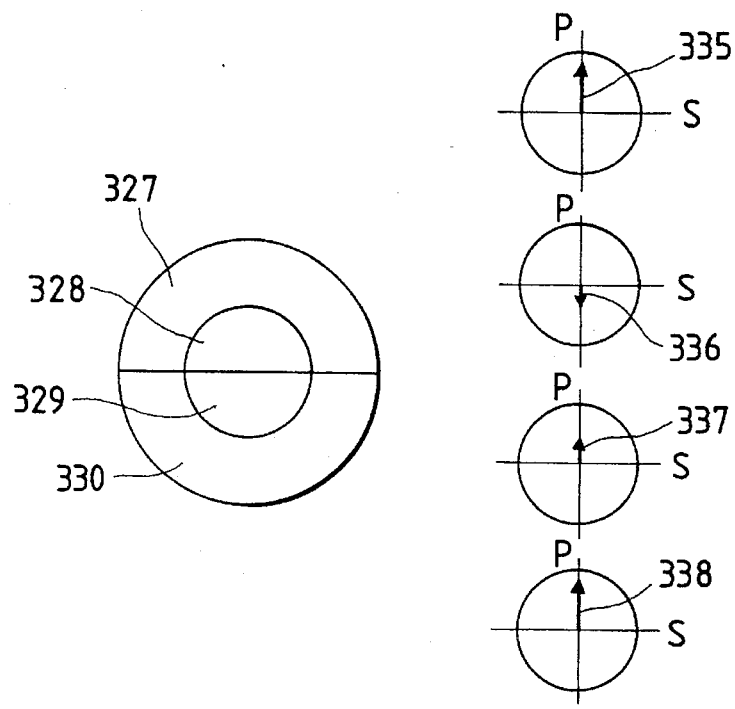
FIGS. 51 and 52 are views showing polarized components of light beams having passed through a polarized light beam splitter.

Accordingly, looking at the P-polarized components of the light beams 327 to 330 after passing through the third polarized light beam splitter 312 in FIG. 50, they appear as shown in FIG. 51. In FIG. 51, the polarized components of the transmitted light beams 328, 329 in the central region and 327, 330 in the peripheral region are given by P-polarized components of the field vectors shown in FIG. 50, and thus have field vectors indicated by 336, 337; 335, 338, respectively.

Figure 52:
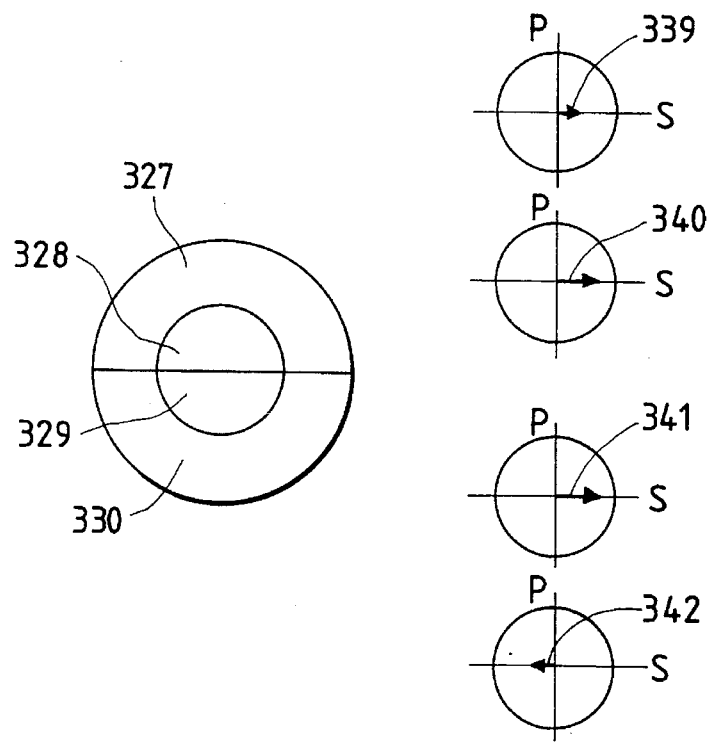

Likewise, looking at the S-polarized components of the light beams 327 to 330 after being reflected by the third polarized light beam splitter 312 in FIG. 50, they appear as shown in FIG. 52. In FIG. 36, the polarized components of the reflected light beams 328, 329 in the central region and 327, 330 in the peripheral region are given by S-polarized components of the field vectors shown in FIG. 50, and thus have field vectors indicated by 340, 341; 339, 342, respectively.

Figure 53:
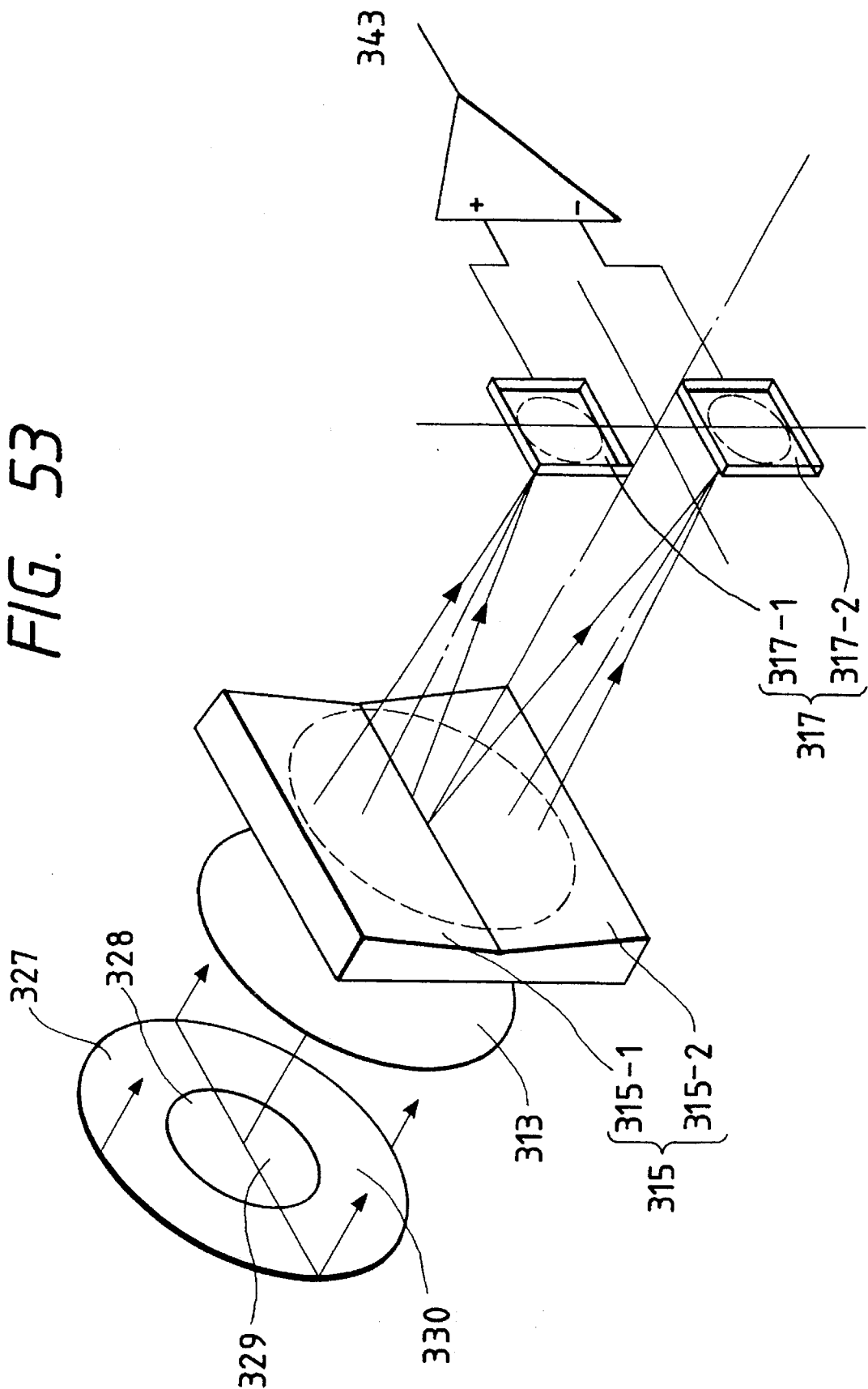
FIG. 53 is a view showing the behavior of a light beam when it is focused on photoelectric transducers after having passed through the polarized light beam splitter.

FIG. 53 illustrates the behavior of the light beams of P-polarized component, shown in FIG. 51, after passing through the third polarized light beam splitter 312, when they are focused by the focusing lens 313 and the pupil divider prism 315 on the elemental photoelectric transducers 317-1, 317-2. After passing through the focusing lens, the light beams 327, 328 in the upper half region are bent by the pupil divider prism 315-1 upwards and focused on the elemental photoelectric transducers 317-1. The polarized components in the upper half region have their phases opposite to each other between the light beams 327 and 328, as shown in FIG. 51. Consequently, the light spot focused on the elemental photoelectric transducer 317-1 results from out-of-phase interference of the light beams 327 and 328, so that the resulting light intensity becomes smaller than the sum of respective intensities of the light beams in a sole state.

On the other hand, after passing through the focusing lens, the light beams 329, 330 in the lower half region are bent by the pupil divider prism 315-2 downwards and focused on the elemental photoelectric transducers 317-2. The polarized components in the lower half region have their phases in the same direction between the light beams 329 and 330, as shown in FIG. 51. Consequently, the light spot focused on the elemental photoelectric transducer 317-2 is resulted from in-phase interference of the light beams 329 and 330, so that the resulting light intensity becomes larger than the sum of respective intensities of the light beams in a sole state.

As a result, the light beams of unequal light intensity are incident upon the 2-division photoelectric transducers 317-1, 317-2, respectively, and a difference signal 343 between the two elemental photoelectric transducers becomes minus.

Meanwhile, for the light intensities of the light spots which are formed by the focusing lens 314 and the pupil divider prism 316 on the elemental photoelectric transducers 318-1, 318-2 from the light beams of S-polarized component, shown in FIG. 52, reflected by the third polarized light beam splitter 312, there also occurs a difference between the light intensity that results from in-phase interference of the light beams 327, 328 in the upper half region and the light intensity that results from out-of-phase interference of the light beams 329, 330 in the lower half region, so that the difference signal becomes plus.

When the edge of the information magnetic domain is not present in an irradiated area of the light spot 305, there produces no difference in the direction of field vector of the reflected light beam 324 in FIG. 49, which in turn produces no difference in the directions of field vectors between the reflected light beams as indicated by 328, 329 or 327, 330 shown in FIG. 50. Consequently, the light spots focused on the respective elemental photoelectric transducing light detectors are equal to each other in the light intensity, so that the difference signal becomes zero.

With this embodiment, as mentioned above, the light beam after passing through the focusing lens is deflected by the pupil divider prism 315 so as to make the center of focused spot aligned with the center of an effective light receiving surface of each elemental photoelectric transducing light detector. Therefore, it is possible to reduce loss of the light intensity in a dead zone at the intermediate joint of photoelectric transducing light detector spatially divided into parts, and thus to effectively utilize the small intensity of reflected light from the opto-magnetic recording medium.

Further, by creating a difference signal between the two difference signals from both the 2-division photoelectric transducers, it is also possible to detect the direction of change in magnetization on both sides of the edge by using the final difference signal. More specifically, assuming that the difference signal from the two elemental photoelectric transducers 317-1, 317-2 is S1, the difference signal from the two elemental photoelectric transducers 318-1, 318-2 is S2, and the difference S1–S2 between those two signals is an edge detection signal, there can be obtained trains of signals as shown in FIG. 54 when the light spot scans over the magnetic domains. This mean that the edge detection signal can result corresponding to the directions of change in magnetization on both sides of the edge. In FIG. 54, 344-1, 344-2, 344-3 each indicate one information magnetic domain. The arrow in each information magnetic domain represents the direction of magnetization.

Figure 55:
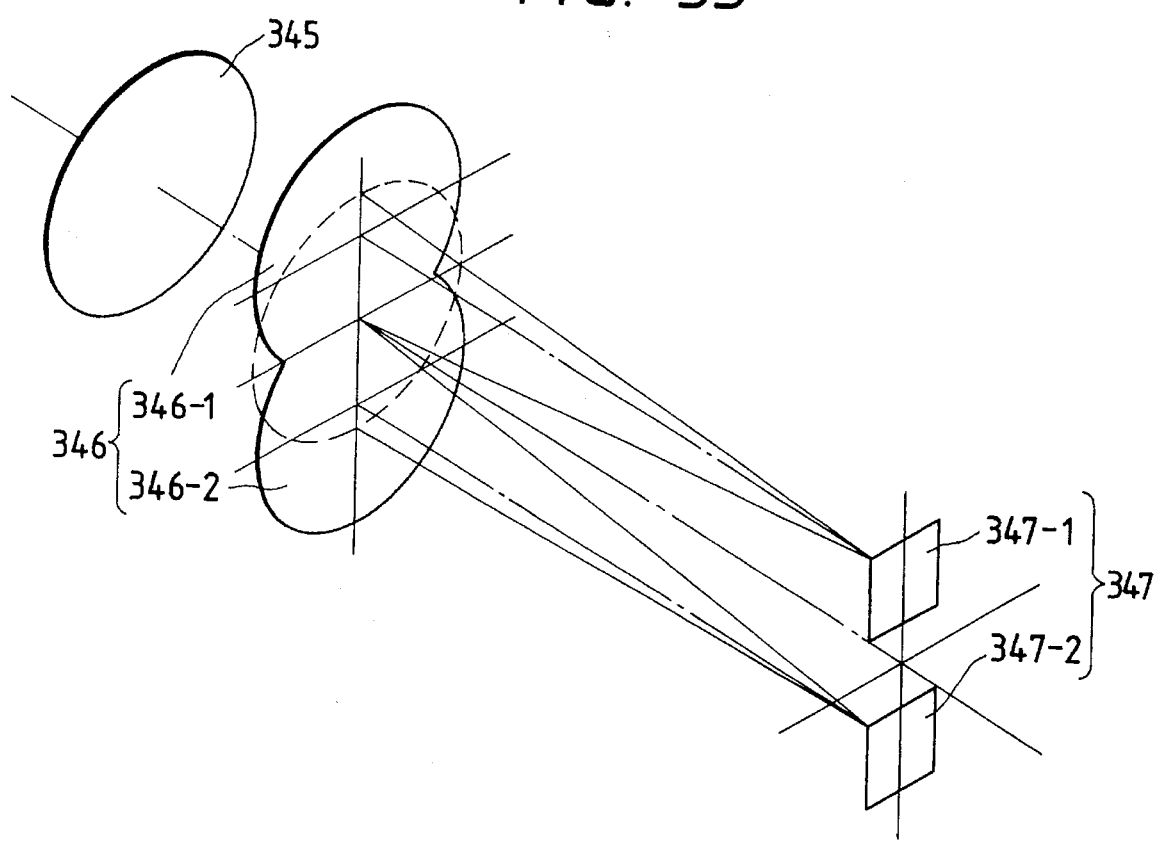
FIGS. 55 and 56 are views for explaining an example in which a compound lens is used in place of a pupil divider prism.

FIG. 55 is a view showing another means used in place of the pupil divider prism.

Figure 56:
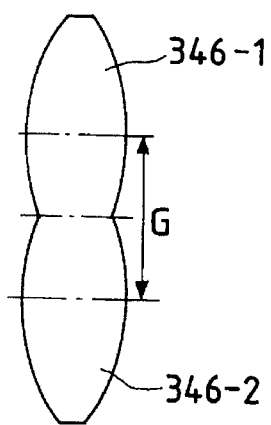

In FIG. 55, denoted by 345 is a reflected light beam from the second polarized light beam splitter 308, and 346 is a compound lens comprising two lenses 346-1, 346-2 of which optical axes are spaced by a distance G as shown in a sectional view of FIG. 56. The light beam passing through the focusing lens 346-1 is focused on one elemental photoelectric transducer 347-1 of a 2-division photoelectric transducer 347, while the light beam passing through the focusing lens 346-2 is focused on the other elemental photoelectric transducer 347-2. By replacing the compound lens with each pair of the focusing lens and the pupil divider prism in the above embodiment, there can be realized an optical system capable of fulfilling the same function.

As described above, according to the eighth embodiment and its modification of the present invention, there is provided an optical information recording/reproducing apparatus in which a light beam from a semiconductor laser is led as small spot light by a light irradiating optical system to one information track defined on an information recording surface of an opto-magnetic recording medium through an objective lens for recording information, and the light reflected by the information recording surface is led by a light receiving optical system to a 2-division photoelectric transducing light detector, comprising first and second elementary photoelectric transducing light detectors spatially separated from each other, through the objective lens so that the information recorded on the information track is reproduced, wherein the light receiving optical system includes a pupil dividing and focusing system for dividing the reflected light beam into first and second two regions in the direction of the information track, and focusing the light beam in the first region onto a first elemental photoelectric transducing light detector and the light beam in the second region onto a second elemental photoelectric transducing light detector, respectively, whereby edges of the information magnetic domains recorded on the information track are detected.

Furthermore, as described above, according to the eighth embodiment and its modification of the present invention, there is provided an optical information recording/reproducing apparatus in which a light beam from a semiconductor laser is led as small spot light by a light irradiating optical system to an information magnetic domain defined on an information recording surface of an opto-magnetic recording medium through an objective lens, and the light reflected by the information magnetic domain is led by a light receiving optical system to a 2-division photoelectric transducing light detector, comprising first and second elementary photoelectric transducing light detectors spatially separated from each other, through the objective lens so that the information recorded on the information recording surface is reproduced, wherein the light receiving optical system includes a polarizing direction rotator optical element for rotating the direction of polarization of the light beam by 90 degrees in a partial area of the reflected light beam from the information recording surface, a phase difference adjuster optical element capable of adjusting a phase difference between the light beam in the above area and the light beam out of the above area to a certain value, and a pupil dividing and focusing system for dividing the light beam having passed through the polarizing direction rotator optical element and/lot tile phase difference adjuster optical element into first and second regions, and focusing the light beam in the first region onto a first elemental photoelectric transducing light detector and the light beam in the second region onto a second elemental photoelectric transducing light detector, respectively, whereby edges of the information magnetic domains are detected by using a differential signal from the 2-division photoelectric transducing light detector.

In short, the present invention represented by the eighth embodiment and its modification is to realize an optical head for an opto-magnetic disk with high utilization efficiency of the light intensity which can precisely detect edges of the information magnetic domains by using the S-polarized component produced by an opto-magnetic recording film under the magnetic Kerr effect, without complicating the structure of a conventional opto-magnetic head.

We claim:

1. An optical information recording/reproducing apparatus comprising:

irradiation means for irradiating a light beam polarized in a predetermined direction to an opto-magnetic recording medium;

application means for receiving a recording signal and applying a predetermined magnetic field to the recording medium to effect recording;

optical means for condensing the light beam obtained from the recording medium, said optical means condensing the light beam polarized in a direction orthogonal to the predetermined direction;

detection means for detecting the light beam condensed by said optical means and for producing a detection output, said detection means having an effective light receiving surface almost equal to an airy disk size determined by a resolving power of said optical means; and comparison means for comparing a level of the detection output with a predetermined value, and for determining one of presence and absence of an information magnetic domain edge on the basis of the detection output.

2. An optical information recording/reproducing apparatus according to claim 1, wherein said optical means condenses only a polarized component newly produced under a magneto-optic effect, of polarized components of the light beam obtained through the recording medium.

3. An optical information recording/reproducing apparatus according to claim 2, wherein said optical means includes an optical filter which is divided into two regions by a boundary line containing an optical axis of said optical means and extending perpendicularly to a direction of an information track on the recording medium, and which effects a phase difference $\pi$ between two beam portions passing through the respective regions of said optical filter.

4. An optical information recording/reproducing apparatus according to claim 2, wherein said irradiation means includes a phase plate by which the light beam irradiated by said irradiation means is divided into two beams having a phase difference of $\pi$ therebetween, with respect to a boundary line of said phase plate perpendicular to a direction along which an information track extends on the recording medium.

5. An optical information recording/reproducing apparatus according to claim 1, wherein an output from said detection means is compared with a predetermined value to detect an information magnetic domain edge magnetically recorded on the recording medium.

6. An optical information reproducing apparatus comprising:

irradiation means for irradiating a light beam polarized in a predetermined direction to a recording medium on which information is magnetically recorded;

optical means for condensing the light beam obtained from the recording medium, said optical means condensing the light beam polarized in a direction orthogonal to the predetermined direction;

detection means for detecting the light beam condensed by said optical means and for producing a detection output, said detection means having an effective light receiving surface almost equal to an airy disk size determined by a resolving power of said optical means; and comparison means for comparing a level of the detection output with a predetermined value, and for determining one of presence and absence of an information magnetic domain edge on the basis of the detection output.

7. An optical information reproducing apparatus according to claim 6, wherein said optical means condenses only a polarized component newly produced under a magneto-optic effect, of polarized components of the light beam obtained through the recording medium.

8. An optical information reproducing apparatus according to claim 7, wherein said optical means includes an optical filter which is divided into two regions by a boundary line containing an optical axis of said optical means and extending perpendicularly to the direction of an information track on the recording medium, and which effects a phase difference $\pi$ between two beam portions passing through the respective regions of said optical filter.

9. An optical information reproducing apparatus according to claim 7, wherein said irradiation means includes a phase plate by which the light beam irradiated by said irradiation means is divided into two beams having a phase difference of $\pi$ therebetween, with respect to a boundary line of said phase plate perpendicular to a direction along which an information track extends on the recording medium.

10. An optical information reproducing apparatus according to claim 6, wherein an output from said detection means is compared with a predetermined value to detect an information magnetic domain edge magnetically recorded on the recording medium.

11. An optical head for reproducing information magnetically recorded with a mark length recording technique, said head comprising:

irradiation means for irradiating a light beam polarized in a predetermined direction to a recording medium on which information is magnetically recorded;

optical means for condensing the light beam obtained from the recording medium, said optical means condensing the light beam polarized in direction orthogonal to the predetermined direction;

detecting means for detecting the light beam condensed by said optical means and for producing a detection output, said detection means having an effective light receiving surface almost equal to an airy disk size determined by a resolving power of said optical means; and comparison means for comparing a level of the detection output with a predetermined value, and for determining one of presence and absence of an information magnetic domain edge on the basis of the detection output.

12. An optical head for reproducing information magnetically recorded with a mark length recording technique, said head comprising:

irradiation means for irradiating a light beam polarized in a predetermined direction to a recording medium on which information is magnetically recorded, wherein said irradiation means includes a phase plate by which the light beam irradiated by said irradiation means is divided into two beams having a phase difference of $\pi$ therebetween, with respect to a boundary line of said phase plate perpendicular to a direction along which an information track extends on the recording medium;

optical means for condensing the light beam obtained from the recording medium; and detection means for detecting the light beam condensed by said optical means.

13. An optical head for reproducing information magnetically recorded with a mark length recording technique, said head comprising:

irradiation means for irradiating a light beam polarized in a predetermined direction to a recording medium on which information is magnetically recorded;

optical means for condensing the light beam obtained from the recording medium, said optical means including an optical filter which is divided into two regions by a boundary line containing an optical axis of said optical means and extending perpendicularly to a direction of an information track on the recording medium, and which effects a phase difference $\pi$ between two beam portions passing through the respective regions of said optical filter; and detection means for detecting the light beam condensed by said optical means.

14. An optical information recording/reproducing apparatus comprising:

a semiconductor laser for irradiating a light beam polarized in a predetermined direction to an opto-magnetic recording medium;

application means for receiving a recording signal and applying a predetermined magnetic field to the recording medium to effect recording;

optical means for condensing the light beam obtained from the recording medium to a light emitting area of said semiconductor laser; and detection means for detecting a change in an intensity of light emitted from said semiconductor laser, so that an information magnetic domain edge magnetically recorded on the recording medium is detected from an output of said detection means, wherein said detection means is provided at a side opposite to said optical means with respect to said semiconductor laser.

15. An optical information reproducing apparatus comprising:

a semiconductor laser for irradiating a light beam polarized in a predetermined direction to a recording medium on which information is magnetically recorded;

optical means for condensing the light beam obtained from the recording medium in a light emitting area of said semiconductor laser; and detection means for detecting a change in an intensity of light emitted from said semiconductor laser, so that an information magnetic domain edge magnetically recorded on the recording medium is detected from an output of said detection means, wherein said detection means is provided at a side opposite to said optical means with respect to said semiconductor laser.

16. An optical information recording/reproducing apparatus comprising:

a semiconductor laser;

application means for receiving a recording signal and applying a predetermined magnetic field to an opto-magnetic recording medium;

optical means for irradiating a light beam from said semiconductor laser to the recording medium, said optical means including an optical element to select linearly polarized light from said semiconductor laser and an optical element to rotate a plane of polarization of the linearly polarized light by 90° after the linearly polarized light is caused to reciprocate therethrough, for condensing the light beam obtained from the recording medium to a light emitting area of said semiconductor laser; and detection means for detecting a change in an intensity of light emitted from said semiconductor laser wherein said detection means is provided at a side opposite to said optical means with respect to said semiconductor laser.

17. An optical information reproducing apparatus comprising:

a semiconductor laser;

optical means for irradiating a light beam from said semiconductor laser to a recording medium on which information is magnetically recorded, said optical means including an optical element to select linearly polarized light from said semiconductor laser and an optical element to rotate a plane of polarization of the linearly polarized light by 90° after the linearly polarized light is caused to reciprocate therethrough, for condensing the light beam obtained from the recording medium to a light emitting area of said semiconductor laser; and detection means for detecting a change in an intensity of light emitted from said semiconductor laser, wherein said detection means is provided at a side opposite to said optical means with respect to said semiconductor laser.

18. An optical information recording/reproducing apparatus comprising:

irradiation means for irradiating a light beam polarized in a predetermined direction to an opto-magnetic recording medium;

application means for receiving a recording signal and applying a predetermined magnetic field to the recording medium to effect recording;

optical means for condensing the light beam obtained from the recording medium, said optical means separating the light beam obtained from the recording medium into a beam portion having a first polarized component newly produced under a magneto-optic effect and a beam portion having a second polarized component perpendicular to the first polarized component, the two beam portions being combined with each other under interference; and detection means for detecting the light beam condensed by said optical means, said detection means having two independent light receiving surfaces.

19. An optical information recording/reproducing apparatus according to claim 18, wherein said optical means independently adjusts an intensity of at least one of the two separated beam portions, before combining the two beam portions with each other under interference.

20. An optical information reproducing apparatus comprising:

irradiation means for irradiating a light beam polarized in a predetermined direction to a recording medium on which information is magnetically recorded;

optical means for condensing the light beam obtained from the recording medium, said optical means separating the light beam obtained from the recording medium into a beam portion having a first polarized component newly produced under a magneto-optic effect and a beam portion having a second polarized component perpendicular to the first polarized component, the two beam portions being combined with each other under interference; and detection means for detecting the light beam condensed by said optical means, said detection means having two independent light receiving surfaces.

21. An optical information reproducing apparatus according to claim 20, wherein said optical means independently adjusts an intensity of at least one of the two separated beam portions, before combining the two beam portions with each other under interference.

22. An optical information recording/reproducing apparatus comprising:

irradiation means for irradiating a light beam polarized in a predetermined direction to an opto-magnetic recording medium;

application means for receiving a recording signal and applying a predetermined magnetic field to the recording medium to effect recording;

optical means for condensing the light beam obtained from the recording medium, said optical means rotating a direction of polarization of a portion of the light beam having passed through the recording medium by 90° to adjust a phase difference between the beam portion with the direction of polarization rotated by 90° and a remaining beam portion with an unrotated direction of polarization, thereby causing the two beam portions o interfere with each other; and detection means for detecting the light beam condensed by said optical means, said detection means comprising a detector spatially divided.

23. An optical information reproducing apparatus comprising:

irradiation means for irradiating a light beam polarized in a predetermined direction to a recording medium on which information is magnetically recorded;

optical means for condensing the light beam obtained from the recording medium, said optical means rotating a direction of polarization of a portion of the light beam having passed through the recording medium by 90° to adjust a phase difference between the beam portion with the direction of polarization rotated by 90° and a remaining beam portion with an unrotated direction of polarization, thereby causing the two beam portions to interfere with each other; and detection means for detecting the light beam condensed by said optical means, said detection means comprising a detector spatially divided.

24. An optical information recording/reproducing apparatus comprising:

irradiation means for irradiating a light beam polarized in a predetermined direction to an opto-magnetic recording medium;

application means for receiving a recording signal and applying a predetermined magnetic field to the recording medium to effect recording;

optical means for condensing the light beam obtained from the recording medium, said optical means dividing the light beam obtained from the recording medium into first and second regions in a direction of an information track on the recording medium;

first detection means for detecting a beam portion divided into the first region and converged by said optical means; and second detection means for detecting a beam portion divided into the second region and converged by said optical means, wherein an information magnetic domain edge magnetically recorded on the recording medium is detected using a difference signal based on a difference between output signals from said first and second detection means.

25. An optical information reproducing apparatus comprising:

irradiation means for irradiating a light beam polarized in a predetermined direction to a recording medium on which information is magnetically recorded;

optical means for condensing the light beam obtained from the recording medium, said optical means dividing the light beam obtained from the recording medium into first and second regions in a direction of an information track on the recording medium;

first detection means for detecting a beam portion divided into the first region and converged by said optical means; and second detection means for detecting a beam portion divided into the second region and converged by said optical means, wherein an information magnetic domain edge magnetically recorded on the recording medium is detected using a difference signal based on a difference between output signals from said first and second detection means.

* * * * *

UNITED STATES PATENT AND TRADEMARK OFFICE
CERTIFICATE OF CORRECTION

PATENT NO. : 5,581,532
DATED : December 3, 1996
INVENTOR(S) : Susumu MATSUMURA, et al.

It is certified that error appears in the above-indentified patent and that said Letters Patent is hereby corrected as shown below:

ON THE COVER PAGE

Under item [75], "Inventors":

"Susumi Matsumura," should read --Susumu Matsumura,--.

Under item [56], "U.S. PATENT DOCUMENTS":

"5,014253    5/1991   Morimoto et al." should read
   --5,014,253   5/1991   Morimoto et al.--.

Under item [57], "ABSTRACT":

Line 6, "medium an," should read --medium, an--.

COLUMN 2:

Line 52, "provided" should read --provides--.

UNITED STATES PATENT AND TRADEMARK OFFICE
CERTIFICATE OF CORRECTION

PATENT NO. : 5,581,532
DATED : December 3, 1996
INVENTOR(S) : Susumu MATSUMURA, et al.

It is certified that error appears in the above-indentified patent and that said Letters Patent is hereby corrected as shown below:

COLUMN 5:

Line 11, "the=optical" should read --the optical--;
    Line 51, "Condensed" should read --condensed--; and
    Line 66, "Spot" should read --spot--.

COLUMN 6:

Line 21, "Thus.," should read --Thus,--; and
    Line 50, "Seam" should read --beam--.

COLUMN 7:

Line 20, "Separated" should read --separated--.

COLUMN 8:

Line 33, "he" should read --the--;
    Line 39, "to be" should read --is--, and "therefore," should be deleted; and
    Line 54, "Wave" should read --wave--.

UNITED STATES PATENT AND TRADEMARK OFFICE
CERTIFICATE OF CORRECTION

PATENT NO. : 5,581,532
DATED : December 3, 1996
INVENTOR(S) : Susumu MATSUMURA, et al.

It is certified that error appears in the above-indentified patent and that said Letters Patent is hereby corrected as shown below:

COLUMN 9:

Line 17, "Case," should read --case,--;
Line 24, "determined" should read --determined.--;
Line 33, "45-" should read --45-1--;
Line 51, "Otherwise," should read --otherwise,--;
Line 57, "Furthers," should read --Further,--;
Line 59, "System" should read --system--; and
Line 67, "On" should read --on--.

COLUMN 10:

Line 40, "e" should read --the--;
Line 47, "under,the" should read --under the--; and
Line 58, "abeam" should read --a beam--.

COLUMN 11:

Line 13, "lens The" should read --lens. The--.

UNITED STATES PATENT AND TRADEMARK OFFICE
CERTIFICATE OF CORRECTION

PATENT NO. : 5,581,532        Page 4 of 7
DATED : December 3, 1996
INVENTOR(S) : Susumu MATSUMURA, et al.

It is certified that error appears in the above-indentified patent and that said Letters Patent is hereby corrected as shown below:

COLUMN 12:

Line 37, "Side" should read --side--; and
Line 44, "able to make" should read --to enable--.

COLUMN 13:

Line 10, "to" should read --to a--;
Line 15, "sensitivity:." should read --sensitivity.--;
Line 17, "thee" should read --the--; and
Line 61, "drawings" should read --drawings.--.

COLUMN 14:

Line 10, "half" should read --(half--;
Line 15, "1132" should read --113-2--; and
Line 21, "Of" should read --of--.

COLUMN 16:

Line 34, "become" should read --becomes--; and
Line 64, "iS" should read --is--.

UNITED STATES PATENT AND TRADEMARK OFFICE
CERTIFICATE OF CORRECTION

PATENT NO. : 5,581,532
DATED : December 3, 1996
INVENTOR(S) : Susumu MATSUMURA, et al.

It is certified that error appears in the above-indentified patent and that said Letters Patent is hereby corrected as shown below:

COLUMN 18:

Line 49, "Of" should read --of--; and
　　Line 66, "Signal" should read --signal--.

COLUMN 19:

Line 2, "Of" should read --of--; and
　　Line 3, "Conceptual" should read --conceptual--.

COLUMN 20:

Line 51, "In" should read --in--.

COLUMN 23:

Line 39, "Under" should read --under--;
　　Line 54, "237" should read --237.--; and
　　Line 67, "Of" should read --of--.

COLUMN 25:

Line 54, "the" (first occurrence) should be deleted, and "it" should read --to--.

UNITED STATES PATENT AND TRADEMARK OFFICE
CERTIFICATE OF CORRECTION

PATENT NO. : 5,581,532  Page 6 of 7
DATED : December 3, 1996
INVENTOR(S) : Susumu MATSUMURA, et al.

It is certified that error appears in the above-indentified patent and that said Letters Patent is hereby corrected as shown below:

COLUMN 26:

Line 1, "Creating" should read --creating--; and

Line 28, "tack" should read --track--.

COLUMN 27:

Line 33, "Such" should read --such--; and
Line 51, "FIG. 34,respectively," should read --FIG. 34, respectively,--.

COLUMN 28:

Line 12, "described%above," should read --described above,--;
Line 43, "b" should read --by--; and
Line 51, "he" should read --the--.

COLUMN 29:

Line 22, "to" should be deleted.

UNITED STATES PATENT AND TRADEMARK OFFICE
CERTIFICATE OF CORRECTION

PATENT NO. : 5,581,532
DATED : December 3, 1996
INVENTOR(S) : Susumu MATSUMURA, et al.

It is certified that error appears in the above-indentified patent and that said Letters Patent is hereby corrected as shown below:

COLUMN 33:

Line 32, "and/lot tile" should read --and/or the--.

COLUMN 34:

Line 15, "difference $\pi$" should read --difference of $\pi$--; and
Line 61, "difference $\pi$" should read --difference of $\pi$--.

COLUMN 36:

Line 47, laser" should read --laser,--.

Signed and Sealed this

Twenty-eighth Day of October, 1997

Attest:

BRUCE LEHMAN

*Attesting Officer*  *Commissioner of Patents and Trademarks*